(12) United States Patent
Pulli et al.

(10) Patent No.: US 10,051,182 B2
(45) Date of Patent: Aug. 14, 2018

(54) METHODS AND APPARATUS FOR COMPENSATING FOR MOTION AND/OR CHANGING LIGHT CONDITIONS DURING IMAGE CAPTURE

(71) Applicant: Light Labs Inc., Palo Alto, CA (US)

(72) Inventors: Kari Pulli, Palo Alto, CA (US); Nitesh Shroff, Millbrae, CA (US); Sapna A. Shroff, Sunnyvale, CA (US)

(73) Assignee: Light Labs Inc., Palo Alto, CA (US)

( * ) Notice: Subject to any disclaimer, the term of this patent is extended or adjusted under 35 U.S.C. 154(b) by 0 days.

(21) Appl. No.: 15/286,517

(22) Filed: Oct. 5, 2016

(65) Prior Publication Data

US 2017/0099439 A1   Apr. 6, 2017

Related U.S. Application Data

(60) Provisional application No. 62/237,529, filed on Oct. 5, 2015.

(51) Int. Cl.
*H04N 5/232* (2006.01)
*H04N 5/225* (2006.01)
(Continued)

(52) U.S. Cl.
CPC ....... *H04N 5/23264* (2013.01); *H04N 5/2257* (2013.01); *H04N 5/2258* (2013.01); *H04N 5/2259* (2013.01); *H04N 5/23229* (2013.01); *H04N 5/247* (2013.01); *H04N 5/265* (2013.01); *H04N 5/2625* (2013.01)

(58) Field of Classification Search
None
See application file for complete search history.

(56) References Cited

U.S. PATENT DOCUMENTS

| 4,544,241 | A | 10/1985 | LaBudde et al. |
| 5,153,569 | A | 10/1992 | Kawamuraa et al. |

(Continued)

FOREIGN PATENT DOCUMENTS

| KR | 1020110022279 | 3/2011 |
| WO | 2009145401 A1 | 12/2009 |
| WO | 2012089895 A1 | 7/2012 |

*Primary Examiner* — James Hannett
(74) *Attorney, Agent, or Firm* — Straub & Straub; Michael P. Straub; Stephen T. Straub

(57) ABSTRACT

Methods and apparatus for compensating for motion and/or changing light conditions during image capture, e.g., in video, through use of multiple camera modules and/or images captured by multiple camera modules are described. During image capture time periods a plurality of camera modules capture images. During a first image capture time period a first camera module captures an image including a complete image of a user selected scene area of interest. During an additional image capture time period the first camera module captures an image including a portion of the scene area of interest; however, a portion of the scene area image is missing from the captured image, e.g., due to camera motion, occlusion and/or lighting conditions. Captured images from other camera modules and/or from during different image capture time periods which include the missing portion are identified and ranked; the highest ranked image is used in generating a composite image.

18 Claims, 28 Drawing Sheets

(51) Int. Cl.
*H04N 5/265* (2006.01)
*H04N 5/247* (2006.01)
*H04N 5/262* (2006.01)

(56) References Cited

U.S. PATENT DOCUMENTS

| | | | |
|---|---|---|---|
| 5,583,602 | A | 12/1996 | Yamamoto |
| 6,011,661 | A | 1/2000 | Weng |
| 6,028,600 | A | 2/2000 | Rosin et al. |
| 7,801,428 | B2 | 9/2010 | Nagaishi et al. |
| 8,237,841 | B2 * | 8/2012 | Tanida ............... G02B 3/0056 348/335 |
| 8,417,058 | B2 | 4/2013 | Tardif |
| 8,553,106 | B2 * | 10/2013 | Scarff ............... H04N 5/2258 348/240.2 |
| 8,619,082 | B1 | 12/2013 | Cuirea et al. |
| 8,665,341 | B2 | 3/2014 | Georgiev et al. |
| 8,762,895 | B2 | 6/2014 | Mehta et al. |
| 8,896,655 | B2 | 11/2014 | Mauchly et al. |
| 9,041,826 | B2 | 5/2015 | Jung et al. |
| 9,104,705 | B2 | 8/2015 | Fujinaga |
| 9,135,732 | B2 | 9/2015 | Winn et al. |
| 9,197,816 | B2 | 11/2015 | Laroia |
| 9,267,797 | B2 * | 2/2016 | Oouchida ............... G02B 7/30 |
| 9,270,876 | B2 | 2/2016 | Laroia |
| 9,282,228 | B2 | 3/2016 | Laroia |
| 9,325,906 | B2 | 4/2016 | Laroia |
| 9,374,514 | B2 | 6/2016 | Laroia |
| 9,423,588 | B2 | 8/2016 | Laroia |
| 9,426,365 | B2 | 8/2016 | Laroia et al. |
| 9,451,171 | B2 | 9/2016 | Laroia |
| 9,462,170 | B2 | 10/2016 | Laroia et al. |
| 9,467,627 | B2 | 10/2016 | Laroia |
| 9,544,501 | B2 | 1/2017 | Laroia |
| 9,544,503 | B2 | 1/2017 | Shroff |
| 9,547,160 | B2 | 1/2017 | Laroia |
| 9,549,127 | B2 | 1/2017 | Laroia |
| 9,551,854 | B2 | 1/2017 | Laroia |
| 9,554,031 | B2 | 1/2017 | Laroia et al. |
| 9,557,519 | B2 | 1/2017 | Laroia |
| 9,557,520 | B2 | 1/2017 | Laroia |
| 9,563,033 | B2 | 2/2017 | Laroia |
| 9,565,416 | B1 * | 2/2017 | Lewkow ............ H04N 5/23212 |
| 9,568,713 | B2 | 2/2017 | Laroia |
| 9,578,252 | B2 | 2/2017 | Laroia |
| 9,599,796 | B2 * | 3/2017 | Shabtay ............... G02B 9/60 |
| 9,671,595 | B2 | 6/2017 | Laroia |
| 9,686,471 | B2 | 6/2017 | Laroia et al. |
| 9,690,079 | B2 | 6/2017 | Laroia |
| 9,736,365 | B2 | 8/2017 | Laroia |
| 9,749,511 | B2 | 8/2017 | Laroia |
| 9,749,549 | B2 | 8/2017 | Shroff |
| D802,646 | S | 11/2017 | Laroia et al. |
| 9,824,427 | B2 | 11/2017 | Pulli et al. |
| 2003/0018427 | A1 | 1/2003 | Yokota et al. |
| 2004/0027695 | A1 | 2/2004 | Lin |
| 2004/0100479 | A1 | 5/2004 | Nakano et al. |
| 2005/0088546 | A1 | 4/2005 | Wang |
| 2005/0200012 | A1 | 9/2005 | Kinsman |
| 2006/0072029 | A1 * | 4/2006 | Miyatake ............ G02B 3/0056 348/340 |
| 2006/0187311 | A1 | 8/2006 | Labaziewicz et al. |
| 2006/0281453 | A1 | 12/2006 | Jaiswal et al. |
| 2007/0065012 | A1 | 3/2007 | Yamakado et al. |
| 2008/0240698 | A1 | 10/2008 | Bartilson et al. |
| 2008/0247745 | A1 | 10/2008 | Nilsson |
| 2009/0136223 | A1 | 5/2009 | Motomura et al. |
| 2009/0160997 | A1 * | 6/2009 | Oyama ............... H04N 5/2254 348/340 |
| 2009/0290042 | A1 | 11/2009 | Shiohara |
| 2010/0013906 | A1 | 1/2010 | Border et al. |
| 2010/0034531 | A1 | 2/2010 | Go |
| 2010/0079635 | A1 | 4/2010 | Yano et al. |
| 2010/0091089 | A1 | 4/2010 | Cromwell et al. |
| 2011/0123115 | A1 | 5/2011 | Lee et al. |
| 2011/0193984 | A1 | 8/2011 | Kitaya et al. |
| 2011/0221920 | A1 | 9/2011 | Gwak |
| 2012/0062691 | A1 | 3/2012 | Fowler et al. |
| 2012/0027462 | A1 | 8/2012 | Justice |
| 2013/0020470 | A1 | 1/2013 | Luo et al. |
| 2013/0088614 | A1 | 4/2013 | Lee |
| 2013/0093947 | A1 | 4/2013 | Lee et al. |
| 2013/0258044 | A1 | 10/2013 | Betts-Lacroix |
| 2014/0049677 | A1 | 2/2014 | Kawaguchi |
| 2014/0063018 | A1 | 3/2014 | Takeshita |
| 2014/0226041 | A1 | 8/2014 | Eguchi et al. |
| 2014/0240579 | A1 | 8/2014 | Park et al. |
| 2014/0267243 | A1 | 9/2014 | Venkataraman et al. |
| 2014/0267844 | A1 | 9/2014 | Iwata et al. |
| 2014/0293079 | A1 | 10/2014 | Milanfar et al. |
| 2015/0029595 | A1 | 1/2015 | Swihart et al. |
| 2015/0035824 | A1 | 2/2015 | Takahashi et al. |
| 2015/0043808 | A1 | 2/2015 | Takahashi et al. |
| 2015/0049233 | A1 | 2/2015 | Choi |
| 2015/0154449 | A1 | 6/2015 | Ito et al. |
| 2015/0241713 | A1 | 8/2015 | Laroia et al. |
| 2015/0244927 | A1 | 8/2015 | Laroia et al. |
| 2015/0244949 | A1 | 8/2015 | Laroia et al. |
| 2015/0296149 | A1 | 10/2015 | Laroia |
| 2016/0004144 | A1 | 1/2016 | Laroia et al. |
| 2016/0014314 | A1 | 1/2016 | Laroia et al. |
| 2016/0091861 | A1 | 3/2016 | Liu et al. |
| 2016/0112637 | A1 | 4/2016 | Laroia et al. |
| 2016/0112650 | A1 | 4/2016 | Laroia et al. |
| 2016/0142610 | A1 | 5/2016 | Rivard et al. |
| 2016/0182777 | A1 | 6/2016 | Laroia et al. |
| 2016/0306168 | A1 | 10/2016 | Singh et al. |
| 2016/0309095 | A1 | 10/2016 | Laroia et al. |
| 2016/0309110 | A1 | 10/2016 | Laroia et al. |
| 2016/0309133 | A1 | 10/2016 | Laroia et al. |
| 2016/0316117 | A1 | 10/2016 | Singh et al. |
| 2016/0360109 | A1 | 12/2016 | Laroia et al. |
| 2016/0381301 | A1 | 12/2016 | Shroff |
| 2017/0031138 | A1 | 2/2017 | Laroia |
| 2017/0041528 | A1 | 2/2017 | Lai et al. |
| 2017/0054919 | A1 | 2/2017 | Laroia |
| 2017/0059857 | A1 | 3/2017 | Laroia et al. |
| 2017/0070683 | A1 | 3/2017 | Laroia |
| 2017/0099439 | A1 | 4/2017 | Pulli et al. |
| 2017/0123189 | A1 | 5/2017 | Laroia |
| 2017/0126976 | A1 | 5/2017 | Laroia |
| 2017/0180615 | A1 | 6/2017 | Lautenbach |
| 2017/0180637 | A1 | 6/2017 | Lautenbach et al. |
| 2017/0201699 | A1 | 7/2017 | Laroia |
| 2017/0208230 | A1 | 7/2017 | Laroia |
| 2017/0208257 | A1 | 7/2017 | Laroia |
| 2017/0223286 | A1 | 8/2017 | Laroia et al. |
| 2017/0280135 | A1 | 9/2017 | Shroff et al. |

* cited by examiner

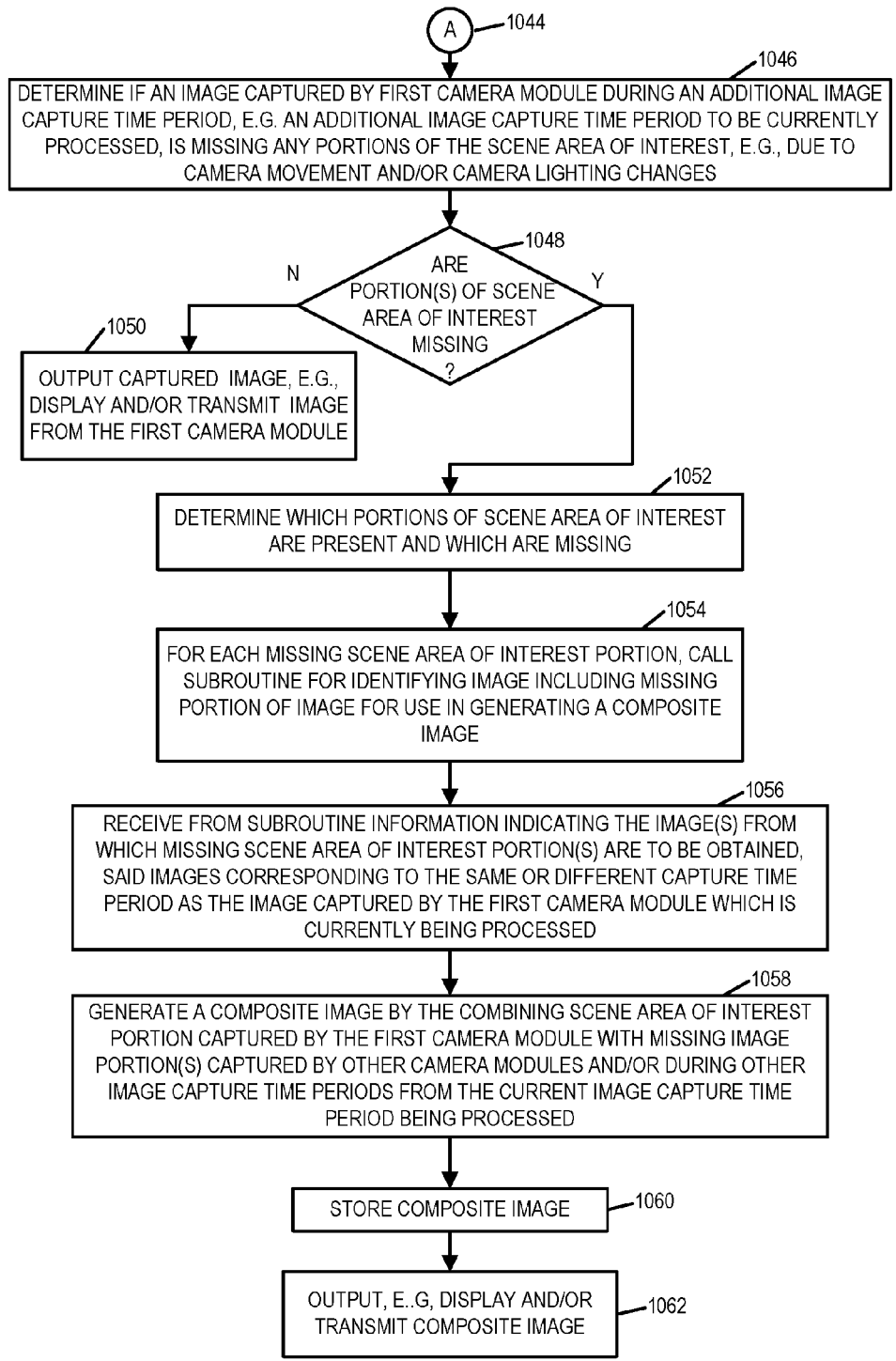

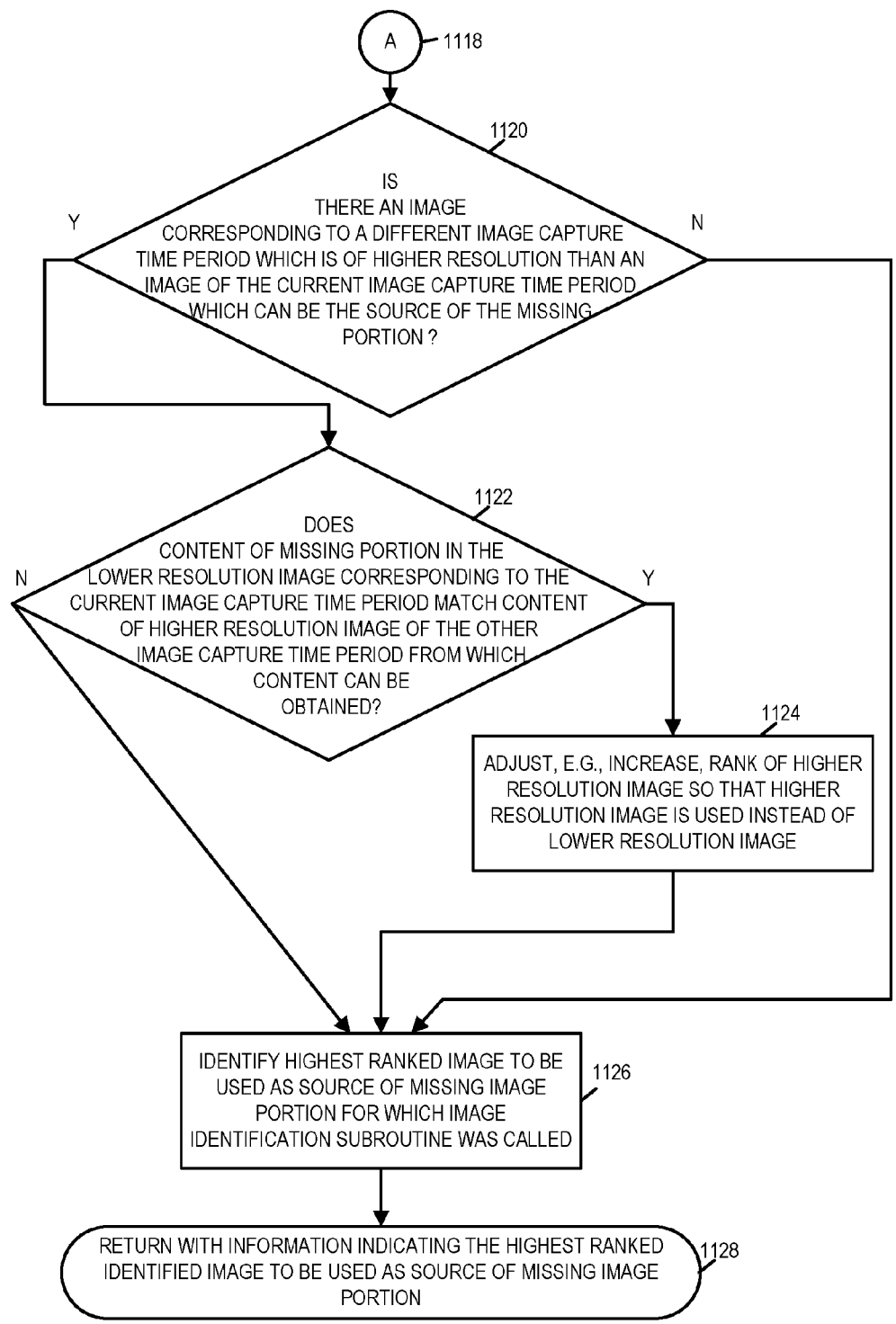

METHODS AND APPARATUS FOR COMPENSATING FOR MOTION AND/OR CHANGING LIGHT CONDITIONS DURING IMAGE CAPTURE

RELATED APPLICATION

The present application claims the benefit of the filing date of U.S. Provisional Application Ser. No. 62/237,529 filed on Oct. 5, 2015 which is hereby expressly incorporated by reference in its entirety.

FIELD

The present invention relates to image stabilization and more particularly, to methods and apparatus for compensating for motion and/or changing light conditions during image capture, e.g., in video, through the use of multiple camera modules and/or images captured by multiple camera modules.

BACKGROUND

Handheld cameras tend to suffer from movement as a user finds it difficult to keep a camera steady over time. For example, a handheld camera used during a wedding or sporting event may be suggested to movement as the hand, of the individual holding the camera for a period of time, moves As a result, camera motion may cause undesired shaking and/or motion as images are captured in a sequence, e.g., a video sequence generated from sequentially captured images.

In addition to motion, handheld cameras are often used in a wide variety of environments including family events such as weddings, where lighting conditions may suddenly change, e.g. due to the flash of a nearby camera or for some other reason such as a strobe light flashing during a reception. In such a situation, a portion of a scene area subject to an unexpected flash may be saturated during one image capture time period due while other portions which were unaffected by the flash may still be usable. In order to reduce camera motion a mechanical stabilization system may be employed and/or a camera may be supported in a fixed camera mount or a camera rig intended to perform mechanical stabilization functions.

While mechanical stabilization techniques offer some benefits, they are not practical for many applications where a user seeks to be able to use a handheld camera to quickly take a short video sequence where there may not be time or space to set up a camera tripod or use an camera stabilization mount.

In order to control for lighting conditions, other users of cameras may be restricted from using a flash and/or lighting in an environment can be controlled by prohibiting the use of strobe lights. Unfortunately, in the case of a handheld camera user, e.g., a guest at a wedding reception, the user may have not control over the use of flashes by others at the event and/or the use of strobe lights. In such cases, strobes and/or flashes may cause images of a scene area to have some portions saturated in images but not in others. A rapid change in light conditions can result in an uncomfortable video sequence with the light levels changing unexpectedly and/or with portions of the image being saturated from one image capture period to the next due to the presence of strobe lights or flashes.

It would be desirable if image stabilization techniques could be developed which could address the problems related to camera motion and/or lighting conditions outside the camera operators control which may result in portions of a scene area of interest not being captured due to motion or portions of a sensor being saturated, e.g., due to a flash or strobe light being present in the environment.

SUMMARY

Methods and apparatus for performing image stabilization to images captured by a camera device including multiple camera modules are described.

Images are captured by multiple camera modules operating in parallel, e.g., in a handheld camera device, with at least some of the camera modules having different focal lengths. Camera modules with a shorter focal length capture a larger field of view than a camera module used to capture the image area selected to be captured by a user of the camera device. The larger image area is used as a guard area from which image portions can be taken to compensate for shaking during video capture. The number of camera modules available for providing guard area portions depends, in some but not necessarily all embodiments, on the zoom level selected by the user with more modules for providing guard area portions as the zoom level increases and a smaller image area is captured. This conveniently allows for greater shake compensation at higher levels of zoom where small hand movements are likely to have a greater impact on image movement since small hand movements cause a shift relative to overall captured image size due to the higher zoom level. While the guard area portions from camera modules having a lower zoom level will be of lower resolution assuming the same sensors are used for the camera modules with different focus lengths, the lower resolution portions are likely to correspond to the outer edges of the image and are likely to be relatively small compared to the overall image size. Accordingly, the benefit of using fill portions from the available lower resolution sensors outweighs the effects that shaking would have absent the shake compensation and image fill that being implemented.

In various embodiments a scene area of interest is determined, e.g., based on a user capturing an image of the scene area of interest using a first camera module or a user designating a scene area of interest in a view finder. The scene area of interest may correspond to a portion of a captured scene area, e.g., the portion shown in a view finder at a user controlled zoom setting level.

Multiple images are captured during each image capture time interval, e.g., frame time, using camera modules some of which have different focal lengths than the first camera module. The image captured by the first camera module during a current frame time is analyzed to determine if it is missing one or more portions of the scene area of interest. Such a loss of a portion of the scene area of interest may be due to camera motion. For example due to camera motion the field of view may change and a portion of the scene area of interest may no longer be field of view of the camera module previously used to capture the scene area of interest or a portion of the area may be occluded due to a change in the position of the camera relative to an object which blocks a portion of the scene area of interest from view. However, it may also be due to saturation of the image sensor.

For each identified missing portion of the scene area of interest in the image captured by the first camera module during the current time interval, images captured by other camera modules during the first time interval are analyzed to determine if they include the missing portion. If multiple camera modules captured the scene area of interest, the images are ranked according to quality, e.g., based on resolution.

In some embodiments the missing image portion having the highest quality, e.g., resolution, is combined with the image captured by the first camera module to form a complete composite image of the scene area of interest for the current frame time.

In other embodiments, not only are the images captured during the current frame time considered as a possible source of the missing image portion but images corresponding to temporally preceding image capture time periods and/or subsequently following image capture time periods are considered for use as possible sources for the missing image portion.

When images from preceding and subsequent image frame times are considered, ranking of image portions may take into consideration the temporal difference in time between the current frame capture time period and the frame capture time period of the possible source of the missing image portion. For example, imaged corresponding to the same frame time as the image being generated may not be reduced in priority because they temporally correspond to the same frame time as the image being generated. Possible source images corresponding to an immediately preceding or subsequent frame time are temporally displaced by a single frame time and are weighted by a fixed amount to reduce their quality ranking. Possible source images corresponding to more distant frame times are weight to reduce their ranking even further with the weighting being a function of temporal distance from the current frame time. Resolution can be another weighting factor for ranking purposes.

In various embodiments by ranking possible image sources for the missing portion or portions of an image based on distance in time from the current image being processed and based on image quality, e.g., resolution, an image rank can be generated for multiple different source images which can be used for as a source of a missing portion of an image.

By selected in a source image based on its ranking, extracting the missing portion of the scene area from the selected source image, and combining the extracted portion with the image captured by the first camera module during the current time frame, a complete image of the scene area of interest can be produced despite the effect of motion, flashes and/or other conditions which may result in a failure to reliably capture one or more portions of a scene area of interest during one or more image capture time periods, e.g., frame times, in a image capture time period corresponding to the capture of a video sequence.

The methods and apparatus of the present invention are well suited for use with camera devices, e.g., handheld camera devices, capable of capturing multiple images at the same time using multiple different camera modules of differing focal lengths during one or multiple sequential image capture time periods, e.g., frame time periods.

The methods and apparatus allow for image stabilization to be performed using images captured by different camera modules of a camera and can be used without the need or benefit of mechanical stabilization devices. However, the image stabilization methods can be used with mechanical and/or other image stabilization techniques where additional stabilization may be desired than would be achieved without combining image stabilization techniques.

An exemplary method of generating one or more images, in accordance with some embodiments, includes: capturing multiple images using a set of camera modules during a second image capture time period, said set of camera modules including at least a first camera module and a second camera module, said first camera module capturing a first image including a first portion of said scene area of interest during said second image capture time period but missing a second portion of said scene area of interest during said second image capture time period; identifying, for use in generating a composite image, an image including said missing second portion of said scene area of interest, said identified image being: (i) an image captured by said second camera module in said set of camera modules or (ii) an image captured during a different image capture time period than said second image capture time period; and generating the composite image from the first portion of said scene area of interest included in said first image captured by said first camera module during the second image capture time period and the identified image including said missing second portion of said scene area of interest.

An exemplary camera device, in accordance with some embodiments, comprises:

a set of camera modules; and a processor configured to control said camera device to: capture multiple images using said set of camera modules during a second image capture time period, said set of camera modules including at least a first camera module and a second camera module, said first camera module capturing a first image including a first portion of said scene area of interest during said second image capture time period but missing a second portion of said scene area of interest during said second image capture time period; identify, for use in generating a composite image, an image including said missing second portion of said scene area of interest, said identified image being: (i) an image captured by said second camera module in said set of camera modules or (ii) an image captured during a different image capture time period than said second image capture time period; and generate the composite image from the first portion of said scene area of interest included in said first image captured by said first camera module during the second image capture time period and the identified image including said missing second portion of said scene area of interest.

Numerous additional features, benefits and embodiments are described in the detailed description which follows.

BRIEF DESCRIPTION OF THE FIGURES

FIG. 10B is a second part of a flowchart of an exemplary method of generating one or more images in accordance with an exemplary embodiment.

FIG. 10 comprises the combination of FIG. 10A and FIG. 10B.

FIG. 11B is a second part of a flowchart of an exemplary method of identifying images which may be used to fill in missing image portions in accordance with an exemplary embodiment.

FIG. 11 comprises the combination of FIG. 11A and FIG. 11B.

DETAILED DESCRIPTION

Figure 1:
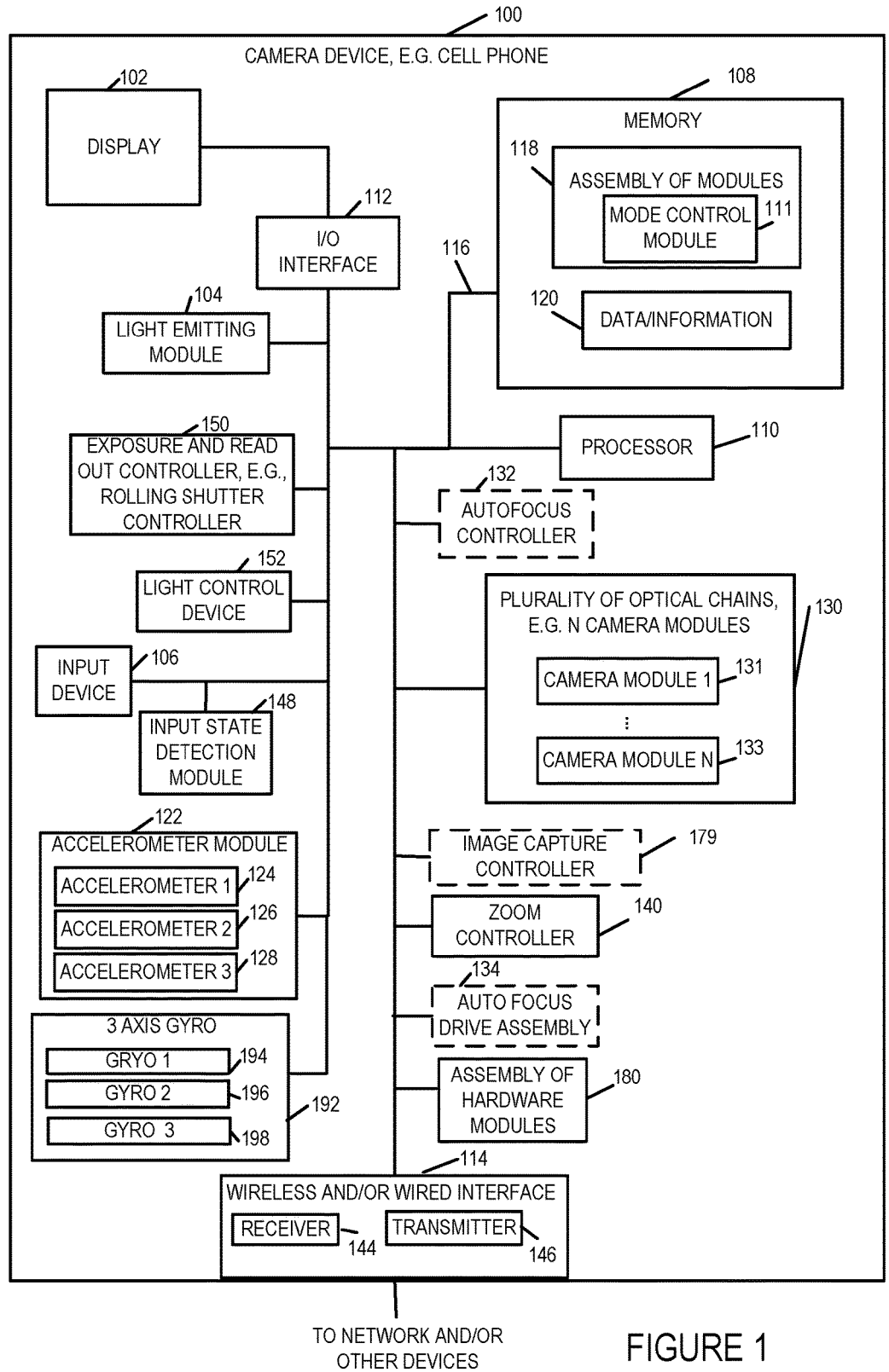
FIG. 1 is a block diagram of an exemplary apparatus, e.g., a camera device, implemented in accordance with one embodiment of the present invention.

FIG. 1 illustrates an exemplary camera device 100 such as a digital camera, notepad with camera functionality, or cell phone with camera functionality, implemented in accordance with one exemplary embodiment of the present invention. The camera device 100, in some embodiments, is a portable device. In other embodiments, the camera device 100 is a fixed device such as a wall mounted camera.

FIG. 1 illustrates the camera device 100 in block diagram form showing the connections between various elements of the apparatus 100. The exemplary camera device 100 includes a display device 102, a light emitter module 104, an input device 106, an input state detection module 148, an exposure and readout controller 150, e.g., a rolling shutter controller 150, a light control device 152, memory 108, a processor 110, an image capture controller 179, a hardware assembly of modules 180, a wireless and/or wired interface 114, e.g., a cellular interface, a Wi-Fi interface, and/or a USB interface, an I/O interface 112, an accelerometer module 122, 3 axis gyro 192, and a bus 116 which are mounted in a housing represented by the rectangular box touched by the line leading to reference number 100. The light emitter module 104 includes light emitting elements which may be LEDs (Light Emitting Diodes) or other types of light emitting elements which can be individually controlled so that all the light emitting elements need not be on at the same time. The input device 106 may be, and in some embodiments is, e.g., keypad, touch screen, or similar device that may be used for inputting information, data and/or instructions. The accelerometer module 122 includes accelerometer 1 124, accelerometer 2, 126 and accelerometer 3 128 which are arrayed on perpendicular axis providing a 3 axis accelerometer module. Thus, the accelerometer module 122 can measure along 3 independent axis. In some embodiments the rolling shutter controller 150 acts as an image capture controller which under the control of the processor 110 controls the capture of images by one or more camera modules. The processor 110 may due this by operating as an image capture controller and controlling the rolling shutter module 150 so that images are captured, e.g., as part of a video sequence or during a single capture time period. In other embodiments a separate image capture controller 179 is used in which the image capture controller 179, in response to user input or in response to control by the processor 110 which operates in response to user input, controls the capture of images during, e.g., successive image capture time periods which maybe and sometimes are different time periods of a video capture time period in which video is captured. The video maybe a sequence of images captured by one camera or a sequence of images captured by a plurality of camera modules. A composite image which maybe used as an image in a video sequence generated, displayed and/or output by the camera shown in FIG. 1, maybe and sometimes is generated from multiple captured images.

Similarly, the 3-axis gyro 192, which includes 194, 196 and 198 can measure rotation along each of 3 different axis. The output of the accelerometer module 122 and the gyro module 192 can, and in some embodiments is, monitored with changes in accelerometer and gyro output being interpreted and checked over time by processor 110 and/or zoom control module, e.g., zoom controller 140 to detect changes in acceleration indicating motion in one or more directions. In some embodiments the input device 106 includes at least one zoom control button that can be used to enable or disable camera zoom functionality. In some such embodiments when the zoom control button is in a depressed state the camera zoom function is enabled while when the button is in a un-depressed state the camera zoom function is disabled. The input state detection module 148 is configured to detect the state of the input device, e.g., the zoom control button, to detect whether the button is in a depressed state or undepressed state. In some embodiments there is a status register in the camera device 100 that includes a bit indicating the state of the zoom control button detected by the state detection module 148, e.g., whether it is in the depressed state indicating that zoom is enabled or whether it is undepressed indicating that zoom is disabled.

The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116. Touch sensors in the display 102 maybe and sometimes do serve as a user input. The interface 114 can be and in some embodiments is used to transmit captured image data to another system, e.g., an image processing system external to the camera device 100, for processing in accordance with the invention. In some such embodiments the camera modules, e.g., optical chains of the camera device 100 are used and/or controlled to capture images with the processor of the external processing system (See FIG. 23) being used to generate composite images, e.g., as part of video generate in accordance with the invention.

Figure 7A:
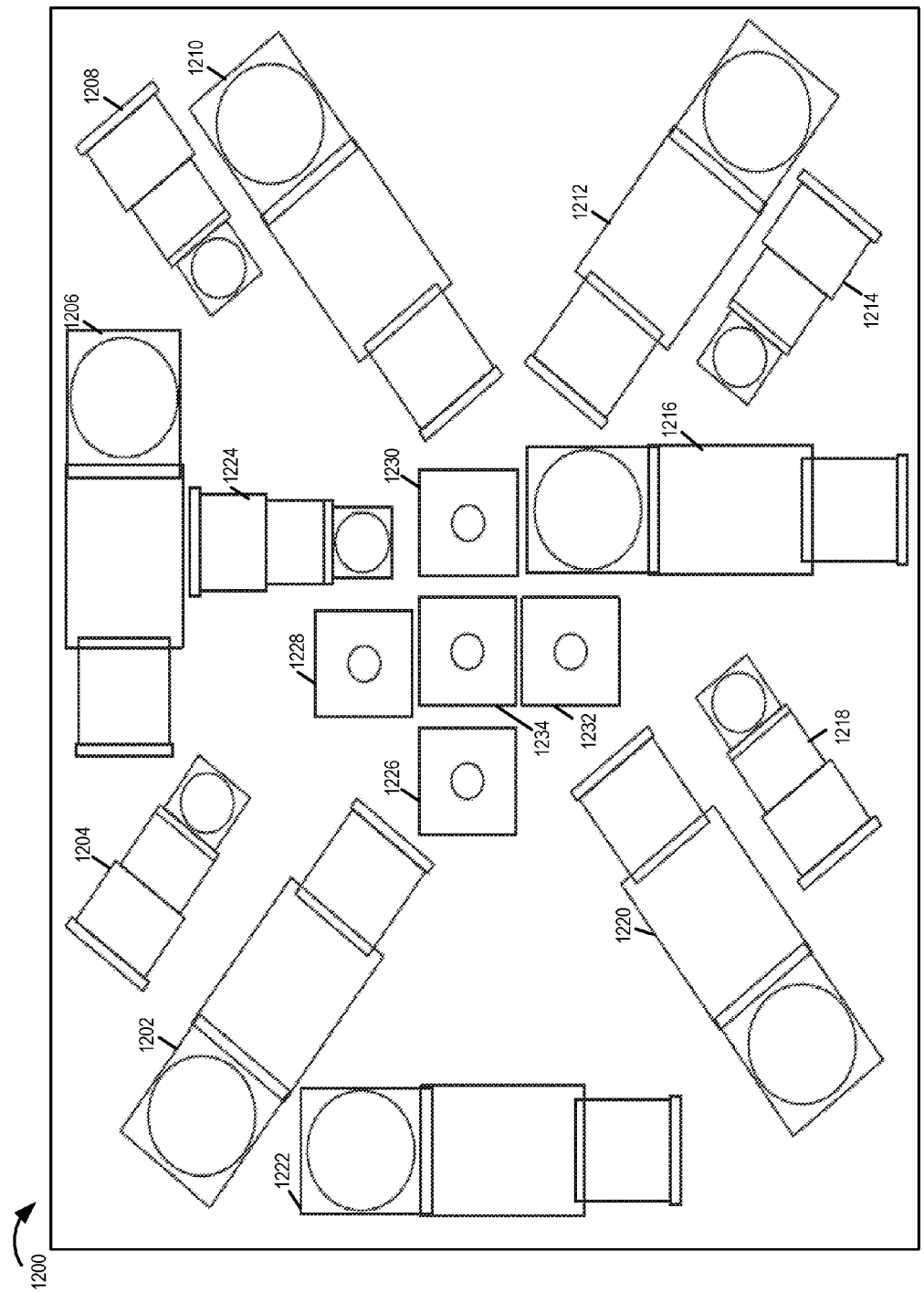
FIG. 7A illustrates an arrangement of optical chains, e.g., camera modules, used in one embodiment to implement a camera device of the type shown in FIG. 6A with the lens arrangement shown in FIG. 6B.

In addition to being coupled to the I/O interface 112, the bus 116 is coupled to the memory 108, processor 110, an optional autofocus controller 132, the wireless and/or wired interface 114, a zoom control module 140, and a plurality of optical chains 130, e.g., X optical chains also referred to herein as camera modules. In some embodiments X is an integer greater than 2, e.g., 3, 4, 7 or a larger value depending on the particular embodiment. The plurality of camera modules 130 may be implemented using any of the various camera module sets and/or arrangements described in the present application. For example, in some embodiments the camera device 100 is implemented using a set of camera modules as shown in FIG. 7A while in other embodiments the camera device 100 may be implemented using other module arrangements. Images captured by individual optical chains in the plurality of optical chains 130 can, and in various embodiments are, stored in memory 108, e.g., as part of the data/information 120 and processed by the processor 110, e.g., to generate one or more composite images.

The X camera modules 131 through 133 may, and in various embodiments do, include camera modules having different focal lengths. Multiple camera modules may be provided at a given focal length. For example, multiple camera modules having a 35 mm equivalent focal length to a full frame DSLR camera, multiple camera modules having a 70 mm equivalent focal length to a full frame DSLR camera and multiple camera modules having a 140 mm equivalent focal length to a full frame DSLR camera are included in an individual camera device in some embodiments. The various focal lengths are exemplary and a wide variety of camera modules with different focal lengths may be used. The camera device 100 is to be considered exemplary. To the extent that other references are made to a camera or camera device with regard to some of the other figures, it is to be understood that at least in some embodiments the camera device or camera will include the elements shown in FIG. 1 even if the elements are not shown in a particular figure or embodiment. While in some embodiments all of the elements shown in FIG. 1 are included in the camera device or camera, in other embodiments a subset of the elements shown in FIG. 1 are included and the illustration of the elements in FIG. 1 is not intended to imply that a particular element is essential or necessary in all embodiments.

As will be discussed below images from different camera modules captured at the same time or during a given time period can be combined to generate a composite image, e.g., an image having better resolution, frequency content and/or light range than an individual image captured by a single one of the camera modules 131, 133.

Multiple captured images and/or composite images may, and in some embodiments are, processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The lighting module 104 in some embodiments includes a plurality of light emitting elements, e.g., LEDs, which can be illuminated in a controlled manner to serve as the camera flash with the LEDs being controlled in groups or individually, e.g., in a synchronized manner based on operation of the rolling shutter and/or the exposure time. For purposes of discussion module 104 will be referred to as an LED module since in the exemplary embodiment LEDs are used as the light emitting devices but as discussed above the invention is not limited to LED embodiments and other light emitting sources may be used as well. In some embodiments the LED module 104 includes an array of light emitting elements, e.g., LEDs. In some embodiments the light emitting elements in the LED module 104 are arranged such that each individual LED and/or a group of LEDs can be illuminated in a synchronized manner with rolling shutter operation. Light emitting elements are illuminated, in some but not all embodiments, sequentially, so that different portions of an area are illuminated at different times so that the full area need not be consistently lighted during image capture. While all lighting elements are not kept on for the full duration of an image capture operation involving the reading out of the full set of pixel elements of a sensor, the portion of area which is having its image captured, e.g., the scan area, at a given time as a result of the use of a rolling shutter will be illuminated thanks to synchronization of the lighting of light emitting elements with rolling shutter operation. Thus, various light emitting elements are controlled to illuminate at different times in some embodiments based on the exposure time and which portion of a sensor will be used to capture a portion of an image at a given time. In some embodiments the light emitting elements in the LED module 104 include a plurality of sets of light emitting elements, each set of light emitting elements corresponding to a different image area which it illuminates and which is captured by a different portion of the image sensor. Lenses may, and in some embodiments are used to direct the light from different light emitting elements to different scene areas which will be captured by the camera through the use of one or more camera modules.

The rolling shutter controller 150 is an electronic shutter that controls reading out of different portions of one or more image sensors at different times. Each image sensor is read one row of pixel values at a time and the various rows are read in order. As will be discussed below, the reading out of images captured by different sensors is controlled in some embodiments so that the sensors capture a scene area of interest, also sometimes referred to as an image area of interest, in a synchronized manner with multiple sensors capturing the same image area at the same time in some embodiments.

While an electronic rolling shutter is used in most of the embodiments, a mechanical rolling shutter may be used in some embodiments.

The light control device 152 is configured to control light emitting elements (e.g., included in the LED module 104) in a synchronized manner with the operation of the rolling shutter controller 150. In some embodiments the light control device 152 is configured to control different sets of light emitting elements in the array to emit light at different times in a manner that is synchronized with the timing of the rolling shutter 150. In some embodiments the light control device 152 is configured to control a first set of light emitting elements corresponding to a first image area to output light during a first time period, the first time period being determined based on the timing of the rolling shutter and being a period of time during which a first portion of the sensor is exposed for image capture. In some embodiments the light control device 152 is further configured to control a second set of light emitting elements corresponding to a second image area to output light during a second time period, the second time period being determined based on the timing of the rolling shutter and being a period of time during which a second portion of the sensor is exposed for image capture. In some embodiments the first time period includes at least a portion of time which does not overlap the second time period.

In some embodiments the light control device 152 is further configured to control an Nth set of light emitting elements corresponding to an Nth image area to output light during a third time period, said Nth time period being determined based on the timing of the rolling shutter and being a period of time during which an Nth portion of the sensor is exposed for image capture, N being an integer value corresponding to the total number of time periods used by said rolling shutter to complete one full read out of total image area.

In some embodiments the light control device 152 is further configured to control the second set of light emitting elements to be off during said portion of time included in the first period of time which does not overlap said second period of time. In some embodiments the light control device is configured to determine when the first set and said second set of light emitting elements are to be on based on an exposure setting. In some embodiments the light control device is configured to determine when said first set and said second set of light emitting elements are to be on based on an amount of time between read outs of different portions of said sensor. In some embodiments the different sets of light emitting elements in the plurality of light emitting elements are covered with different lenses. In some such embodiments the light control device 152 is further configured to determine which sets of light emitting elements to use based on an effective focal length setting being used by the camera device.

The accelerometer module 122 includes a plurality of accelerometers including accelerometer 1 124, accelerometer 2 126, and accelerometer 3 128. Each of the accelerometers is configured to detect camera acceleration in a given direction. Although three accelerometers 124, 126 and 128 are shown included in the accelerometer module 122 it should be appreciated that in some embodiments more than three accelerometers can be used. Similarly the gyro module 192 includes 3 gyros, 194, 196 and 198, one for each axis which is well suited for use in the 3 dimensional real world environments in which camera devices are normally used. The camera acceleration detected by an accelerometer in a given direction is monitored. Acceleration and/or changes in acceleration, and rotation indicative of camera motion, are monitored and processed to detect one or more directions, of motion e.g., forward camera motion, backward camera motion, etc. As discussed below, the acceleration/rotation indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus drive assembly 134 is, in some embodiments, implemented as a lens drive. The autofocus controller 132 is present in at least some autofocus embodiments but would be omitted in fixed focus embodiments. The autofocus controller 132 controls adjustment of at least one lens position in one or more optical chains used to achieve a desired, e.g., user indicated, focus. In the case where individual drive assemblies are included in each optical chain, the autofocus controller 132 may drive the autofocus drive of various optical chains to focus on the same target.

The zoom control module 140 is configured to perform a zoom operation in response to user input.

The processor 110 controls operation of the camera device 100 to control the elements of the camera device 100 to implement the steps of the methods described herein. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The assembly of modules 118 includes a mode control module which determines, e.g., based on user input which of a plurality of camera device modes of operation are to be implemented. In different modes of operation, different camera modules 131, 133 may and often are controlled differently based on the selected mode of operation. For example, depending on the mode of operation different camera modules may use different exposure times. Alternatively, the scene area to which the camera module is directed and thus what portion of a scene is captured by an individual camera module may be changed as will be discussed below with regard to FIGS. 5 and 34 depending on how the images captured by different camera modules are to be used, e.g., combined to form a composite image and what portions of a larger scene individual camera modules are to capture during the user selected or automatically selected mode of operation. In some embodiments, the operations performed by the processor when executing the instructions from one or more assembly of modules is instead performed by a hardware module which performs the same functionality and is included in the hardware assembly of modules.

The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Having described the general components of the camera device 100 with reference to FIG. 1, various features relating to the plurality of optical chains 130 will now be discussed with reference to FIGS. 2 and 3 which show the camera device 100 from front and side perspectives, respectively. Dashed line 101 of FIG. 2 indicates a cross section line.

Box 117 represents a key and indicates that OC=optical chain, e.g., camera module, and each L1 represents an outermost lens in an optical chain. Box 119 represents a key and indicates that S=sensor, F=filter, L=lens, L1 represents an outermost lens in an optical chain, and L2 represents an inner lens in an optical chain. While FIG. 3 shows one possible implementation of optical chains, as will be discussed below, other embodiments are possible and the optical chains may include one or more light redirection elements in addition to the elements shown in FIG. 3. The lenses of different optical chains may have different shapes, e.g., with round apertures being used for some lenses and non-round apertures being used for other lenses. However, in some embodiments lenses with round apertures are used for each of the optical chains of a camera device.

Figure 2:
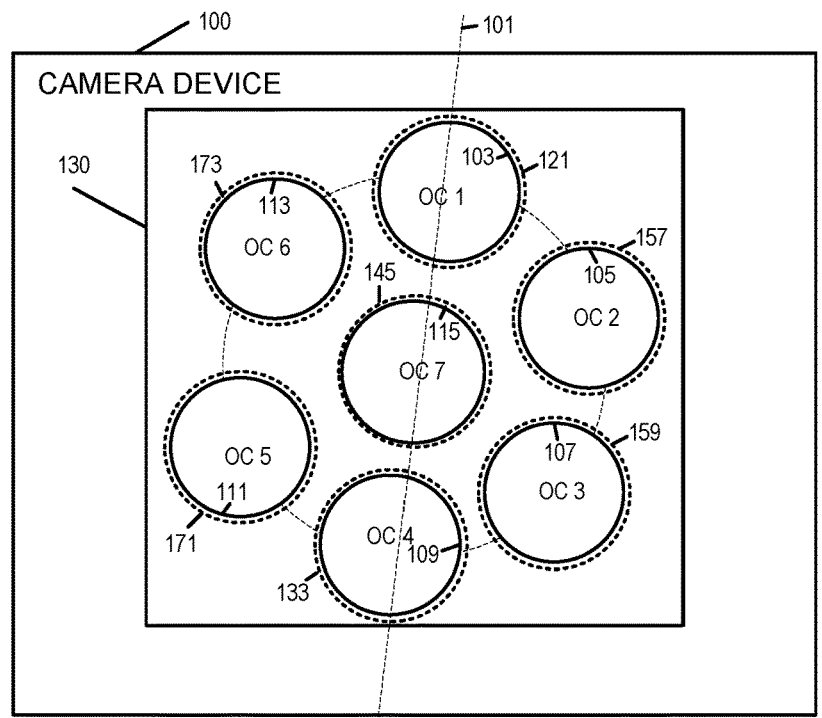
FIG. 2 illustrates a frontal view of an apparatus implemented in accordance with an exemplary embodiment which incorporates multiple optical chains, e.g., camera modules, in accordance with the present invention with lenses which are viewable from the front of the camera.

FIG. 2 shows the front of the exemplary camera device 100. Rays of light 131, which is light toward the front of the camera assembly, shown in FIG. 1 may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chains 130 is mounted. Note that while outer opening shown in FIG. 2 are shown as having circular apertures which are the same size, as will be discussed below different size openings may be used for different optical chains, e.g., depending on the focal length with optical chains having larger focal lengths normally including outer openings with larger apertures than optical chains with small focal lengths.

Figure 3:
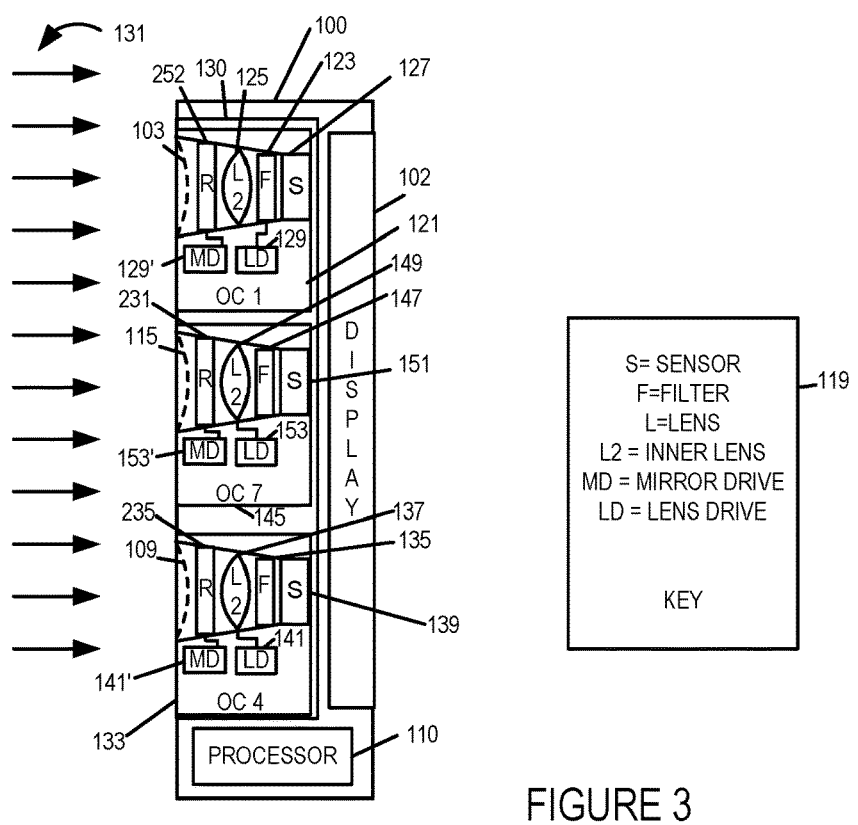
FIG. 3, which is a side view of the exemplary apparatus of FIG. 2, illustrates further details of the exemplary apparatus.

FIG. 3, which shows a side perspective of camera device 100, illustrates three of the seven optical chains (OC 1 121, OC 7 145, OC 4 133) of the set of optical chains 130, display 102 and processor 110. OC 1 121 includes an outer opening 103, a light redirection element 252, e.g., a mirror, an inner lens L2 125, a filter 123 and a sensor 127. In some embodiments the OC 1 121 further includes lens drive (LD) 129 for controlling the position of lens L2 125 for zooming and/or auto focus operation purposes and a mirror drive (MD) 129' for controlling the positioning of the light reflection element 252 as desired to deflect light. The outer opening 103 serves as an aperture of the camera module OC 121, e.g., for entry of light into OC 121. The exposure and read out controller 150 is not shown in the figure but is used for controlling the read out of rows of pixel values form the sensors' 127, 151 and 139 in a synchronized manner, e.g., taking into consideration the scene area being captured by the individual sensors. The LD 129 includes a motor or other drive mechanism which can move the lens, barrel or cylinder housing one or more lenses, or sensor, to which it is connected thereby allowing for an alteration to the light path by moving one or more elements relative to the other elements of the optical chain to which the LD is coupled. While the LD 129 is shown coupled, e.g., connected, to the lens L2 125 and thus can move the position of the lens L2, e.g., as part of a zooming or autofocus operation, in other embodiments the LD 129 is coupled to a cylindrical or barrel shape component which is part of the optical chain or to the sensor 127. Thus, the lens drive 129 can alter the relative position of a lens to the sensor 127, e.g., to change the distance between the sensor 127 and the lens 125 as part of a zooming and/or focus operation. The MD includes a motor or other drive mechanism which can control the relative angle of reflection element 252 allowing for alteration of angle of redirection of incident light.

OC 7 145 includes an outer opening 115, a light redirection element 231, an inner lens L2 149, a filter 147, and a sensor 151. OC 7 145 further includes LD 153 for controlling the position of lens L2 149 and a and a mirror drive (MD) 153' for controlling the positioning of the light reflection element 231. The LD 153 includes a motor or other drive mechanism which can move the lens, barrel, cylinder, sensor or other optical chain element to which it is connected.

OC 4 133 includes an outer opening 109, a light redirection element 235, an inner lens L2 137, a filter 135 and a sensor 139. OC 4 133 includes LD 141 for controlling the position of lens L2 137 and MD 141' for controlling the positioning of the light reflection element 235. The LD 153, 141 and MD 153', 141' include a motor or other drive mechanism and operates in the same or similar manner as the other drives of the other optical chains discussed above. In some embodiments each of the filters 123, 147 and 135 is an infrared (IR) filter. While only three of the OCs are shown in FIG. 3 it should be appreciated that the other OCs of the camera device 100 may, and in some embodiments do, have the same or similar structure and/or may include other elements such as light redirection devices. Thus, differences between the multiple optical chains of the camera device 100 are possible and, in some embodiments, are present to allow for a variety of focal lengths to be supported in a single camera device through the use of multiple optical chains which can be operated in parallel.

FIG. 3 and the optical chains (OCs), also sometimes referred to as camera modules, illustrated therein are illustrative of the general structure of OCs used in various embodiments. However, numerous modifications and particular configurations are possible. While reference to elements of FIG. 3 may be made, it is to be understood that the OCs (camera modules) in a particular embodiment will be configured as described with regard to the particular embodiment and that various different camera modules are often used in single camera device. FIG. 5 and FIG. 13A show optical chains, e.g., camera modules, which include light redirection devices. Such modules can be used alone or in combination with other modules such as the ones shown in FIGS. 3 and 4A or other figures of the present application.

While a filter may be of a particular color or used in some optical chains, filters need not be used in all optical chains and may not be used in some embodiments. In embodiments where the filter is expressly omitted and/or described as being omitted or an element which allows all light to pass, while reference may be made to the OCs of FIG. 3 it should be appreciated that the filter will be omitted in an embodiment where it is indicated to be omitted or of such a nature that it allows a broad spectrum of light to pass if the embodiment is indicated to have a broadband filter. In some embodiments one or more light redirection elements, e.g., mirrors, such as elements 252, 231, 235 shown in FIG. 3, are included in OCs for light to be redirected, e.g., to increase the length of the optical path or make for a more convenient internal component configuration. It should be appreciated that each of the OCs 121, 145, 133, shown in FIG. 3 will have their own optical axis. In the example, each optical axis passes through the outer openings 103, 115, or 109 at the front of the optical chain and passes through the OC to the corresponding sensor 127, 151, 139.

While the processor 110 is not shown being coupled to the LD, and sensors 127, 151, 139 it is to be appreciated that such connections exist and are omitted from FIG. 3 to facilitate the illustration of the configuration of the exemplary OCs.

As should be appreciated the number and arrangement of lens, filters and/or mirrors can vary depending on the particular embodiment and the arrangement shown in FIG. 3 is intended to be exemplary and to facilitate an understanding of various features rather than to be limiting in nature.

The front of the plurality of optical chains 130 is visible in FIG. 2 with the outermost opening of each optical chain appearing as a circle represented using a solid line (OC 1 opening 103, OC 2 opening 105, OC 3 opening 107, OC 4 opening 109, OC 5 opening 111, OC 6 opening 113, OC 7 opening 115). In the FIG. 2 example, the plurality of optical chains 130 include seven optical chains, OC 1 121, OC 2 157, OC 3 159, OC 4 133, OC 5 171, OC 6 173, OC 7 145, which include openings 103, 105, 107, 109, 111, 113, 115), respectively, represented by the solid circles shown in FIG. 2. While the outer opening may be a circular opening in some embodiments, in some other embodiments the entry point for the light into the optical chains has a plastic element covering the opening. The outer openings of the optical chains are arranged to form a pattern which is generally circular in the FIG. 2 example when viewed as a unit from the front. While a circular arrangement is used in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

The overall total light capture area corresponding to the multiple lenses of the plurality of optical chains OC 1 to OC 7, also sometimes referred to as optical camera modules, can, in combination, approximate that of a lens having a much larger opening but without requiring a single lens having the thickness which would normally be necessitated by the curvature of a single lens occupying the area which the lenses occupy.

Figure 7B:
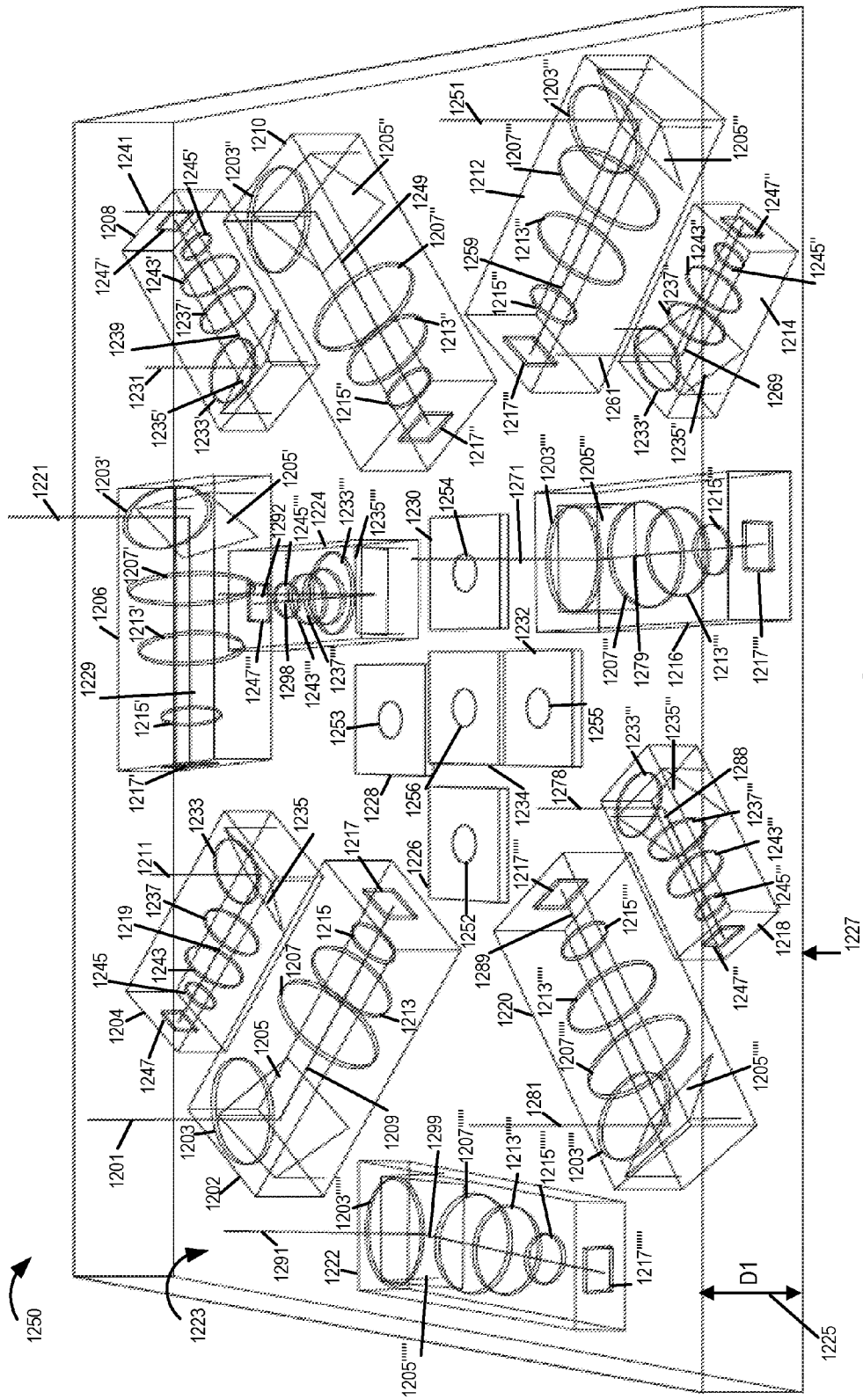
FIG. 7B illustrates a perspective view of a camera device of the type shown in FIG. 6, with the arrangement of various optical chains and elements of the optical chains in the camera device shown in greater detail.

While seven optical chains are shown in FIG. 2, it should be appreciated that other numbers of optical chains are possible. For example, as shown in FIGS. 7A and 7B seventeen camera modules are used in a single camera device in some embodiments. Camera devices including even larger numbers of optical chains are also possible.

The use of multiple optical chains has several advantages over the use of a single optical chain. Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

Given the small size of the optical sensors (e.g., individual pixel elements) the dynamic range, in terms of light sensitivity, is normally limited with the sensors becoming easily saturated under bright conditions. By using multiple optical chains corresponding to different exposure times the dark portions of a scene area can be sensed by the sensor corresponding to the longer exposure time while the light portions of a scene area can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 3 is a cross section perspective of the camera device 100 shown in FIGS. 1 and 2. Dashed line 101 in FIG. 2 shows the location within the camera device to which the cross section of FIG. 3 corresponds. From the side cross section, the components of the first, seventh and fourth optical chains are visible.

As illustrated in FIG. 3 despite including multiple optical chains the camera device 100 can be implemented as a relatively thin device, e.g., a device less than 2, 3 or 4 centimeters in thickness in at least some embodiments. Thicker devices are also possible, for example devices with telephoto lenses, and are within the scope of the invention, but the thinner versions are particularly well suited for cell phones and/or tablet implementations. As will be discussed below, various techniques such as the use of light redirection elements and/or non-circular lenses can be used in conjunction with small sensors, such as those commonly used in handheld cameras, to support relatively large focal lengths, e.g., camera modules of 150 mm equivalent focal length to a full frame DSLR camera, 300 mm equivalent focal length to a full frame DSLR camera or above in a relatively thin camera device format.

As illustrated in the FIG. 3 diagram, the display device 102 may be placed behind the plurality of optical chains 130 with the processor 110, memory and other components being positioned, at least in some embodiments, above or below the display and/or optical chains 130. As shown in FIG. 3, each of the optical chains OC 1 121, OC 7 145, OC 4 133 may, and in some embodiments do, include an outer opening, a light redirection element such as a mirror or prism, a filter F, and a lens L2 which proceed a sensor S which captures and measures the intensity of light which passes through the outer opening serving as the aperture, the lens L2 and the filter F to reach the sensor S. The filter may be a color filter or one of a variety of other types of light filters or may be omitted depending on the particular optical chain embodiment or configuration. In some embodiments the filter is an IR filter.

Note that while supporting a relatively large light capture area and offering a large amount of flexibility in terms of color filtering and exposure time, the camera device 100 shown in FIG. 3 is relatively thin with a thickness that is much less, e.g., $\frac{1}{5}$th, $\frac{1}{10}$th, $\frac{1}{20}$th or even less than the overall side to side length or even top to bottom length of the camera device visible in FIG. 2.

Figure 4A:
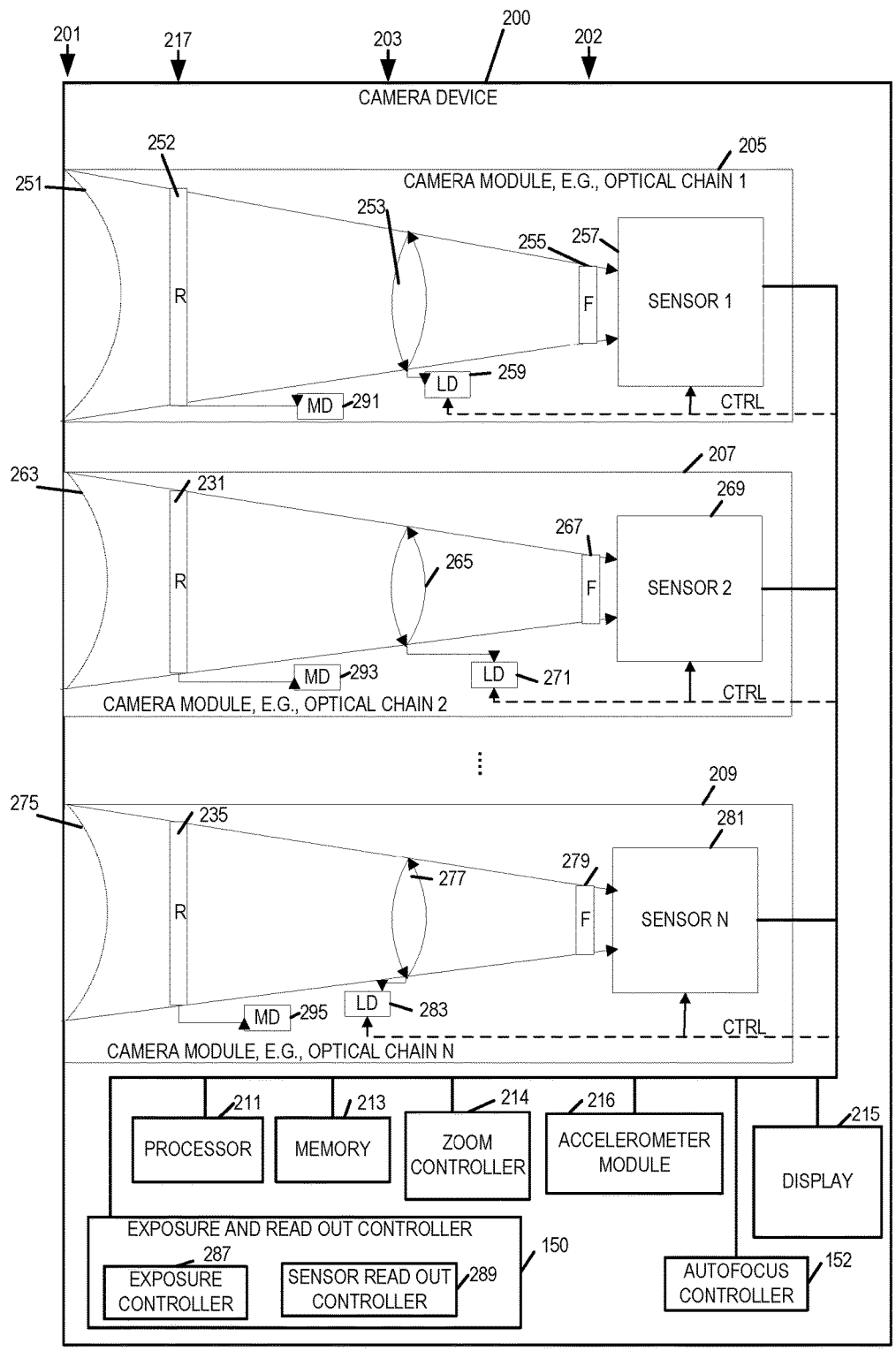
FIG. 4A illustrates a camera device implemented in accordance with another embodiment.

FIG. 4A illustrates a camera device 200 implemented in accordance with the invention. The FIG. 4 camera device 200 includes many or all of the same elements shown in the device 100 of FIGS. 1-3. Exemplary camera device 200 includes a plurality of optical chains (OC 1 205, OC 2 207, ..., OC X 209, a processor 211, memory 213 and a display 215, coupled together. OC 1 205 includes outer opening 251, a light redirection element R 252, a hinge (or mirror) drive MD 291, an inner lens L2 253, a filter 255, sensor 1 257, and LD 259. The MD 291 can be used to move a position of a hinge to which the light redirection device (R) 252, e.g., mirror, is mounted and thus move the mirror to change the scene area to which the module 205 is directed without moving the optical chain 205. Moving (e.g., rotating about a hinge) the mirror 252 to change the scene area to which the module 205 is directed is especially useful in an embodiment where the outer opening 251 is a plane piece of glass or a plastic piece with no optical power as is the case in some embodiments.

Figure 4B:
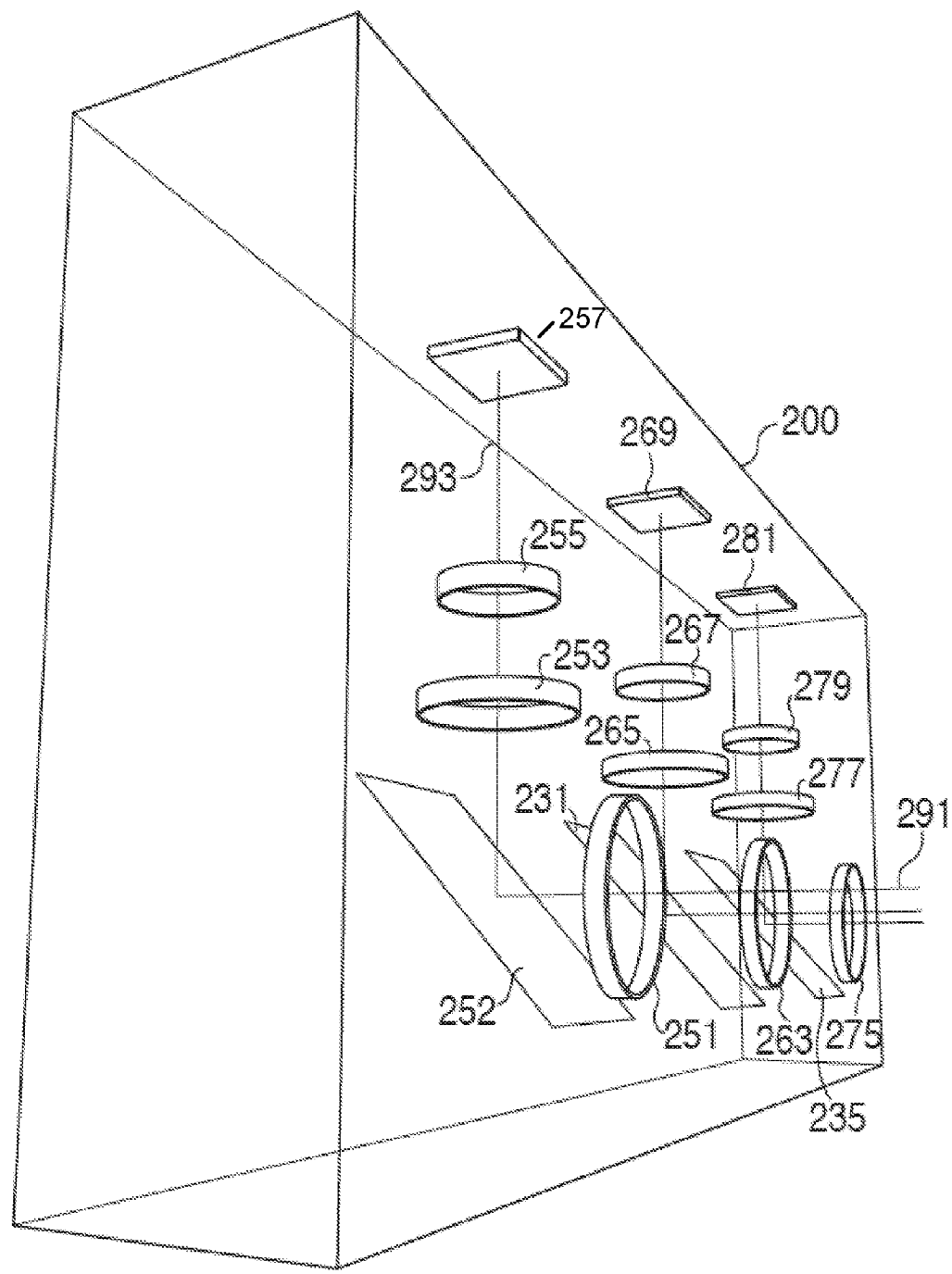
FIG. 4B illustrates the optical chains of the camera device shown in FIG. 4A, as implemented in one particular exemplary embodiment, in greater detail.
Figure 5:
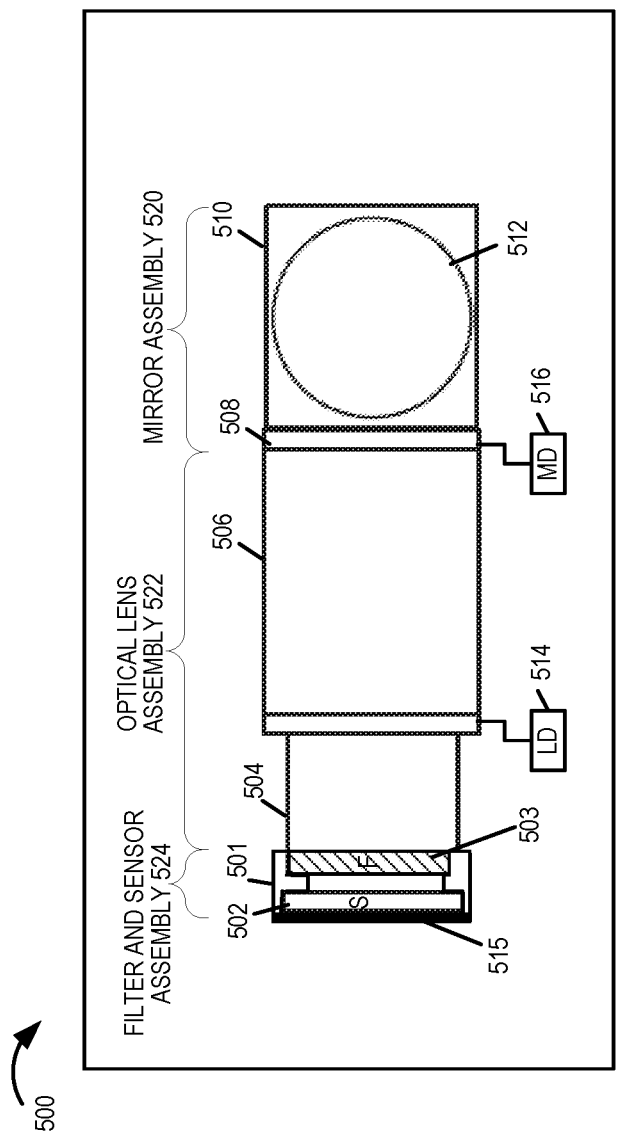
FIG. 5 illustrates an exemplary optical chain, e.g., camera module, which may be used as one of the optical chains included in the camera device of FIG. 1, FIG. 6, FIG. 7 or various other embodiments.

The optical chains shown in FIG. 4A can be arranged in various positions within the camera 200. The elements in FIG. 4B which are the same as those shown in FIG. 4A are identified using the same references numbers and will not be described again. FIG. 4B shows the configuration of the optical chains in an arrangement where light enters via the front or face of the camera 200 and is redirected to sensors 257, 269, 281, of the first through third camera modules respectively, mounted on the inside top portion of the camera housing which forms the outer portion of camera 200.

As can be seen in the FIG. 4B embodiment, light entering in the horizontal dimension is redirected upward in the vertical. For example, light entering through outer opening 251 of the first optical chain 205 is redirected upward by mirror 252 so that it passes though the inner lens 253 and the filter 255 as it travels towards sensor 257. An optical chain such as the first optical chain 205, that has a light redirection element, such as the element 252, can be divided, for purposes of discussion, into two parts, Part A and Part B. Part A consists of all those elements in the optical chain that are in the light path before the light redirection element 252 and Part B consists of all the optical elements (including the image sensor) that are in the light path after the light redirection element. The optical axis of the optical chain 205 as seen from outside the camera is the optical axis 291 of Part A. Light traveling into the optical chain 205 along the optical axis 291 will be redirected upward along the optical axis 293 of Part B of the first optical chain.

In one particular exemplary embodiment of the optical chain 205, Part A contains no optical elements with any optical power, e.g., Part A contains plane glass or filters but no lenses. In this case the optical axis of the optical chain as seen from outside the camera is simply along a light path that gets redirected along the optical axis 293 of Part B by the light redirection element. In some embodiments one or more lenses 253 are included in Part B of the optical chain which have an optical power. Thus, it should be appreciated that in at least some embodiments the outer opening 251 may be implemented as a flat glass plate or relatively flat plastic or glass element which does not protrude from the surface of the camera 200. This reduces the risk of scratches and also reduces the possibly that an outer portion which is covering or forming the opening will get caught when inserting or removing it from a pocket or case as might be the case if the opening is covered by a curved lens protruding from the camera.

It should be appreciated that the optical axis of the second and third camera modules are similar to that of the first optical module 205 and that the components of the optical chains may also be grouped into two parts, Part A which corresponds to components proceeding the mirror of the optical chain and Part B which corresponds to components subsequent the mirror of the optical chain. From the perspective of the optical path of an optical chain, the optical path like the components may be grouped as Part A and Part B with the mirror providing the transition point between Part A of an optical path and Part B of the optical path.

In some but not all embodiments, processor 211 of camera device 200 of FIG. 4A is the same as or similar to processor 110 of device 100 of FIG. 1, memory 213 of device 200 of FIG. 4A is the same as or similar to the memory 108 of device 100 of FIG. 1, the zoom control module 214 of device 200 is the same as or similar to the zoom control module 140 of device 100, the accelerometer module 216 of device 200 is the same as or similar to the accelerometer module 122 of device 100 and display 215 of device 200 of FIG. 4A is the same as or similar to the display 102 of device 100 of FIG. 1.

OC 2 207 includes outer opening 263, light redirection device 231, mirror drive 293, inner lens 265, filter 267, sensor 2 269, and LD 271. OC N 209 includes outer opening 275, light redirection device 235, mirror drive 295, inner lens 277, filter 279, sensor N 281, and LD 283. The exposure and read out controller 150 controls sensors to read out, e.g., rows of pixel values, in a synchronized manner while also controlling the exposure time. In some embodiments the exposure and read out controller 150 is a rolling shutter controller including an exposure controller 287 and a sensor read out controller 289. An autofocus controller 152 is included to control the lens drives 259, 271 and 283 in some embodiments.

In the FIG. 4A embodiment the optical chains (optical chain 1 205, optical chain 2 207, . . . , optical chain N 209) are shown as independent assemblies with the lens drive of each module being a separate LD element (LD 259, LD 271, LD 283), respectively. Each of the LDs shown adjusts the position of the corresponding lens to which it is connected as part of a zooming and/or focus operation. In some embodiments the LD controls the position of a lens and/or sensor in which case the LD is connected to both a lens support mechanism or lens and the sensor.

In FIG. 4A, the structural relationship between the mirror and various lenses and filters which precede the sensor in each optical chain can be seen more clearly than in some of the other figures. While four elements, e.g. an opening, lens (see columns 201 and 203), a light redirection device R (see col. 217), and the filter (corresponding to column 202) are shown in FIG. 4A before each sensor, it should be appreciated that a much larger combinations (e.g., numbers) of lenses, light redirection elements and/or filters may precede the sensor of one or more optical chains with anywhere from 2-10 elements being common and an even larger number of elements being used in some embodiments, e.g., high end embodiments and/or embodiments supporting a large number of filter and/or lens options. Furthermore it should be appreciated that all illustrated elements need not be included in all optical chains. For example, in some embodiments optical chains having relatively short focal lengths may be implemented without the use of a light redirection element being used, e.g., to redirect the light by 90 degrees, since the optical chain with a short focal length can be implemented in a straight but still relatively compact manner given the short focal length.

In some but not all embodiments, optical chains are mounted in the camera device with some, e.g., the shorter focal length optical chains extending in a straight manner from the front of the camera device towards the back. However, in the same camera, longer focal length camera modules may and sometimes do include light redirection devices which allow at least a portion of the optical path of a camera module to extend sideways allowing the length of the optical axis to be longer than the camera is deep. The use of light redirection elements, e.g., mirrors, is particularly advantageous for long focal length camera modules given that the overall length of such modules tends to be longer than that of camera modules having shorter focal lengths. A camera may have a wide variety of different camera modules some with light redirection elements, e.g., mirrors, and others without mirrors. Filters and/or lenses corresponding to different optical chains may, and in some embodiments are, arranged in planes, e.g. the apertures of the outermost lenses may be configured in a plane that extends parallel to the face of the camera, e.g., a plane in which the front of the camera both extends vertically and horizontally when the camera is in a vertical direction with the top of the camera both being up.

FIG. 5 shows an optical chain, e.g., camera module, 500 which is used in various exemplary embodiments. A plurality of optical chains of the type illustrated in FIG. 5 are used in a camera device such as camera 600 discussed in detail below. The camera module 500 is an optical chain that includes an assembly of different elements integrated together to form the camera module. As illustrated, camera module 500 includes a mirror assembly 520, an optical lens assembly 522 and a filter and sensor assembly 524. The mirror assembly 520 of the camera module 500 includes an outer opening 512 which may be covered by a flat glass/plastic plate, a light redirection device, e.g., mirror, 510 positioned behind the opening 512, and a mirror hinge 508. The mirror hinge 508 is coupled to the mirror drive (MD) 516. The optical elements assembly 522 of the camera module 500 includes a first cylindrical module portion 506 and a second cylindrical module portion 504, with the optical elements assembly 522 being coupled to a lens drive 514. The filter and sensor assembly 524 of the camera module 500 includes a filter mounted on a filter mount 501 and a sensor 502 placed on a mounting board 515. Light enters the optical chain 500 via the opening 512 and is redirected by the mirror 510 so that it reaches the sensor 502 at the back of the optical chain. The first and second cylindrical portions 504, 506 can house one or more lenses and in some cases filters as well as other optical components through which light may pass before reaching the sensor 502. While the mirror 510 is normally used to redirect light 90 degrees so that light entering through the opening 512 (which may be positioned on the face of the camera) along it's optical axis will be redirected along the optical axis of Part B of the optical chain 500 so that is travels towards the side of the camera allowing for the optical chain 500 to effectively use the side to side distance of the camera device in which the optical chain 500 is mounted, the mirror drive 516 may move the position of the hinge 508 and thus the mirror 510 to alter the angle of redirection so that it varies from 90 degrees. Thus, the direction in which the optical chain 500 effectively points may be altered by moving all or a portion of the hinge 508 and mirror 510. In some embodiments, the axis of the hinge is perpendicular to the Part B of the optical axis and parallel to the place of the front face of the camera 600. In some embodiments, the opening 512 is covered with a plane glass with no optical power.

The MD 516 may be implemented using a motor or other mechanical mechanisms which can be used to drive or change the position of the mirror 510 and/or hinge 508 which connects the mirror to the other components of the camera module such as cylindrical portion 506.

The cylindrical or barrel portions 504, 506 of the optical elements assembly 522 may be moved by lens drive 514 so that they slide relative to each other, e.g., barrel portion 504 may be moved so that it moves further into or out of the barrel portion 506 thereby altering the distance from the opening 512 to the sensor 502 as part of a focus or zoom operation.

It should be appreciated that the optical chain 500 allows for relatively long optical chains to be positioned in a camera device which has a depth which is less than the overall length of the optical chain 500. The camera module 500 is particular well suited for implementing camera devices which include multiple optical chains but which are still intended to be relatively thin to facilitate storage in a pocket or other storage device.

Figure 6A:
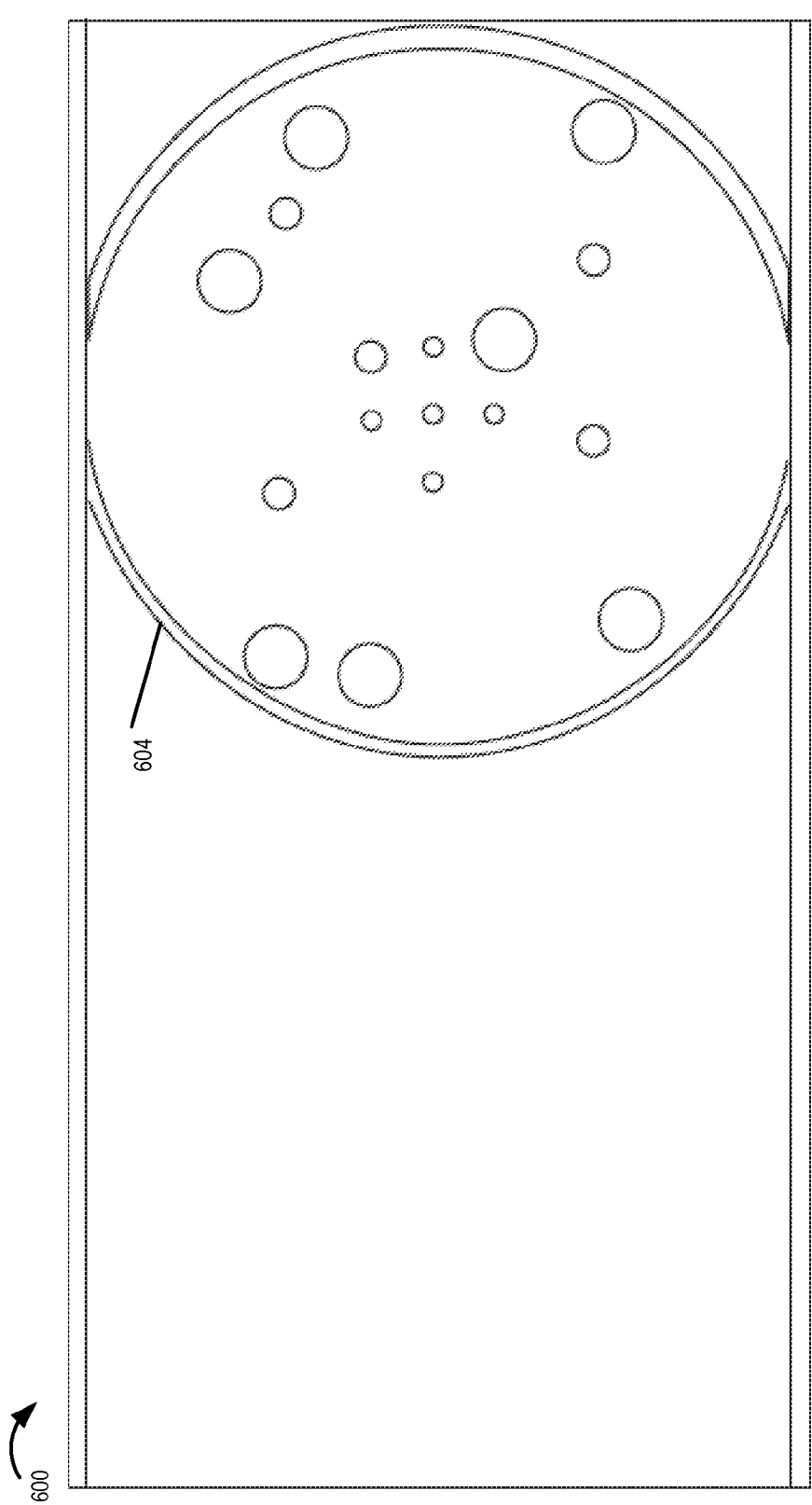
FIG. 6A is an illustration of an exemplary camera including multiple optical chains in accordance with one feature of the invention showing the arrangement of the lenses of individual camera modules

FIG. 6A is a frontal view of the camera device 600 and the optical chain arrangement of the camera device with the 15 outer openings being clearly visible as circles in the lens area 604. Note that the diameter of the smallest lenses is "d" which correspond to the camera modules having the smallest focal length, the medium focal length modules have a diameter 2d, and the camera modules having the largest focal length have a diameter 4d. This results in the camera modules having the same 'f stop' or 'f number' given the focal length relationship f1 being ¼ the largest focal length (f3) and one half the focal length of the medium focal length f2 of the camera modules having a medium focal length. The 'f number' is the ratio of the focal length to the aperture diameter and determines the diffraction limit of the camera modules. The smaller the f number, the less likely it is that the camera module will be diffraction limited. Smaller f numbers usually corresponded to larger optical complexity in the camera module. Small lenses with 5 or 6 molded plastic elements these days can be manufactured in a cost effective manner for f numbers around 2.4. Accordingly, in some embodiments plastic lenses made of multiple plastic elements are used.

Figure 6B:
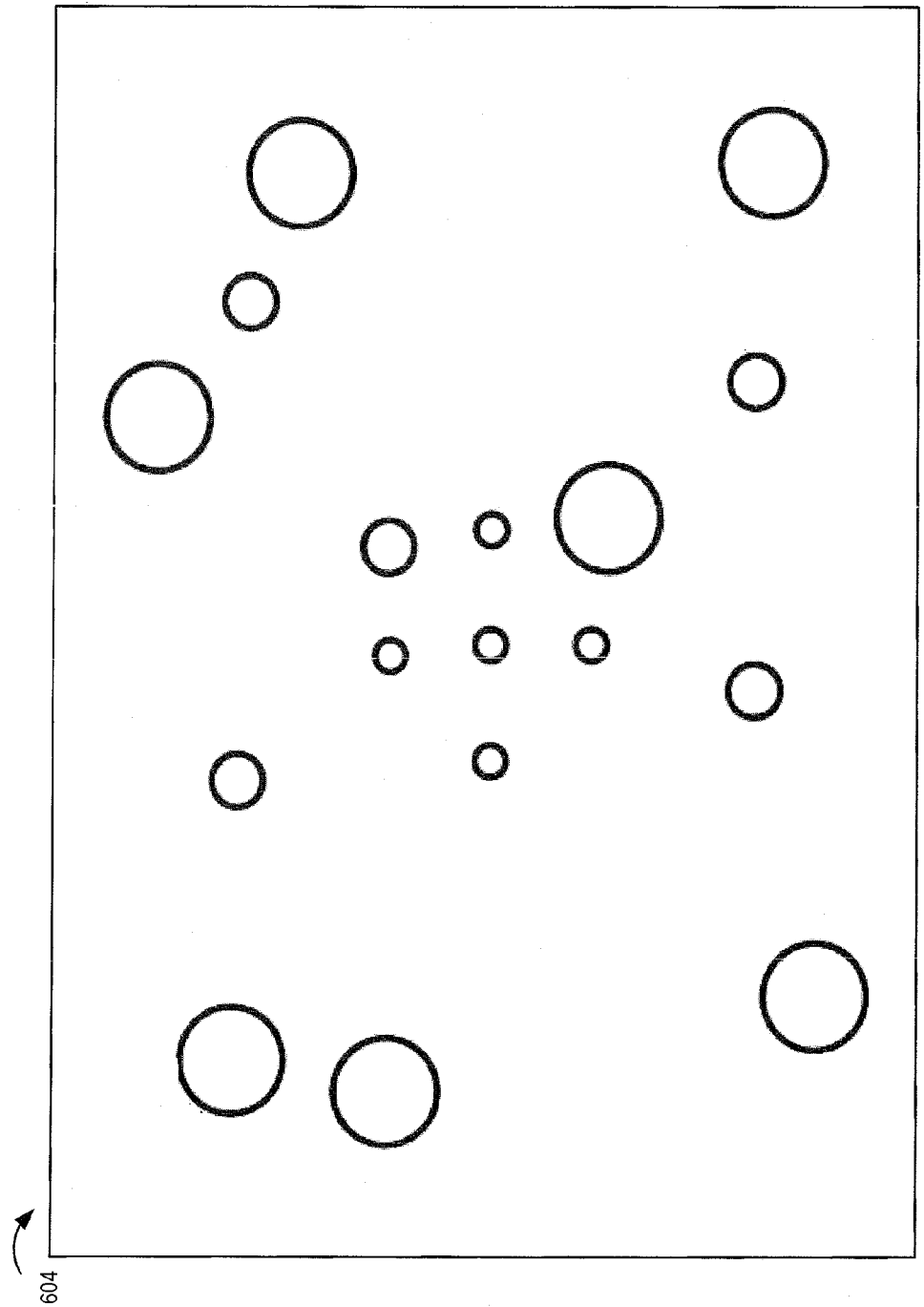
FIG. 6B illustrates the arrangement of lenses of individual optical chains in the camera device shown in FIG. 6A allowing for better appreciation of the arrangement of lenses on the front of the camera device.

FIG. 6B shows an enlarged version of the optical chain arrangement of the camera 600 as viewed from the front. In FIG. 6B the outer openings of the three different sizes can be clearly seen with the largest diameter openings corresponding to camera modules having the largest focal length and thus zoom, e.g., magnification.

FIG. 7A is a diagram 1200 showing how the 17 optical chains, e.g., camera modules, of the camera 600 can be arranged within the body of the camera 600. The seven optical chains 1202, 1206, 1210, 1212, 1216 1220, 1222 with the largest lenses and largest supported focal lengths are implemented using optical chains of the type shown in FIG. 5. Similarly, the five camera modules 1204, 1208, 1214, 1218, 1224 with the medium diameter lenses and medium supported focal lengths are also implemented using optical chains of the type shown in FIG. 5. The five optical chains 1226, 1228, 1230, 1232 and 1234 having the smallest diameter outer openings, e.g., light entrance openings, and smallest focal lengths are implemented using optical chains which do not use mirrors and extend straight toward the back of the camera. Optical chains of the type used in the FIG. 3 embodiment may be used for the optical chains 1226, 1228, 1230, 1232 and 1234. However, it should be appreciated that optical chains of the type illustrated in FIG. 5 may be and in some embodiments are, used as the optical chains 1226, 1228, 1230, 1232 and 1234.

From the FIG. 7A example which may be considered as a frontal view with the front of the camera housing removed to allow viewing of the camera modules, it can be seen how a larger number of camera modules can be incorporated into a single camera device 600 allowing for the simultaneous and/or synchronized capture of multiple images of the same or different portions of a scene area using a single camera. The camera device can then combine multiple images to generate a composite image having image attributes and/or qualities such as a number of pixels which exceeds that possible using a single one of the camera modules of the camera 600.

FIG. 7B illustrates a perspective view 1250 of the camera device 600 showing the arrangement of various optical chains in the camera device and the elements of the optical chains in the camera device in greater detail. Thus FIG. 7B presents a more detailed illustration of the plurality of optical chains (OCs) 1202, 1204, 1206, 1208, 1210, 1212, 1214, 1216, 1218, 1220, 1222, 1224, 1226, 1228, 1230, 1232 and 1234 having various corresponding focal lengths as discussed with regard to FIG. 7A in detail.

As illustrated in FIG. 7B, the camera 600 has a depth D1 which represents the thickness of the camera 600 from the front surface of the camera (indicated by arrow 1223) to the back/rear surface of the camera (indicated by arrow 1227). While not shown in the FIG. 7B in some embodiments the camera device 600 includes the same or similar elements as the camera device of FIGS. 1 and/or 4A.

In some embodiments the elements included in the optical chains 1202, 1206, 1210, 1212, 1216, 1220, 1222, 1204,

1208, 1214, 1218, 1224 are similar to those discussed above with regard to FIGS. 4B and 5 while the elements included in the optical chains 1226, 1228, 1230, 1232 and 1234 are similar to those discussed above with regard to FIG. 3. In the embodiment of FIG. 7B each OC uses a round outer opening.

The OC 1202 includes an outer opening 1203, a light redirection device 1205, e.g., mirror, positioned behind the opening 1203, a first inner lens 1207, a second inner lens 1213, a filter 1215 and a sensor 1217. As discussed earlier in some embodiments the outer opening is covered by a flat glass plate or a flat plastic element. In some embodiments the OCs 1202, 1206, 1210, 1212, 1216, 1220, 1222 have the same focal length (largest focal length compared to other OCs in FIG. 7B) and use similar elements such as the mirror, filter, sensor etc. Accordingly, the elements corresponding to OCs 1206, 1210, 1212, 1216, 1220, 1222 have been identified using the same reference numerals used for identifying similar elements in the OC 1202 but with the reference numbers in these OCs followed by a prime ('), double prime ("), triple prime ("') etc. For example, OC 1206 includes an outer opening 1203', a light redirection device 1205', e.g., mirror, positioned behind the opening 1203', a first inner lens 1207', a second inner lens 1213', a filter 1215', and a sensor 1217'. The OC 1210 includes an outer opening 1203", a light redirection device 1205", a first inner lens 1207", a second inner lens 1213", a filter 1215", and a sensor 1217". The OC 1212 includes an outer opening 1203''', a light redirection device 1205''', a first inner lens 1207''', a second inner lens 1213''', a filter 1215''', and a sensor 1217'''. The OC 1216 includes an outer opening 1203'''', a light redirection device 1205'''', a first inner lens 1207'''', a second inner lens 1213'''', a filter 1215'''', and a sensor 1217''''. The OC 1220 includes an outer opening 1203''''', a light redirection device 1205''''', a first inner lens 1207''''', a second inner lens 1213''''', a filter 1215''''', and a sensor 1217'''''. The OC 1222 includes an outer opening 1203'''''', a light redirection device 1205'''''', a first inner lens 1207'''''', a second inner lens 1213'''''', a filter 1215'''''', and a sensor 1217''''''.

Similarly the elements corresponding to OCs 1204, 1208, 1214, 1218, 1224 which have the same focal lengths (intermediate) have been identified using the same reference numerals. The OC 1204 includes an outer opening 1233, a light redirection device 1235, e.g., mirror, positioned behind the opening 1233, a first inner lens 1237, a second inner lens 1243, a filter 1245, and a sensor 1247. Optical chain 1208 includes an outer opening 1233', a light redirection device 1235', e.g., mirror, positioned behind the opening 1233', a first inner lens 1237', a second inner lens 1243', a filter 1245', and a sensor 1247'. OC 1214 includes an outer opening 1233", a light redirection device 1235", a first inner lens 1237", a second inner lens 1243", a filter 1245", and a sensor 1247". OC 1218 includes an outer opening 1233''', a light redirection device 1235''', a first inner lens 1237''', a second inner lens 1243", a filter 1245''', and a sensor 1247''' and the OC 1224 includes an outer opening 1233'''', a light redirection device 1235'''', a first inner lens 1237'''', a second inner lens 1243'''', a filter 1245'''', and a sensor 1247''''.

As discussed with regard to FIG. 4B, an optical chain such as the optical chain 1202 (or OCs 1206, 1210, 1212, 1216, 1220, 1222, 1204, 1208, 1214, 1218, 1224), that has a light redirection element, such as the element 1205, can be divided, for purposes of discussion, into two parts. The optical axis of the optical chain 1202 as seen from outside of the front of the camera is the optical axis of a first part 1201 (entering the OC from the front 1223 of the camera 600 via the outer opening 1203). Light traveling into the optical chain 1202 along the optical axis is redirected by the redirection element 1205 and traverses a second part 1209 of the first optical chain and reaches the sensor 1217. Similarly, the optical axis of the optical chain 1204 includes a first part 1211 and a second part 1219 after light redirection by the redirection element 1235, the optical axis of the optical chain 1206 includes a first part 1221 and a second part 1229, the optical axis of the optical chain 1208 includes a first part 1231 and a second part 1239, the optical axis of the optical chain 1210 includes a first part 1241 and a second part 1249, the optical axis of the optical chain 1212 includes a first part 1251 and a second part 1259, the optical axis of the optical chain 1214 includes a first part 1261 and a second part 1269, the optical axis of the optical chain 1216 includes a first part 1271 and a second part 1279, the optical axis of the optical chain 1218 includes a first part 1278 and a second part 1288, the optical axis of the optical chain 1220 includes a first part 1281 and a second part 1289, the optical axis of the optical chain 1222 includes a first part 1291 and a second part 1299, and the optical axis of the optical chain 1224 includes a first part 1292 and a second part 1298.

The other optical chains OCs 1226, 1228, 1230, 1232 and 1234 (smallest focal length OCs) while each having an outermost opening 1252, 1253, 1254, 1255, and 1256 respectively through which light enters, the OCs 1226, 1228, 1230, 1232 and 1234 do not have light redirection elements in the FIG. 7B example. While not shown in FIG. 7B the OCs 1226, 1228, 1230, 1232 and 1234 each has an optical axis which is perpendicular to the front face 1223 of the camera 600.

The function of the various elements of an OC such as the outer openings, inner lenses, mirror, filters and sensors, has been discussed earlier, for example in the discussion of FIGS. 4B and 5. Since the function of the elements of the OCs shown in FIG. 7B is the same or similar to that discussed with regard to FIGS. 4A-4B and 5, the discussion will not be repeated.

Light enters each of the OCs 1202, 1206, 1210, 1212, 1216, 1220, 1222, 1204, 1208, 1214, 1218, 1224 via their respective outer opening and is redirected by their respective redirection elements so that it reaches the respective sensors at the back of each of the optical chains. In many cases the outer opening through which the light enters the OC is referred to as the entrance pupil via which the light enters. For example, light entering through outer opening 1203 of the optical chain 1202 (e.g., from the front 1223 of the camera 600 as indicated by the first optical axis 1201) is redirected by mirror 1205 so that it passes through the first inner lens 1207, the second inner lens 1215 and the filter 1213 as it travels towards sensor 1217. More or less number of elements, e.g., lenses, filters etc., may be included in each of the OCs in some embodiments. Different optical chains may use different lenses while still using a sensor of the same shape and/or resolution as the other optical chains in the camera device 600.

It should be appreciated that the light redirection elements, e.g., such as a hinged mirror or other light redirection device such as a prism, positioned behind the entrance pupil or opening of an OC can be moved and/or rotated which results in changing of the optical axis of the OC seen from outside the outer openings of the corresponding OC. That is the optical axis of an optical chain as seen from outside the camera (discussed above as the optical axis of a first part such as optical axes 1201, 1211, 1231 etc.) can be changed by controlling the light redirection elements of the corresponding OC. Thus it should be appreciated that while in FIG. 7B example the optical axes 1201, 1211, 1221, 1231, ... 1298, 1299 appear to be parallel, in some embodiments by controlling the light redirection element such as the mirror placed behind the outer opening in the corresponding optical chains, the optical axes can be changed such that the optical axes of one or more OCs are not parallel to each other. The ability to change the optical axis of the optical chain by controlling the movement of a mirror, provides the same effect as if the camera is being pointed in a given direction, e.g., to take pictures in that direction, and thus provides the ability to capture images from different perspectives without actually moving the camera device.

In some embodiments the camera 600 includes a processor (e.g., processor 110, 211) configured to generate a composite image by combining at least a first and a second image. In some embodiments the processor is configured to generate the composite image from first, second, third, fourth, fifth and sixth images. In some embodiments the processor is configured to generate the composite image from the first, second, third, fourth, fifth, sixth and seventh images. In some embodiments the processor is further configured to control storage of the generated composite image in the device memory, e.g., memory 108, and/or output of the composite image on a display, e.g., display 102, and/or transmission of the captured images or the composite image to another device via an interface such as interface 114.

Figure 8:
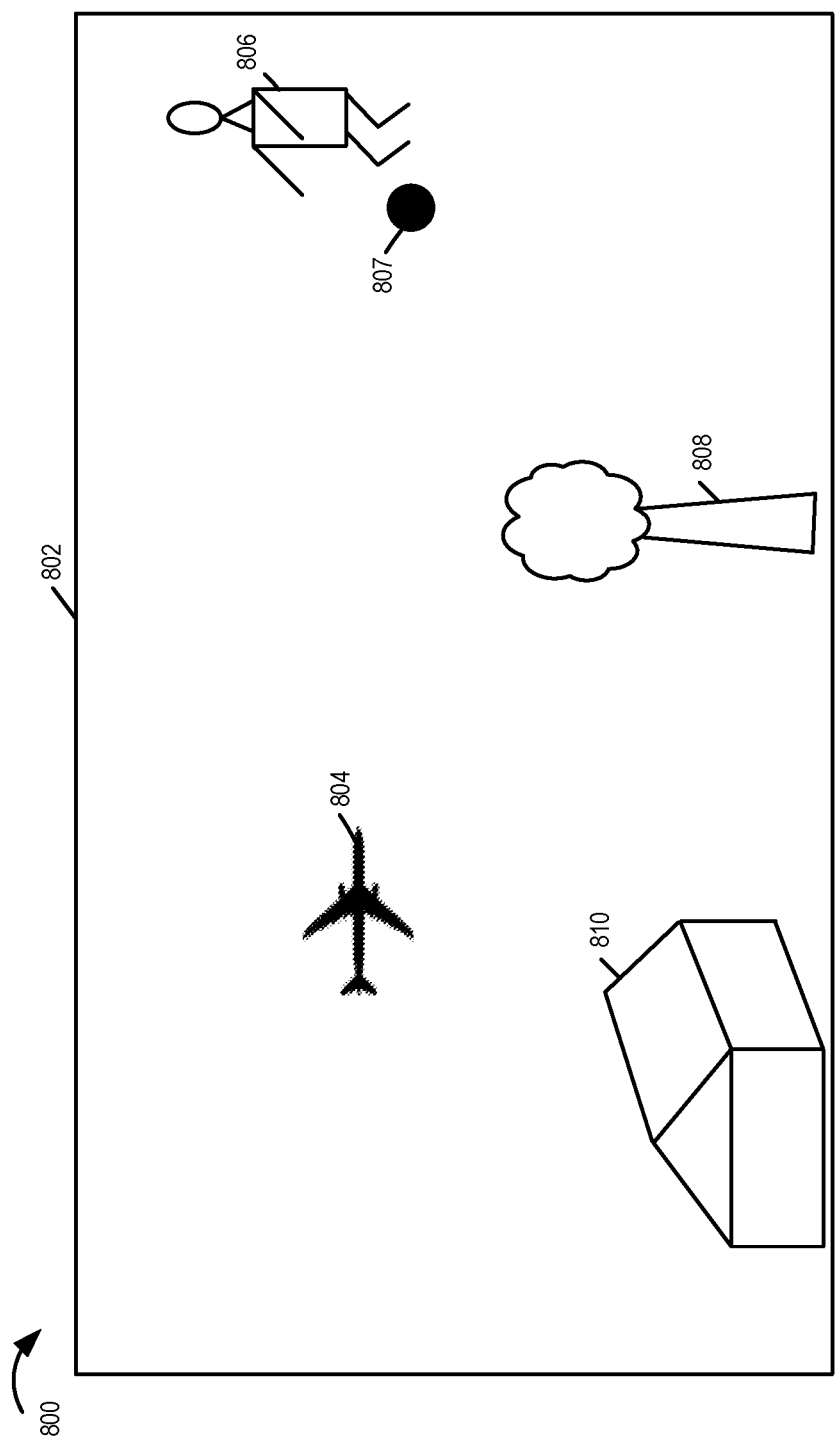
FIG. 8 shows an exemplary scene including a scene area which may have its image captured by camera modules of a camera implemented in accordance with one or more embodiments of the invention.

FIG. 8 is a drawing 800 illustrating an exemplary scene area 802 which may have all or portions of its image captured by camera modules of a camera implemented in accordance with one or more embodiments of the invention. Scene area 802 includes multiple objects at least some of which are stationary while others are in motion. In the example, the scene area 802 includes an airplane 804, a person 806, a ball 807, a tree 808 and a house 808. Each of the objects in the scene 802 may have a different corresponding depth in the scene 802.

Figure 9:
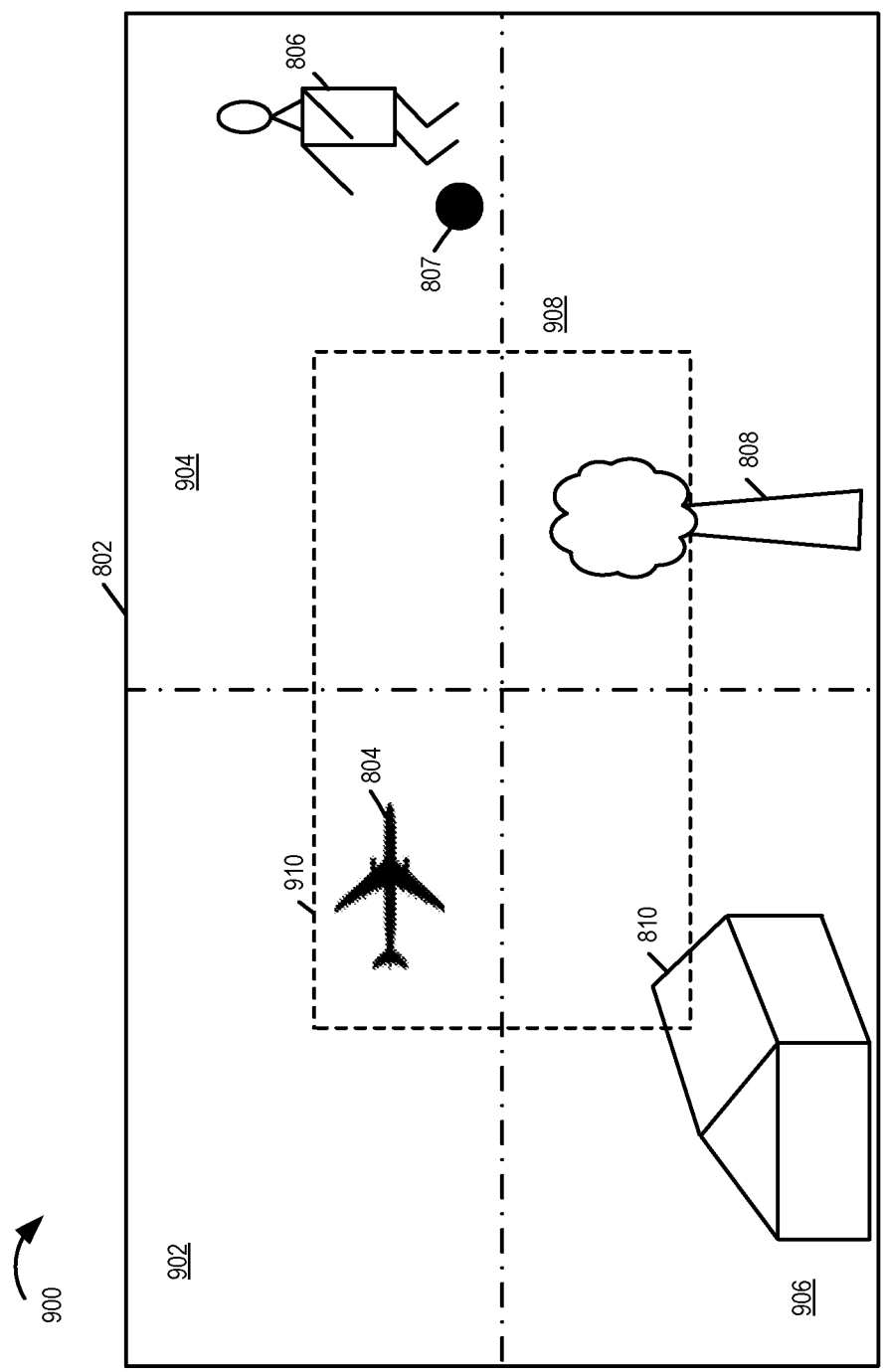
FIG. 9 shows how different camera modules of a camera including multiple camera modules may capture different portions of the scene area of interest shown in FIG. 8.

FIG. 9 is a drawing 900 illustrating conceptually how different optical chains, e.g., camera modules, of a camera, such as the camera device 600 of FIG. 6 which includes multiple optical chains (as shown in FIGS. 7A and 7B), some of which have different focal lengths can capture different size portions of a scene area 802. The different capture sizes corresponding to the various different camera modules correspond to field of view (FOV) of the respective camera modules in some embodiments.

For purposes of discussion, the capture and combining of images corresponding to different scene areas will be explained using the camera device 600 by referring to FIG. 7A which shows the arrangement of optical chains in camera 600. Consider for purposes of discussion that the camera device 600 includes the 17 modules arranged as shown in FIG. 7A. As previously discussed in the FIG. 7A example, three different focal lengths, f1, f2 and f3 are used where f1<f2<f3; f1 is ½ f2; and f2 is ½ f3.

For purposes of discussion the first through seventh camera modules 1202, 1206, 1210, 1212, 1216 1220, 1222, respectively, are the modules with the largest lenses (and thus largest apertures in various embodiments) and largest supported focal lengths (f3). For simplicity in the discussion below, it is further assumed that the distances between the various camera modules is much smaller than the distance between the camera and all the objects in the scene. This is however not a limitation of the described invention but meant only to make the explanation easier to follow.

The five medium sized camera modules which are the eighth through 12th camera modules correspond to reference numbers 1204, 1208, 1214, 1218, 1224, respectively and have medium diameter lenses and medium supported focal lengths (f2).

The five camera modules which are the 13th through 17th camera modules correspond to reference numbers 1226, 1228, 1230, 1230 and 1234 and have the smallest diameter lenses and smallest focal length (f1).

It should be appreciated that the camera modules with the largest focal length f3 will have a relatively smaller field of view in comparison to camera modules with smaller focal lengths and capture smaller portion of a scene area of interest given that they provide the greatest magnification. Assuming that camera modules of the different focal lengths use sensors with the same total pixel count, the modules with the larger focal length (f3) will provide an image with a higher pixel to scene area ratio since more pixels will be used to capture an image of a smaller scene area than will be the case with the medium (f2) and small focal length (f1) camera modules.

It should be appreciated that given the difference in magnification between the modules with different focal lengths (f1, f2, f3) the scene area captured by the small focal length (f1) camera modules will correspond to portion of the scene area of interest which is approximately 16 times the size of the portion the scene area of interest which is captured by the camera modules with the largest (f3) focal length. The portion of the scene area of interest captured by camera modules with the intermediate focal length (f2) will be 4 times the size of the portion of the scene area of interest captured by the camera modules with the largest focal length (f3) and ¼ the size of the portion of the scene area of interest captured by the camera modules with the smallest focal length (f1).

The relationship between the scene areas captured by camera modules corresponding to the f1 and f2 focal lengths can be appreciated in the context of the FIG. 9 example which shows 7 distinct scene areas. In some embodiments f=35 mm and f2=70 mm.

In the FIG. 9 example scene area of interest is identified by reference 802 as used in FIG. 8. The scene area 802 correspond to the full scene area of interest also shown in FIG. 8. For purposes of explanation consider that the scene area 802 is captured by optical chains having the focal length f1, i.e., by smaller focal length optical chains. Assume for discussion purposes that (f1) camera module 1228 is used to capture the scene area 802 represented by the largest rectangle in FIG. 9. Note that the actual image captured by 1228 may be of a slightly larger scene area to ensure that the scene area of interest is captured.

Further consider that f2 camera module 1204 is used to capture a second scene area 902 which is represented by the rectangle in the top left corner in FIG. 9, that (f2) camera module 1208 is used to capture a third scene area 904 represented by the rectangle in the top right corner in FIG. 9, that (f2) camera module 1218 is used to capture a fourth scene area 906 represented by the rectangle in the bottom left corner in FIG. 9, that (f2) camera module 1214 is used to capture a fifth scene area 908 represented by the rectangle in the bottom right corner in FIG. 9 and that (f2) camera module 1224 is used to capture sixth scene area 910 represented by the rectangle with dashed lines in the center portion. Again as with the capture of the other scene areas, the actual images captured by the modules 1204, 1208, 1218, 1214 and 1224 may be of slightly larger scene areas to ensure that the respective scene areas are fully contained in the captured images.

Note that the relative position of the outer openings of the camera modules shown in drawing 1200 are known and fixed in some embodiments. However, in some embodiments the modules 1204, 1208, 1218, 1214 and 1224 are the same or similar in there elements and function to the module 500 in FIG. 5 which includes a mirror 510 that can be driven, e.g., moved or rotated by the hinge (mirror) drive 516 to change the angle of the mirror 510. While the mirror drive 516 can rotate the mirror around the hinge axis and thus change its angle, the hinge 508 prevents motion in other directions and thus the optical axis (outside the camera) rotates in a plane perpendicular to the axis of the hinge. When the mirror 510 is at a 45 degree angle, the light entering the opening 512 along it's optical axis is deflected 90 degrees into the optical axis of Part B of the module 500. While we describe here a mirror 510 that is hinged and can rotate along an axis, in some other embodiments the place of the mirror is moved to a different plane such that this motion is not constrained to be rotation along any fixed axis. In this case the optical axis of the camera module can be made to point in any desired direction (towards any point in the scene of interest).

While some modules use mirror that are movable and hinged, in other embodiments one or more of the camera modules are implemented with fixed position mirrors allowing the moveable hinge 508 and mirror drive 516 to be omitted. For example, in one embodiment the camera modules used to capture the full scene area of interest have fixed mirrors while the camera modules used to capture small portions of the scene area of interest each include a movably hinged mirror. While combinations of camera modules with some having fixed mirrors and others having movable mirrors can be used, in at least one embodiment each of the multiple camera modules included in an exemplary camera device have movable mirrors.

The mirror/hinge drive 516 is controlled by the processor 110 depending on the particular mode of camera operation. Thus, when a user selects a first mode of operation one or more camera modules may have their mirrors at a first angle while during another mode of operation, e.g., a module in which images are to captured and combined as shown in FIG. 34, one or more camera modules will have their mirror driven to a different position under control of the processor 110. The particular mode of camera device operation may be determined based on user input by the processor 110 operating under control of the mode control module 111 or directly by the mode control module 111 when the mode control module is implemented in hardware.

If mirrors in each of 1204, 1208, 1218, 1214 and 1224 are at 45 degrees, each module looks directly out of the front face of the camera and their optical axes are all parallel. In this case each of the modules will take an image of the same scene area, e.g., the scene area 910 of FIG. 9. To capture an image of the second scene area with module 1204, the hinged mirror 510 of module 1204 is adjusted so that the optical axis of camera module 1204 points towards the center of the second scene area 3206. Note that the module 1204 is positioned in the camera 1200 in such a manner that as the mirror is rotated/moved relative around the hinge, the location in the scene area of interest 802 that the optical axis points to moves along the diagonals of the rectangle 802. Similarly, the mirror for camera module 1214 is adjusted to capture the fifth scene area. Note that in FIGS. 7A and 7B, camera modules 1204, 1214 are arranged proximate, e.g., along or adjacent, one diagonal while camera modules 1208, 1218 are located proximate, e.g., along or adjacent, the other diagonal. Rotating the mirror in 1214, e.g., changing the angle and thus incline of the mirror, makes the module's optical axis move along the corresponding diagonal. Mirrors of modules 1208 and 1218 are similarly angled, e.g., rotated, to capture images of the other scene areas respectively. The module 1224 used to capture the sixth image area 910 points at the center of the scene area of interest 802 so it's mirror is maintained at 45 degrees.

It should be appreciated from the above discussion that it is particularly beneficial to have at least some camera modules arranged along diagonals. These modules have the Part B of their optical axis parallel to one of the two diagonals. Thus, the arrangement of modules 1210, 1220, 2202, 1212 with the largest apertures along diagonals and also the arrangement of medium aperture modules 1204, 1214, 1208, 1208 along the same diagonals but offset from the other modules for space reasons, is an intentional design choice because it facilitates image capture and combining in some embodiments and modes of operation.

Based on the overlapping scene areas, e.g., 3210 and 3204 a depth map is generated, e.g., by the processor included in the camera in some embodiments. In some embodiments the depth of an object in the scene can be determined by examining the relative positions of an object in the images captured by different modules. In at least some embodiments the depth map is used, e.g., in combination with information about the relative position of the outer opening of the different optical chains and/or optical axis of the optical chains in combining images captured by the different optical chains to form a composite image. The use of the depth information in the generation of the composite image allows for the correction of parallax, perspective and/or other image distortions that may occur or which are present in the images. While depth map may be generated using images captured by camera modules in some embodiments, in other embodiments a depth map may be generated using other techniques, e.g., using depth information generated using a depth sensing equipment and/or using a LIDAR. Thus it should be appreciated that a depth map corresponding to a scene area may be obtained in a variety of ways.

In the FIG. 9 example, 6 distinct scene areas are shown for purposes of explaining the invention. Each of the 6 scene areas may be, and in some embodiments is, captured by a different optical chain of the camera device 600 shown in drawing 1200 prior to being combined. The camera modules, as will be discussed below, can capture images at the same time, e.g., in parallel. However, in some embodiments as will be discussed below where rolling shutters are used the camera modules are controlled to capture portions of the scene area of interest in a synchronized manner so that all the different camera modules which capture a given portion of a scene area of interest will capture the given portion at the same time.

It should be appreciated that by combining images corresponding to the different scene area portions shown in FIG. 9 to generate a composite image, it is possible to generate a composite image with four times the pixel count of a single image sensor. For example, if each of the image portions is captured by a camera module using an 8 mega pixel sensor, the composite image corresponding to the scene area of interest shown in FIG. 9 would have an overall pixel count of 32 megapixels since the second, third, fourth and fifth scene area would each be captured by a different 8 megapixel sensor and thus contribute 8 megapixels to the composite image. The actual resolution could be slightly lower if the captured images are slightly larger than the corresponding scene areas.

While the sensors used to capture the first and fourth scene areas are not likely to result in an increase in the overall pixel count of the composite image since they correspond to the same image area as that captured by the combination of sensors used to capture the second, third, fifth and sixth scene areas, they provide for increased light capture than would be possible without the use of the f1 lenses and also provide important information which allows for the generation a depth map and which provide images of the overall scene area which can be used in aligning and stitching together the images corresponding to the second, third, fifth and sixth scene areas as part of the process of generating the composite image.

In some embodiments the large focal length (f3) camera module, e.g., 1216, is used to capture the image of the center portion of the area of interest such that its center coincides with the center of the image area of interest. Since practically most lenses have the least aberrations and best image quality at the center of their field of view, this ensures that the center of the scene area of interest is imaged at high quality by the camera module of large focal length capturing center portion. The imaging of the scene area corresponding to the center portion of the scene of interest 802 also increases the total amount of light energy captured at the center of the scene area of interest. This allows the composite image generated from the captured images to have its best quality (high resolution and minimum noise) at the center of the scene area of interest.

FIG. 9 and the image portions, e.g., the scene areas, shown therein will be used in explaining how rolling shutters corresponding to different camera modules can be controlled in a coordinated manner to facilitate combining of images captured by different camera modules in a way that reduces or minimize motion related (camera or subject related) distortions that may be introduced if each of the camera module sensors were independently (asynchronously) operated to capture the image portions. The read out from the sensors of the camera modules in a coordinated manner helps in minimizing distortions due to uncoordinated asynchronous image capturing by different optical chains and the captured images can be combined easily.

The above discussed image capture operations performed by various sensors included in corresponding optical chains as discussed above may, and in some embodiments is, performed by a camera such as camera 600 including optical chains arranged as illustrated in FIGS. 7A and 7B.

Methods and apparatus for performing image stabilization to images captured by a camera device including multiple camera modules are described.

Images are captured by multiple camera modules operating in parallel, e.g., in a handheld camera device, with at least some of the camera modules having different focal lengths. Camera modules with a shorter focal length capture a larger field of view than a camera module used to capture the image area selected to be captured by a user of the camera device. The larger image area is used as a guard area from which image portions can be taken to compensate for shaking during video capture. The number of camera modules available for providing guard area portions depends, in some but not necessarily all embodiments, on the zoom level selected by the user with more modules for providing guard area portions as the zoom level increases and a smaller image area is captured. This conveniently allows for greater shake compensation at higher levels of zoom where small hand movements are likely to have a greater impact on image movement since small hand movements cause a shift relative to overall captured image size due to the higher zoom level. While the guard area portions from camera modules having a lower zoom level will be of lower resolution assuming the same sensors are used for the camera modules with different focus lengths, the lower resolution portions are likely to correspond to the outer edges of the image and are likely to be relatively small compared to the overall image size. Accordingly, the benefit of using fill portions from the available lower resolution sensors outweighs the effects that shaking would have absent the shake compensation and image fill that being implemented.

The methods and apparatus allow for image stabilization to be performed using images captured by different camera modules of a camera and can be used without the need or benefit of mechanical stabilization devices. However, the image stabilization methods can be used with mechanical and/or other image stabilization techniques where additional stabilization may be desired than would be achieved without combining image stabilization techniques.

Some features are directed to a method of generating a stabilized image, by performing the steps of receiving user input indicating a scene area of interest. This may be done, for example by a user controlling capture of an initial scene of a video sequence with the scene area selected by the user for the initial scene area being considered the scene area of interest. As part of the video capture process, during a first period of time, an image of said first scene area of interest is captured using a camera module having a first focal length. The first camera module may and sometimes does capture the scene area at a first resolution, e.g., a resolution higher than that which is captured by a smaller focal length camera module of the camera which captures a larger scene area than the scene area of interest. As discussed above the camera device includes, in some embodiments, multiple camera modules of different focal lengths. Which camera module or modules is used at a particular point in time may, and in some embodiments does, depend on the zoom setting used by the user when capturing the initial image of the video sequence with the zoom setting being be held constant for the video sequence.

During a image capture time, e.g., frame period following the initial image capture period, multiple images are captured using a first set of camera modules. The first set of camera modules include camera modules having different focal lengths. Since one or more camera modules in the set has a shorter focal length than the first camera module used to capture the initial image at least one camera module captures a larger area than the first camera module. In embodiments where the sensors in the first camera module and a second camera module having a shorter focal length than the first camera module but sensors with the same number of pixels, the resolution of the image captured by the second camera module will be lower than the resolution of the image captured by the first camera module. In addition to the second camera module the set of camera modules used to capture images during the second time period may include one or more camera modules, e.g., a third camera module, of the same focal length as the first camera module but directed at a different area than the first camera module. The scene capture area of the second and third camera modules may overlap but the second camera module may capture scene area not captured by either the first or second camera modules as well as scene areas captured by those modules.

During a second capture time period, e.g., a second frame time following the first image capture time period, the first camera module is operated to capture an image. However, because of camera movement from the first image capture time period to the second image capture time period the first camera module may and sometimes does capture a first portion of said scene area of interest during the second period of time but misses capturing a second portion of said scene area of interest during the second period of time. Thus, while the scene area of interest was fully captured by the first camera module during the first image capture time period it is only partially captured during the second image capture time period. However, the missing second portion of the scene area can be obtained from an image captured by one of or more of the other camera modules, e.g., second and third camera modules, which are operated to capture images during the second time period.

The images captured by the other camera modules during the second time period are examined to identify images which include the missing second portion of the scene area of interest. The image providing the highest quality version of the missing second portion of the scene area of interest captured during the second time period is then identified and selected for combining with the scene area of interest captured by the first camera during the second time period. As discussed above, it is possible that multiple camera modules may have captured the second missing image portion but at different resolutions. Identifying and selecting an image to provide the missing second image portion may involve identifying the image providing the highest resolution version of the missing second image portion. Thus, in at least some embodiments the method used to compensate for camera motion includes identifying at least one image including the missing second portion of said scene area of interest captured during said second period of time where the at least one image being an image captured during said second period of time was captured by a camera module other than the first camera module. Once an image has been selected for combining with the image captured by the first camera module, the process proceeds to generating a composite image from the first portion of said scene area of interest included in an image captured by said first camera module during said second period of time and the missing second portion of said scene area of interest included in an image captured by said another camera module during said second period of time.

In at least some embodiments identifying at least one image including said missing second portion of said scene area of interest captured during said second period of time includes identifying multiple images including said second missing portion captured by different camera modules in said first set of camera modules used to capture images during the second time period and selecting for use in combining with the image captured by the first camera module, the highest resolution one of the plurality of identified images captured during said second time period which include said missing second portion. In some cases the image selected for combining with the first image is an image captured by a camera module having smaller focal length than said first camera module, said selected image being of lower resolution than said first image. Generating a composite image includes, in some embodiments, combining the first portion of said scene area of interest included in the image captured by said first camera module and having a first resolution with the missing second portion of said scene area of interest included in the image captured by said another camera module and having a second resolution to form the composite image. In at least some such embodiments the first image portion at the first resolution and the missing second image portion at the second resolution. In at least some such cases, the second resolution is lower than said first resolution.

The method has been described for one missing portion. However, multiple different portions of the scene area of interest may be missing from the image captured by the first camera module. In one such embodiment images are selected to supply the one or more additional missing portions with the image selection being made separately for each missing image portion. In some such embodiments different missing portions may be selected from different images with the composite image including image portions of multiple different resolutions depending on which image was selected for supplying the particular missing image portion.

While one or more missing image portions may be obtained from images of lower resolution than the image providing the main portion of the scene area of interest, the portions obtained due to camera motion are likely to be located on the outer edges of the composite image where the reduction in resolution may be less noticeable than if the center portion of the image was replaced with a lower resolution image portion. Thus, while a user may notice a reduction in resolution which may be perceived towards the edges of the image where replacements have been made with lower resolution image content, such replacements are still likely to provide a more pleasant video experience than if the image stabilization technique were not applied.

The camera devices of the present invention supports multiple modes of operation and switching between different modes of operation. Different modes may use different numbers of multiple lenses per area, and/or different exposure times for different optical chains used to capture a scene area in parallel. Different exposure modes and filter modes may also be supported and switched between, e.g., based on user input.

Numerous additional variations and combinations are possible while remaining within the scope of the invention.

Figure 10A:
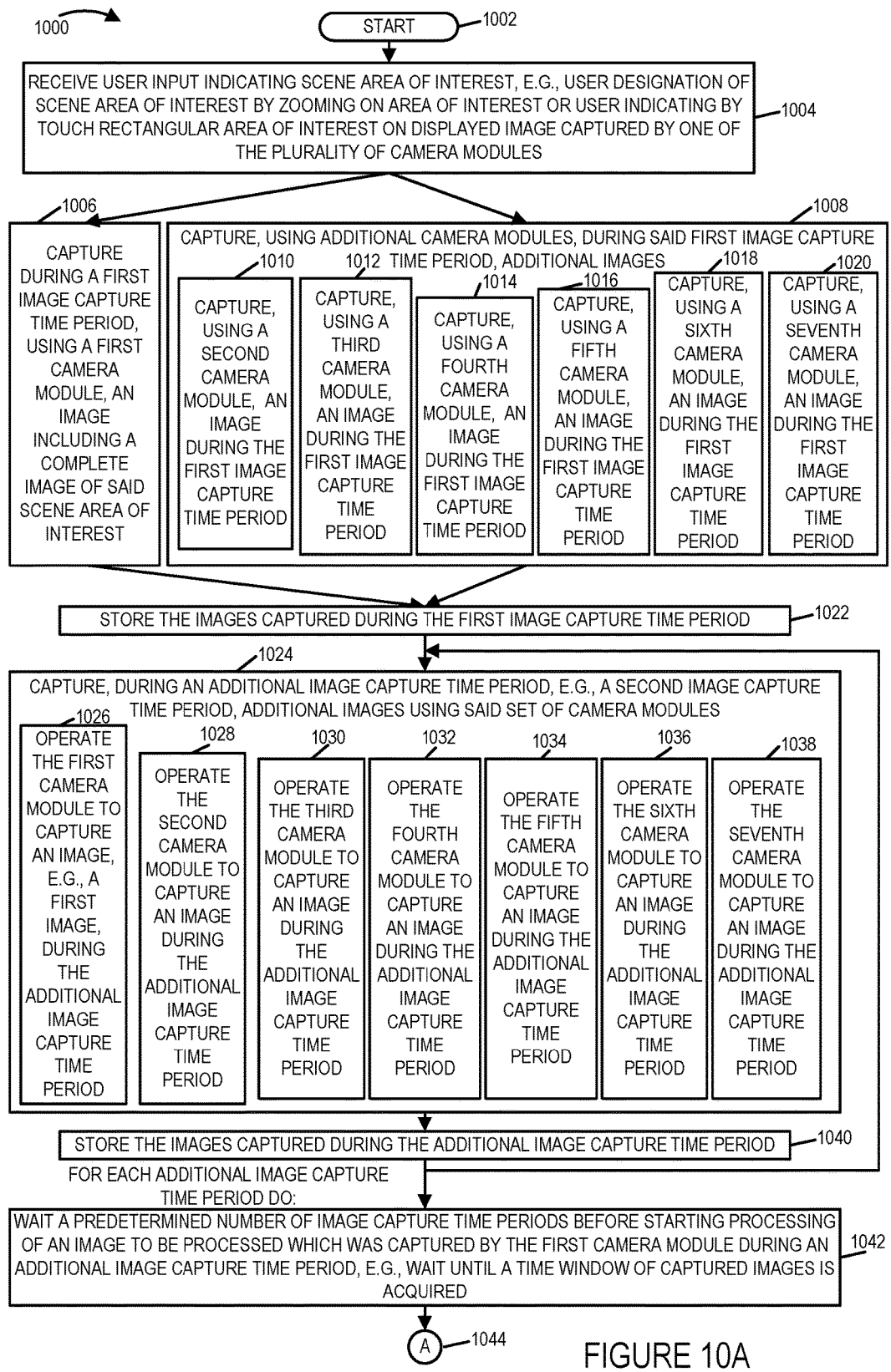
FIG. 10A is a first part of a flowchart of an exemplary method of generating one or more images in accordance with an exemplary embodiment.

FIG. 10, comprising the combination of FIG. 10A and FIG. 10B, is a flowchart 1000 of an exemplary method of generating one or more images in accordance with an exemplary method. The exemplary method of flowchart 1000 is, e.g., preformed by an exemplary camera device including a plurality of camera modules, e.g., a plurality of optical chains. In one such embodiment, the camera device implementing the method of flowchart 1000 includes a set of seven camera modules, e.g., seven optical chains. In one such embodiment, five optical chains have a first focal length, F1, 1 optical chain has a second focal length, F2, and one optical chain has a third focal length, F3, where the first focal length, F1, is larger than the second focal length, F2, and the second focal length, F2, is larger than the third focal length, F3.

Operation starts in step 1002 in which the camera device is powered on and initialized. Operation proceeds from start step 1002 to step 1004. In step 1004 the camera device receives user input indicating a scene area of interest, e.g., a user designation of a scene area of interest by zooming on an area of interest or user indicating by touching a rectangular area of interest on a displayed image captured by one of the plurality of camera modules. Operation proceeds from step 1004 to steps 1006 and 1008.

In step 1006 the camera device captures during a first image capture time period, using a first camera module, and image including a complete image of said scene area of interest. In step 1008 the camera device captures, using additions camera modules, during said first image capture time period, additional images. Step 1008 includes steps 1010, 1012, 1014, 1016, 1018, and 1020. In step 1010, the camera device captures, using a second camera module, an image during the first image capture time period. In step 1012, the camera device captures, using a third camera module, an image during the first image capture time period. In step 1014, the camera device captures, using a fourth camera module, an image during the first image capture time period. In step 1016, the camera device captures, using a fifth camera module, an image during the first image capture time period. In step 1018, the camera device captures, using a sixth camera module, an image during the first image capture time period. In step 1020, the camera device captures, using a seventh camera module, an image during the first image capture time period. Operation proceeds from steps 1006 and 1008 to step 1022.

In step 1022 the camera device stores the images captured during the first image capture time interval. In various embodiments, each captured image is tagged or associated with information identifying the camera module which captured the image and information identifying the image capture time period, which is the first image capture time period. Operation proceeds from step 1022 to step 1024.

In step 1024 the camera device captures, during an additional image capture time period, e.g., a second image capture time period, additional images using said set of camera modules. Step 1024 includes steps 1026, 1028, 1030, 1032, 1034, 1036 and 1038. In step 1026 the camera device operates the first camera module to capture an image, e.g., a first image, during the additional image capture time period, e.g., during a second image capture time period. In step 1028 the camera device operates the second camera module to capture an image during the additional image capture time period, e.g., during the second image capture time period. In step 1030 the camera device operates the third camera module to capture an image during the additional image capture time period, e.g., during the second image capture time period. In step 1032 the camera device operates the fourth camera module to capture an image during the additional image capture time period, e.g., during the second image capture time period. In step 1034 the camera device operates the fifth camera module to capture an image during the additional image capture time period, e.g., during the second image capture time period. In step 1036 the camera device operates the sixth camera module to capture an image during the additional image capture time period, e.g., during the second image capture time period. In step 1038 the camera device operates the seventh camera module to capture an image during the additional image capture time period, e.g., during the second image capture time period. Operation proceeds from steps 1024 to step 1040.

In step 1040 the camera device stores the images captured during the additional image capture time period, e.g., the second image capture time period. In various embodiments, each captured image is tagged or associated with information identifying the camera module which captured the image and information identifying the additional image capture time period, e.g., the second image capture time period for a first iteration through steps 1024 and 1040. Operation proceeds from step 1040 to step to capture images for a subsequent image capture time period.

For each additional image capture time period which is completed, operation proceeds from step 1040 to step 1042. In step 1042 the camera device waits a predetermined number of image capture time periods before starting processing of an image to processed which was captured by the first camera module during an additional image capture time period, e.g., wait until a time window of captured images is acquired. For example, wait unit two subsequent image capture time periods have completed before processing an image captured by the first camera module additional image capture time period. For example, wait until the fourth image capture time period has completed before starting processing to identity and fill in missing portions of an image captured by the first camera module during the second image capture time period. Continuing with example, wait until the fifth image capture time period has completed before starting processing to identity and fill in missing portions of an image captured by the first camera module during a third image capture time period. Operation proceeds from step 1042, via connecting node A 1044 to step 1046.

In step 1046 the camera device determines if an image captured by the first camera module during an additional image capture times period, e.g., the additional image capture time period to be currently processed, is missing any portions of the scene area of interest, e.g. due to camera movement, occlusion, and/or camera lighting changes. Operation proceeds from step 1046 to step 1048.

In step 1048, if the determination of step 1046 is that there are not any missing portions of the scene area of interest, then operation proceeds from step 1048 to step 1050, in which the camera device outputs the captured image, which was captured by the first camera device during the image capture time period which is currently being processed, e.g., displays and/or transmits the image from the first camera module which was captured by the first camera device during the image capture time period which is currently being processed. However, if the determination of step 1046 is that there are one or more missing portions of the scene area of interest, then operation proceeds from step 1048 to step 1052.

In step 1052 the camera device determines which portions of the scene area of interest are present and which are missing in the captured image from the first camera module during the additional image capture time period which is currently being processed. Operation proceeds from step 1052 to step 1054.

In step 1054 the camera device, calls a subroutine for identifying an image including a missing portion of an image for use in generating a composite image. In one exemplary embodiment, the subroutine which is called is implemented using the method of flowchart 1100 of FIG. 11. Operation proceeds from step 1054, to step 1056. In step 1056, the camera device receives from the subroutine information indicating the image(s) from which missing scene area of interest portion(s) are to be obtained, said images corresponding to the same or different image capture time period as the image captured by the first camera module which is currently being processed and which includes one or more identified missing portions. Operation proceeds from step 1056 to step 1058.

In step 1058 the camera device generates a composite image by combining the scene area of interest portion captured by the first camera module, which is currently being processed, with missing image portion(s) captured by other camera modules and/or during other image capture time periods than the image capture time period of the first image currently being processed. Operation proceeds from step 1058 to step 1060.

In step 1060 the camera device stores the generated composite image. Operation proceeds from step 1060 to step 1062. In step 1062 the camera device outputs, e.g., displays and/or transmits the composite image. In some embodiments, information is communicated along with the composite image indicating that the image is a composite image.

In some such embodiments, information is further communicated with the composite image indicating the source image(s) of the missing portion(s) and/or information identifying the area within the image in which the missing portion(s) was included.

Figure 11A:
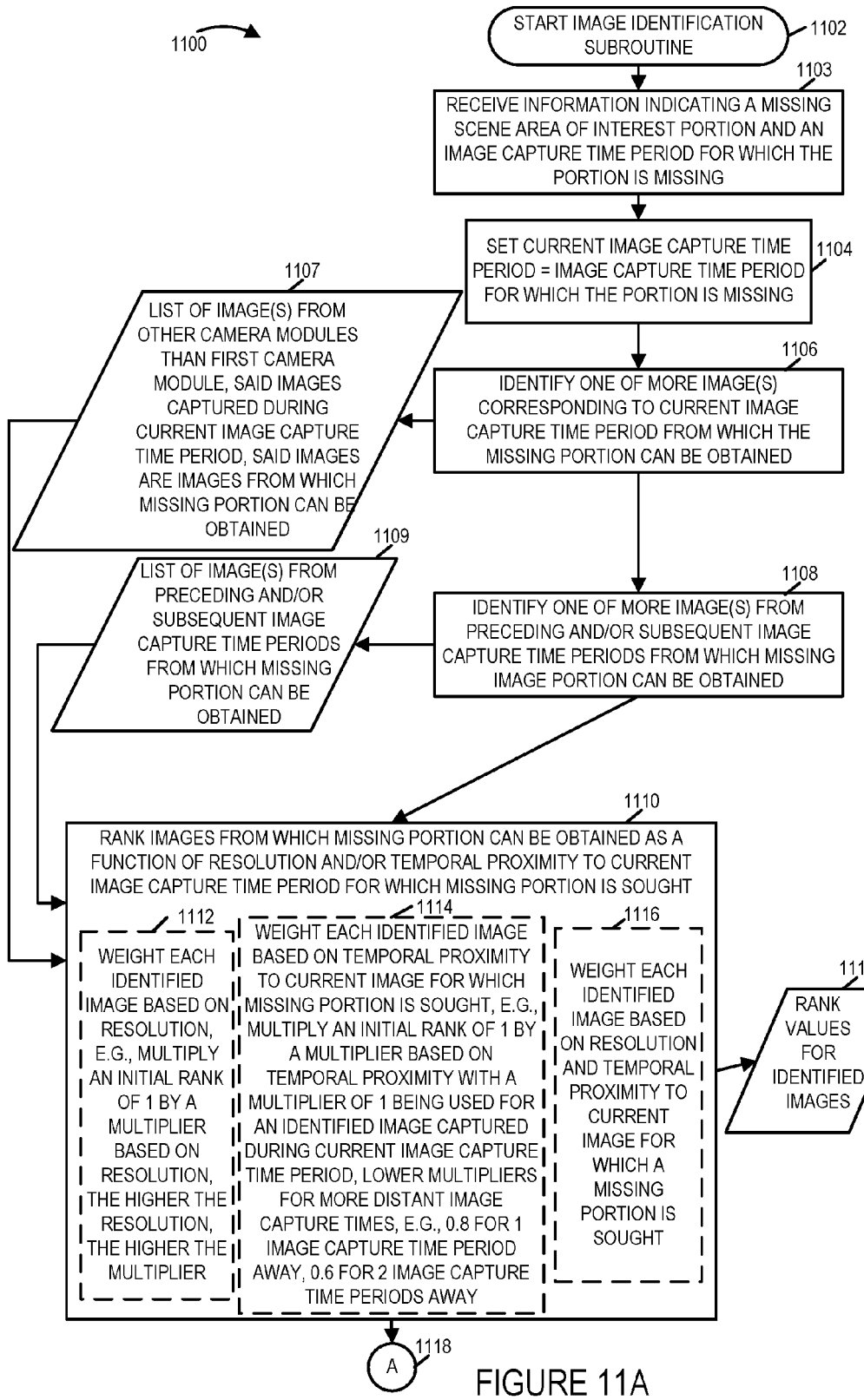
FIG. 11A is a first part of a flowchart of an exemplary method of identifying images which may be used to fill in missing image portions in accordance with an exemplary embodiment.

FIG. 11, comprising the combination of FIG. 11A and FIG. 11B, is a flowchart 1100 of an exemplary method of operating a camera device to identify images which may be used to fill in missing image portions. In step 1102 the image identification subroutine is started, e.g., in response to a call from step 1054 of flowchart 1000 of FIG. 10. Operation proceeds from step 1102 to step 1103. In step 1103 the subroutine receives information indicating a missing scene area of interest portion and an image capture time period for which the portion is missing. Operation proceeds from step 1103 to step 1104. In step 1104 the subroutine sets the current image capture time period to the image capture time period for which the portion is missing. Operation proceeds from step 1104 to step 1106. In step 1106 the subroutine identifies one or more images corresponding to the current image capture time period from which the missing portion can be obtained. Information 1107, which is a list of images(s) from other camera modules than the first camera module, e.g., from any of the second to seventh camera modules, said images captured during the current image capture time period, and said images are images from which the missing portion can be obtained, is an output form step 1106. Operation proceeds from step 1106 to step 1108.

In step 1108 the subroutine identifies one or more image(s) from preceding and/or subsequent image capture time periods from which the missing portion can be obtained. Information 1109, which is a list of identified images(s) from preceding and/or subsequent image capture time periods from which the missing portion can be obtained, is an output form step 1108.

Operation proceeds from step 1108 to step 1110. In step 1110 the subroutine ranks images from which the missing portion can be obtained as a function of resolution and/or temporal proximity to the current image capture time period for which the missing portion is sought. Lists of images 1107, 1109 are input to step 1110. Step 1110 includes one or more or all of steps 1112, 1114 and 1116. In step 1112 the subroutine weights each identified image based on resolution, e.g. multiples an initial rank of 1 by a multiplier based on resolution, the higher the resolution the higher the multiplier. Thus higher resolution images are favored over lower resolution images. In step 1114 the subroutine weights each identified image including the missing image portion based on temporal proximity to the capture time of current image for which the missing portion is being sought, e.g., based on temporal proximity to the current image capture time period. For example, multiple an image rank of 1 by a multiplier based on temporal proximity with a multiplier of 1 being used for an identified image including the missing image portion which was captured during the current image capture time period, with lower multipliers being used if an identified image including the missing image portion was captured during a more distant time period. For example, use a multiplier of 0.8 if the identified image including the missing image portion was captured 1 image capture time period away from the current image capture time period, and use a multiplier of 0.6 if the identified image was captured 2 image capture time periods away from the current image capture time period. Thus identified captured images including the missing image portion which occur during the same image capture time period as the image for which the missing portion is being sought are favored over identified images including the missing portions which are captured during other image capture time periods than the time period corresponding to the image for which the missing portion is sought. In step 1116 the subroutine weights each identified image based on resolution and temporal proximity to the current image for which the missing portion is sought. Rank values 1111 for the identified images included in lists 1107 and 1109 is an output of step 1110. Operation proceeds from step 1110 via connecting node A 1118 to step 1120.

In step 1120 the subroutine determines if there is an image corresponding to a different image capture time period which is of higher resolution than an image of the current image capture time period which can be the source of the missing portion. If the subroutine determines that there is an image corresponding to a different image capture time period which is of higher resolution than an image of the current image capture time period which can be the source of the missing portion, than operation proceeds from step 1120 to step 1122; otherwise operation proceeds from step 1120 to step 1126.

In step 1122 the subroutine determines if the content of the missing portion in the lower resolution image corresponding to the current image capture time period matches the content of the higher resolution image of the other image capture time period from which the content can be obtained. If the determination of step 1122 is that the content of the missing portion in the lower resolution image corresponding to the current image capture time period matches the content of the higher resolution image of the other image capture time period from which the content can be obtained, then operation proceeds from step 122 to step 1124; otherwise, operation proceeds from step 1122 to step 1126. In step 1124 the subroutine adjusts, e.g., increases, the rank of the higher resolution image so the higher resolution image is used instead of the lower resolution image to be the source of the missing portion. Operation proceeds from step 1124 to step 1126.

In step 1126, the subroutine identifies the highest ranked image to be used as the source of the missing image portion for which the image identification subroutine was called. Operation proceeds from step 1126 to step 1128. In step 1128 the subroutine returns information indicating the highest ranked identified image to be used as the source of the missing image portion.

Figure 12:
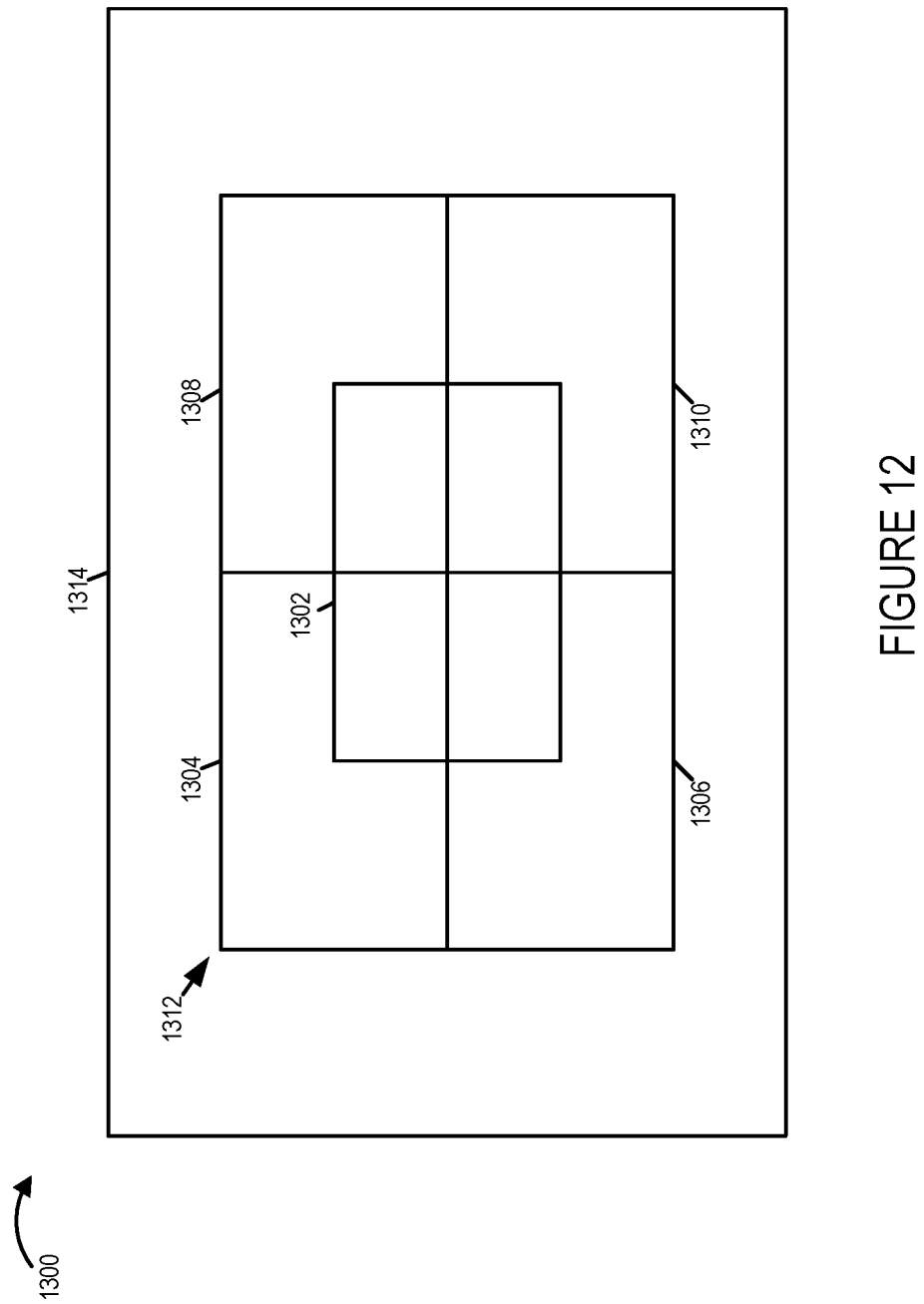
FIG. 12 is a drawing illustrating exemplary image capture areas corresponding to a camera device including seven camera modules, e.g., seven optical chains, in accordance with an exemplary embodiment.

FIG. 12 is a drawing 1300 illustrating exemplary image capture areas corresponding to a camera device including seven camera modules, e.g., seven optical chains, in accordance with an exemplary embodiment. Rectangle 1302 identifies an image capture area for exemplary camera module A, and camera module A has a focal length F1. Rectangle 1304 identifies an image capture area for exemplary camera module B, and camera module B has a focal length F1. Rectangle 1306 identifies an image capture area for exemplary camera module C, and camera module C has a focal length F1. Rectangle 1308 identifies an image capture area for exemplary camera module D, and camera module D a focal length F1. Rectangle 1310 identifies an image capture area for exemplary camera module E, and camera module E a focal length F1. Rectangle 1312 identifies an image capture area for exemplary camera module F, and camera module F has a focal length F2, where F2<F1. Rectangle 1314 identifies an image capture area for exemplary camera module G, and camera module G has a focal length F3, where F3<F1. The resolution of images captured by camera modules with focal length F1 is higher than the resolution of images captured by the camera module with focal length F2, and the resolution of images captured by the camera module with focal length F2 is higher than the resolution of images captured by the camera module with focal length F3.

Figure 13:
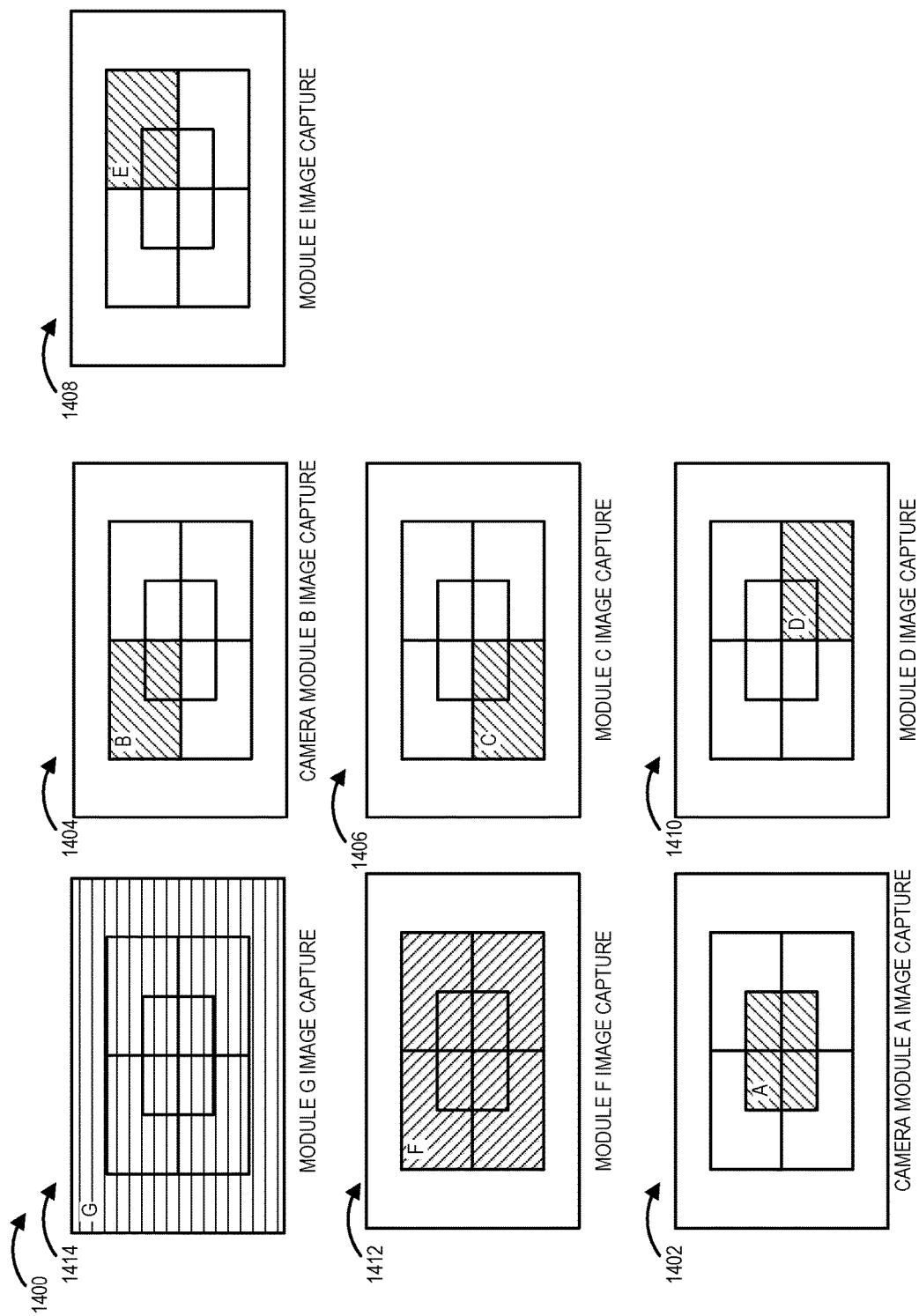
FIG. 13 is a drawing illustrating exemplary image capture areas corresponding to different camera modules for an exemplary camera device including seven camera modules, e.g., seven optical chains, in accordance with an exemplary embodiment.

FIG. 13 includes drawing 1400 which includes a set of drawing (1402, 1404, 1406, 1408, 1410, 1412, 1414) which illustrate image capture regions using shading for each of the seven camera modules (camera module A, camera module B, camera module C, camera module D, camera module E, camera module F, and camera module G), respectively.

Figure 14:
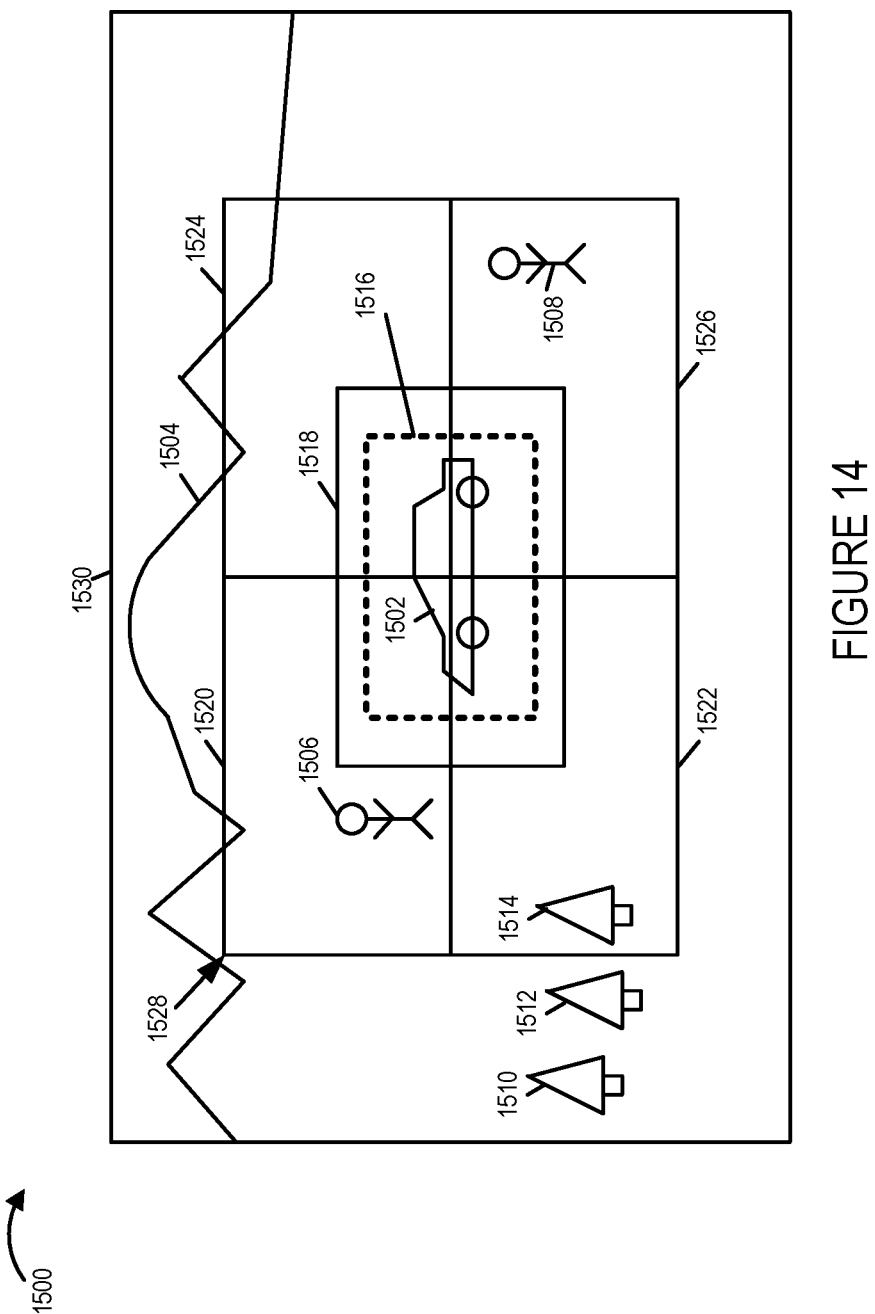
FIG. 14 illustrates an overall scene, identified exemplary image capture areas corresponding to different camera modules of the camera device for a first exemplary image capture time period, and an identified a user selected scene of interest, in accordance with an exemplary embodiment and includes a set of drawings, each drawing illustrating an image capture region using shading for one of the seven different camera modules (camera module A, camera module B, camera module C, camera module D, camera module E, camera module F, and camera module G).

FIG. 14 includes drawing 1500 including an overall scene, identified exemplary image capture areas corresponding to different camera modules of the camera device, and an identified a user selected scene of interest. The camera device is, e.g., the same camera device for which image capture was described in FIGS. 12 and 13. The overall scene includes a vehicle 1502, a mountain 1504, people (1506, 1508) and trees (1510, 1512, 1514). The image capture area of camera module A is identified by rectangular box 1518. The image capture area of camera module B is identified by rectangular box 1520. The image capture area of camera module C is identified by rectangular box 1522. The image capture area of camera module D is identified by rectangular box 1524. The image capture area of camera module E is identified by rectangular box 1526. The image capture area of camera module E is identified by rectangular box 1528. The image capture area of camera module E is identified by rectangular box 1530.

The identified user selected area of interest is identified by dashed line rectangular box 1516. It may be observed that camera module A captures the entire scene of interest; scene of interest 1516 is within the boundaries of camera module A capture area 1518.

In one example, FIG. 14 corresponds to image capture during an exemplary first image capture time period, and camera module A is the first camera module.

Figure 15:
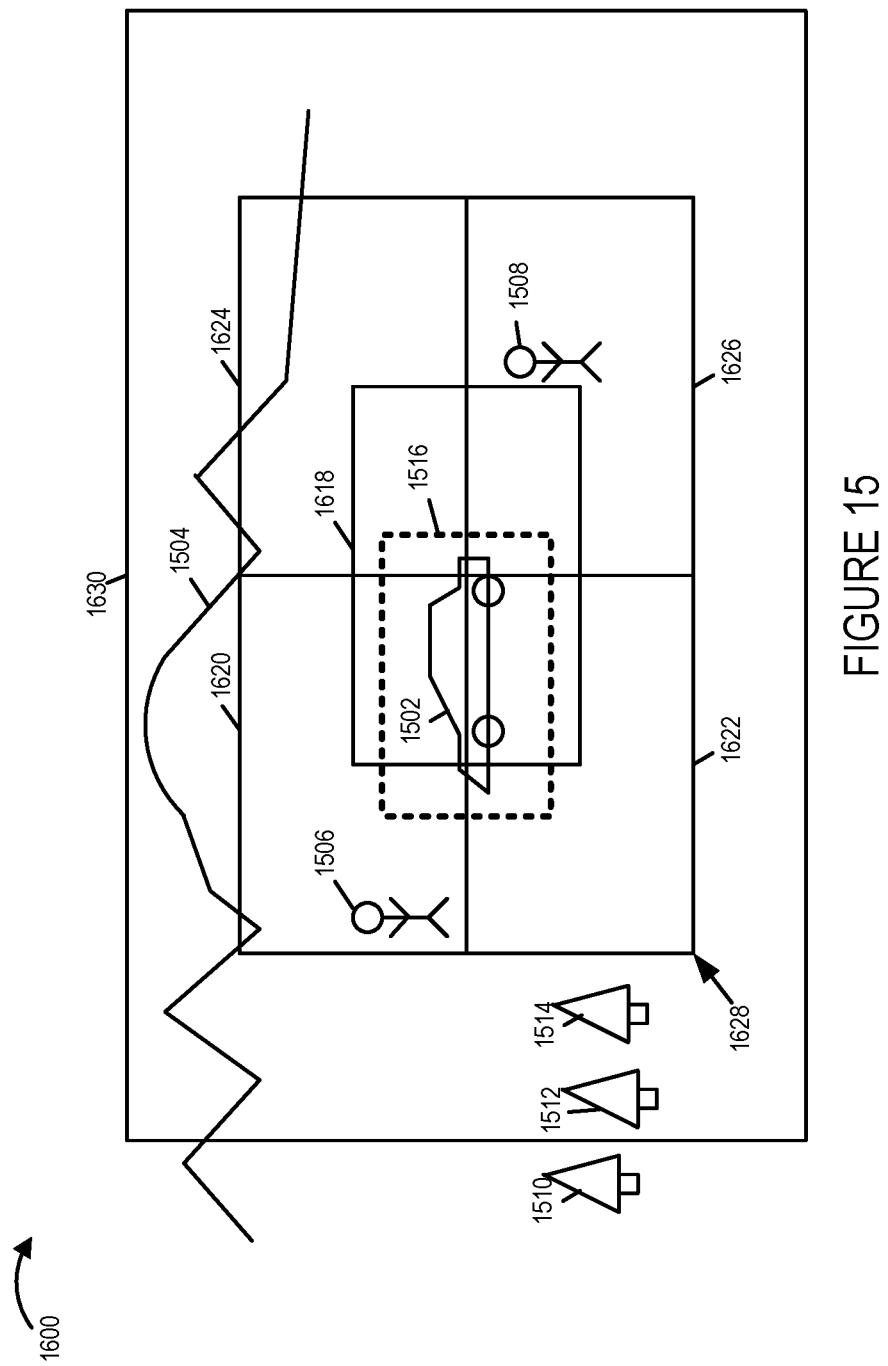
FIG. 15 is a continuation of the example of FIG. 14 and illustrates the scene of interest, and image capture areas corresponding to the different camera modules of the camera device for a second exemplary image capture time period, in accordance with an exemplary embodiment.

FIG. 15 illustrates a continuation of the example of FIG. 14, e.g., corresponding to image capture during a subsequent image capture time period, e.g., a second image capture time period. The camera including the seven camera modules may have moved between the time corresponding to the first image capture time period and the second image capture time period, e.g., due to unintentional operator motion. FIG. 15 includes drawing 1600 including the overall scene, identified exemplary image capture areas corresponding to different camera modules of the camera device, and the identified a user selected scene of interest. The image capture area of camera module A is identified by rectangular box 1618. The image capture area of camera module B is identified by rectangular box 1620. The image capture area of camera module C is identified by rectangular box 1622. The image capture area of camera module D is identified by rectangular box 1624. The image capture area of camera module E is identified by rectangular box 1626. The image capture area of camera module F is identified by rectangular box 1628. The image capture area of camera module G is identified by rectangular box 1630.

The identified user selected area of interest is identified by dashed line rectangular box 1516. It may be observed that camera module A does not capture the entire scene of interest; a portion of scene of interest 1516 is within the boundaries of camera module A capture area 1618; however, the image captured by camera module A misses a portion of the scene area of interest 1516.

Figure 16:
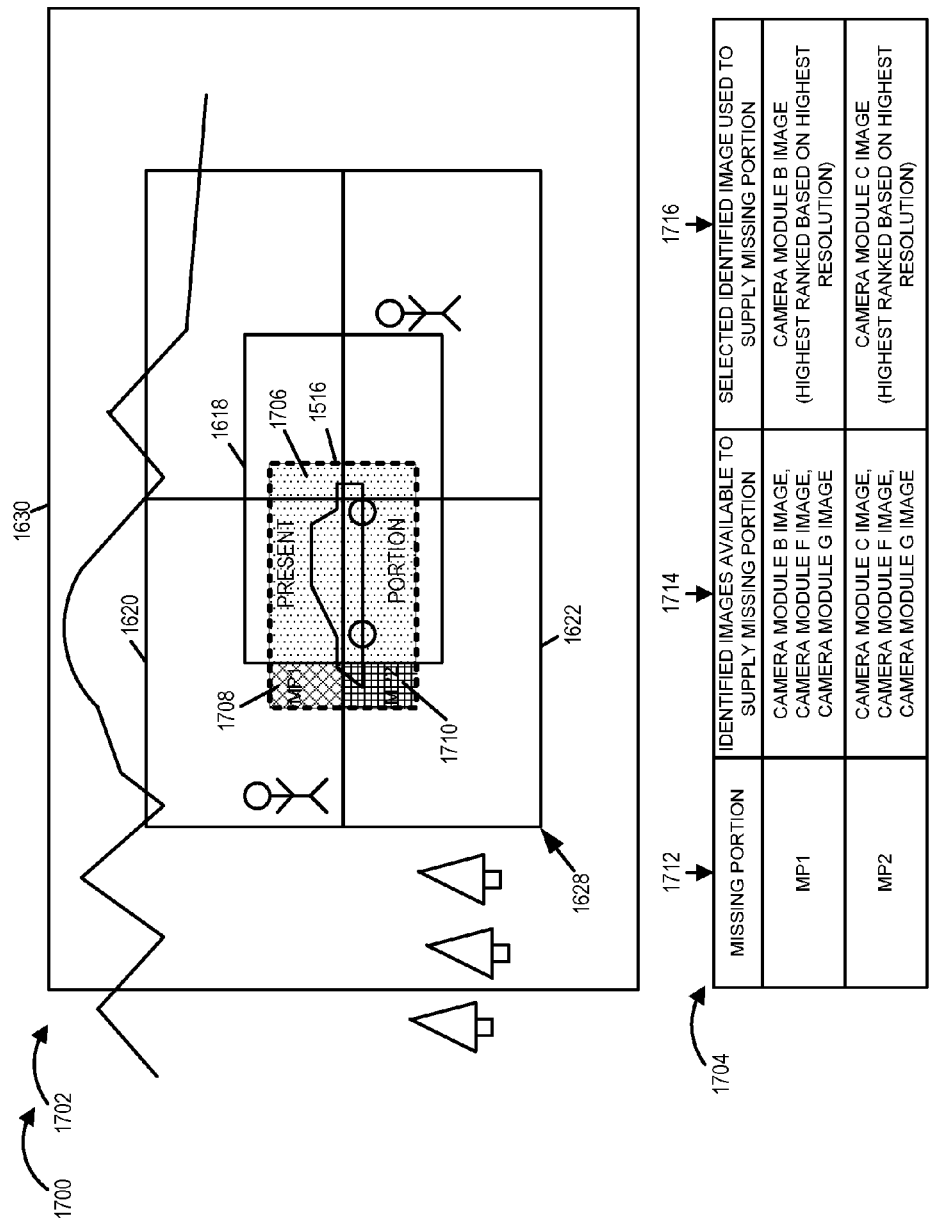
FIG. 16 is a continuation of the example of FIG. 15 and illustrates missing portions of the scene of interest, lists identified images which are available to supply the missing portions, and lists selected identified images used to supply the missing portions in accordance with an exemplary embodiment.

FIG. 16 includes drawing 1702 and table 1704. Drawing 1702 includes a copy of drawing 1600 of FIG. 16 and further includes information identifying a present portion 1706 of the scene area of interest 1516 and missing portions (missing portion 1 (MP1) 1708, missing portion 2 (MP2) 1710) of the scene area of interest 1516 from the perspective of camera module A image capture which is represented by rectangular area 1618. Present portion 1706 is identified using dotted shading; missing portion 1 1708 is identified using cross-hatch shading; and missing portion 2 1710 is identified using vertical and horizontal line shading.

Table 1704 includes a first column 1712 listing missing portions, a second column 1714 listing identified images available to supply a missing portion, and third column 1716 listing the selected identified image used to supply the missing portion.

The identified images available to supply missing portion 1 are the image captured by camera module B 1620, the image captured by camera module F 1628, and the image captured by camera module G 1630. The image captured by camera module B 1620 is selected to be used to supply the missing portion 1 1708. based on the captured image from camera module B having a higher ranking than the captured image from camera module F or camera module G, based on the captured image from camera module B having higher resolution.

The identified images available to supply missing portion 2 are the image captured by camera module C 1622, the image captured by camera module F 1628, and the image captured by camera module G 1630. The image captured by camera module C 1620 is selected to be used to supply the missing portion 2 1710. based on the captured image from camera module C having a higher ranking than the captured image from camera module F or camera module G, based on the captured image from camera module C having higher resolution.

In this example, a combined image, for the scene of interest 1516, is generated from: (i) the present portion 1706 of captured image 1618, which was captured by camera module A during the second image capture time period, (ii) an acquired portion from captured image 1620 corresponding to missing portion MP1 1708, wherein captured image 1620 was captured by camera module B during the second image capture time period, and (iii) an acquired portion of captured image 1622 corresponding to missing portion MP2 1710, wherein captured image 1622 was captured by camera module C during the second image capture time period.

Figure 17:
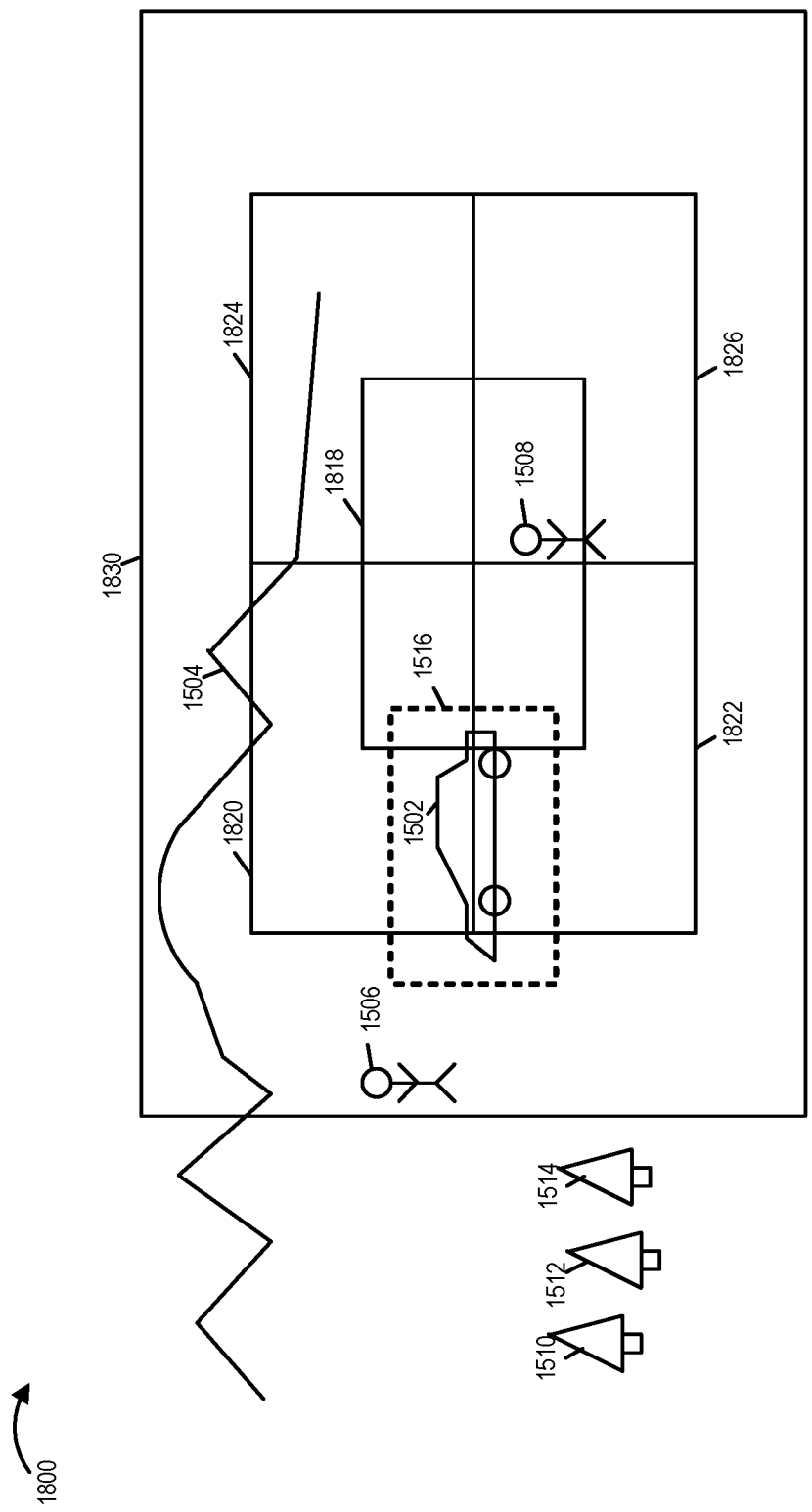
FIG. 17 is a continuation of the example of FIG. 16 and illustrates the scene of interest, and image capture areas corresponding to the different camera modules of the camera device for a third exemplary image capture time period, in accordance with an exemplary embodiment.

FIG. 17 illustrates a continuation of the example of FIGS. 14 and 15, e.g., corresponding to image capture during a subsequent image capture time period, e.g., a third image capture time period. The camera including the seven camera modules, e.g., optical chains, may have moved between the time corresponding to the second image capture time period and the third image capture time period, e.g., due to unintentional operator motion. FIG. 17 includes drawing 1800 including the overall scene, identified exemplary image capture areas corresponding to different camera modules of the camera device, and the identified a user selected scene of interest. The image capture area of camera module A is identified by rectangular box 1818. The image capture area of camera module B is identified by rectangular box 1820. The image capture area of camera module C is identified by rectangular box 1822. The image capture area of camera module D is identified by rectangular box 1824. The image capture area of camera module E is identified by rectangular box 1826. The image capture area of camera module F is identified by rectangular box 1828. The image capture area of camera module G is identified by rectangular box 1830.

The identified user selected area of interest is identified by dashed line rectangular box 1516. It may be observed that camera module A does not capture the entire scene of interest; a portion of scene of interest 1516 is within the boundaries of camera module A capture area 1818; however, the image captured by camera module A misses a portion of the scene area of interest 1516.

Figure 18:
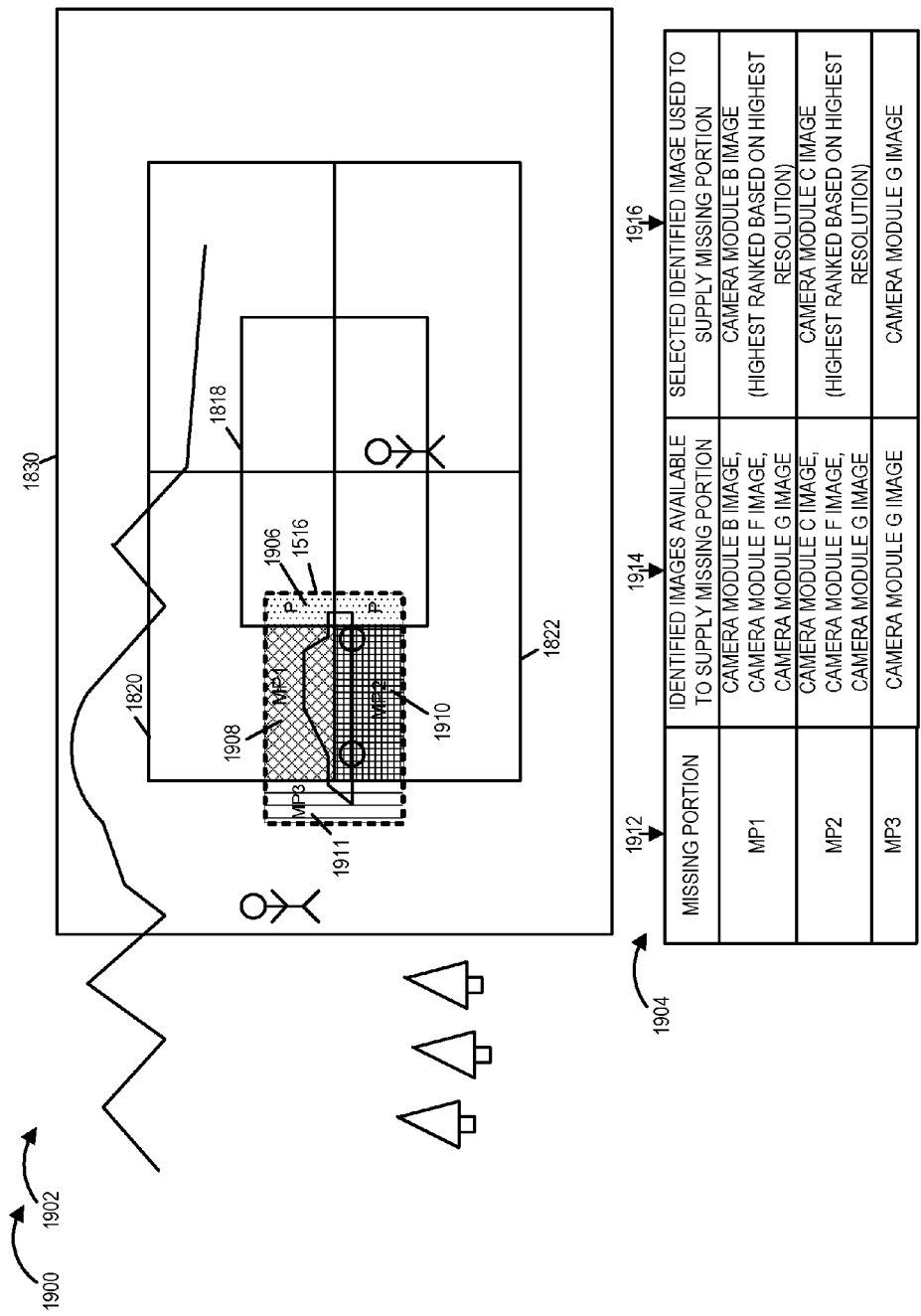
FIG. 18 is a continuation of the example of FIG. 17 and illustrates missing portions of the scene of interest, lists identified images which are available to supply the missing portions, and lists selected identified images used to supply the missing portions in accordance with an exemplary embodiment.

FIG. 18 includes drawing 1902 and table 1904. Drawing 1902 includes a copy of drawing 1800 of FIG. 17 and further includes information identifying a present portion 1906 of the scene area of interest 1516 and missing portions (missing portion 1 (MP1) 1908, missing portion 2 (MP2) 1910, missing portion 2 (MP3) 1911 of the scene area of interest 1516 from the perspective of camera module A image capture which is represented by rectangular area 1818. Present portion 1906 is identified using dotted shading; missing portion 1 1908 is identified using crosshatch shading; and missing portion 2 1910 is identified using vertical and horizontal line shading; missing portion 2 1911 is identified using vertical line shading.

Table 1904 includes a first column 1912 listing missing portions, a second column 1914 listing identified images available to supply a missing portion, and third column 1916 listing the selected identified image used to supply the missing portion.

The identified images available to supply missing portion 1 are the image captured by camera module B 1820, the image captured by camera module F 1828, and the image captured by camera module G 1830. The image captured by camera module B 1820 is selected to be used to supply the missing portion 1 1908. based on the captured image from camera module B having a higher ranking than the captured image from camera module F or camera module G, based on the captured image from camera module B having higher resolution.

The identified images available to supply missing portion 2 are the image captured by camera module C 1822, the image captured by camera module F 1828, and the image captured by camera module G 1830. The image captured by camera module C 1820 is selected to be used to supply the missing portion 2 1910. based on the captured image from camera module C having a higher ranking than the captured image from camera module F or camera module G, based on the captured image from camera module C having higher resolution.

The identified images available to supply missing portion 3 are the image captured by camera module C 1822, the image captured by camera module G 1830. The image captured by camera module C 1820 is selected to be used to supply the missing portion 3 1911.

In this example, a combined image, for the scene of interest 1516, is generated from: (i) the present portion 1906 of captured image 1818, which was captured by camera module A during the third image capture time period, (ii) an acquired portion from captured image 1820 corresponding to missing portion MP1 1908, wherein captured image 1820 was captured by camera module B during the third image capture time period, (iii) an acquired portion of captured image 1822 corresponding to missing portion MP2 1910, wherein captured image 1822 was captured by camera module C during the third image capture time period; and (iv) an acquired portion of captured image 1830 corresponding to missing portion MP3 1911, wherein captured image 1830 was captured by camera module G during the third image capture time period.

Figure 19:
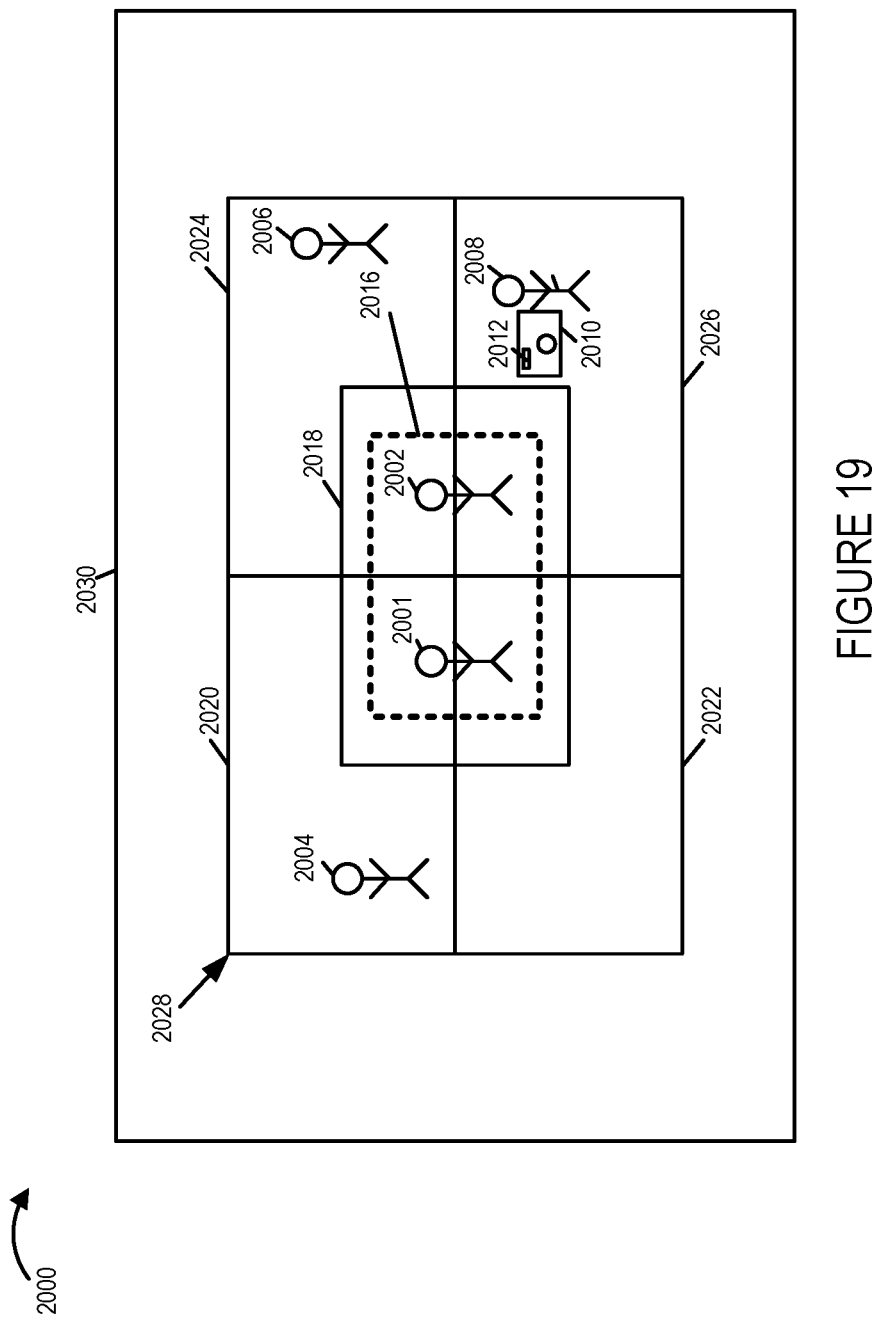
FIG. 19 includes illustrates an overall scene, identified exemplary image capture areas corresponding to different camera modules of the camera device and corresponding to an exemplary first image capture time period, and an identified a user selected scene of interest.

FIG. 19 includes drawing 2000 including an overall scene, identified exemplary image capture areas corresponding to different camera modules of the camera device, and an identified a user selected scene of interest. The overall scene is, e.g., a view of a room. The camera device is, e.g., the same camera device for which image capture was described in FIGS. 12 and 13. The overall scene includes a plurality of individual persons (2001, 2002, 2004, 2006, 2008). Individual person 2008 is holding a camera 2010 and the camera 2012 includes a flash 2012. The image capture area of camera module A is identified by rectangular box 2018. The image capture area of camera module B is identified by rectangular box 2020. The image capture area of camera module C is identified by rectangular box 2022. The image capture area of camera module D is identified by rectangular box 2024. The image capture area of camera module E is identified by rectangular box 2026. The image capture area of camera module E is identified by rectangular box 2028. The image capture area of camera module E is identified by rectangular box 2030.

The identified user selected area of interest is identified by dashed line rectangular box 2016, which includes individuals 2002 and 2002. It may be observed that camera module A captures the entire scene of interest; scene of interest 2016 is within the boundaries of camera module A capture area 2018.

In one example, FIG. 19 corresponds to image capture during an exemplary first image capture time period, and camera module A is the first camera module.

Figure 20:
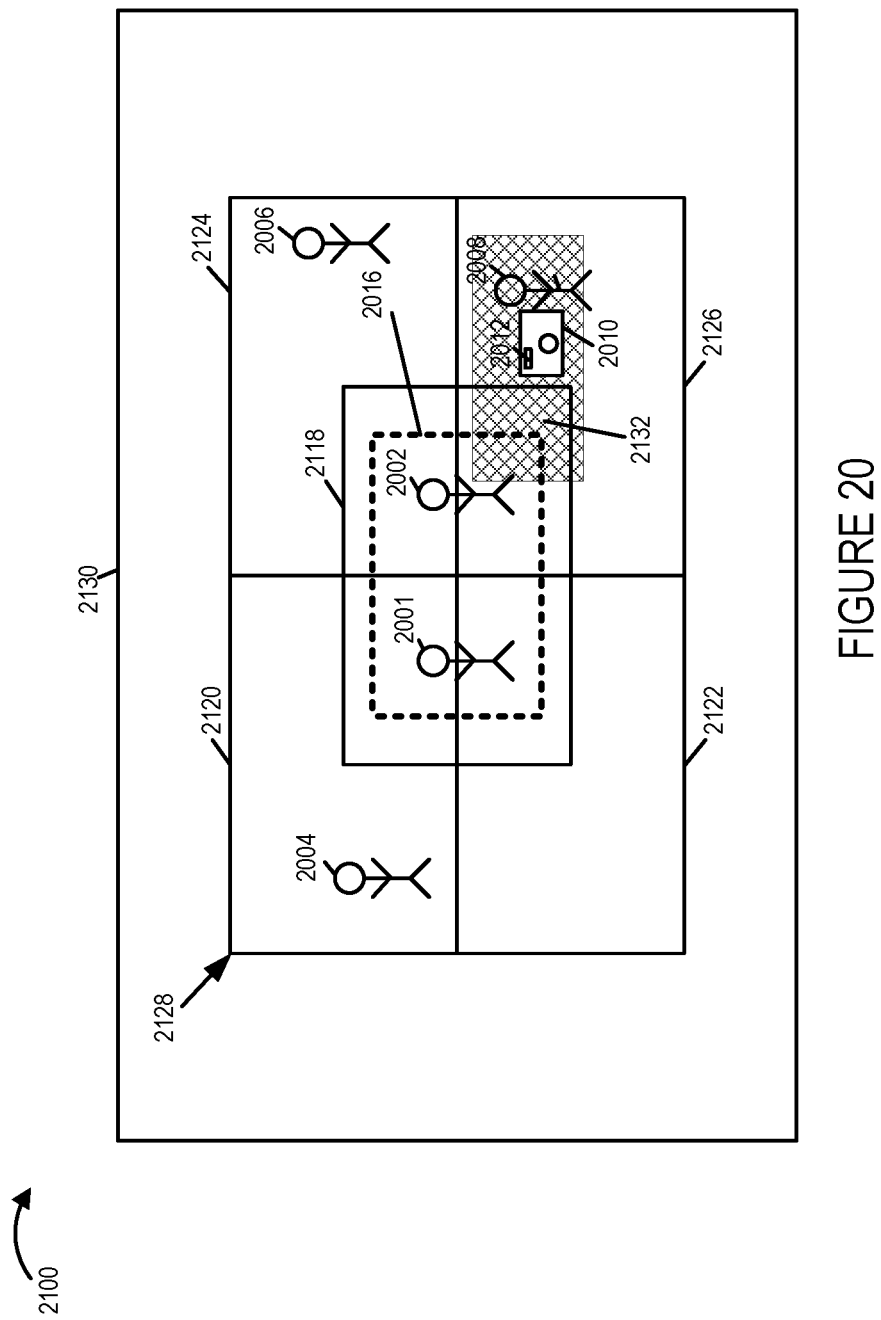
FIG. 20 illustrates a continuation of the example of FIG. 19 corresponding to an exemplary second image capture time period, and further identifies the scene of interest and exemplary image capture areas corresponding to different camera modules of the camera device, and an unacceptable image capture area due during the second image capture time period due to a lighting conditions, e.g., due to a flash occurring during the second image capture time period which causes image sensor saturation in a portion of an image sensor in a camera module.

FIG. 20 illustrates a continuation of the example of FIG. 19, e.g., corresponding to image capture time period subsequent to the image capture time period of FIG. 19, e.g., a second image capture time period. FIG. 20 includes drawing 2100 including the overall scene, identified exemplary image capture areas corresponding to different camera modules of the camera device, and the identified a user selected scene of interest. The image capture area of camera module A is identified by rectangular box 2118. The image capture area of camera module B is identified by rectangular box 2120. The image capture area of camera module C is identified by rectangular box 2122. The image capture area of camera module D is identified by rectangular box 2124. The image capture area of camera module E is identified by rectangular box 2126. The image capture area of camera module F is identified by rectangular box 2128. The image capture area of camera module G is identified by rectangular box 2130. In this example, individual 2008 has taken a picture using camera 2010 and flash 2012 has activated. The flash causes an unacceptable, e.g., unusable, image capture area 2132, as indicated by crosshatch shading, in which image capture by the camera device including the seven camera modules. In some embodiments, an image sensor portion saturates in the region corresponding to area 2132.

The identified user selected area of interest is identified by dashed line rectangular box 2016. It may be observed that camera module A does not capture the entire scene of interest; a portion of scene of interest 2016 is within the boundaries of the unacceptable capture area 2132, area 2132 being unacceptable due to lighting conditions.

Figure 21:
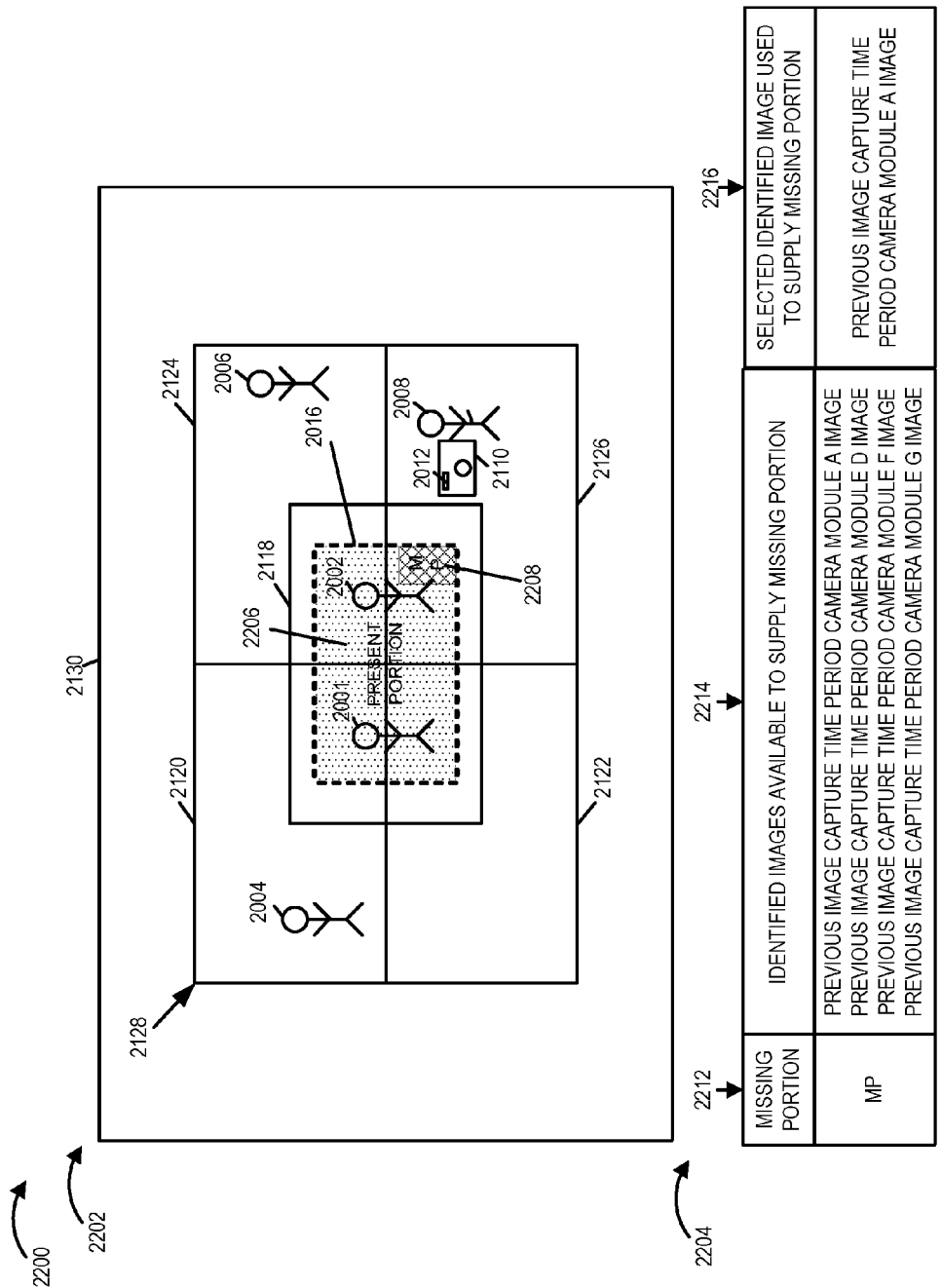
FIG. 21 includes information identifying a present portion of the scene area of interest, a missing portion of the scene area of interest for the example of FIG. 20 from the perspective of a first camera module, e.g., camera module A, image capture for the second image capture time period, identified images available to supply the missing portion, and a selected identified image to supply the missing portion, in accordance with an exemplary embodiment.

FIG. 21 includes drawing 2202 and table 2204. Drawing 2202 includes information from drawing 2100 of FIG. 20 and further includes information identifying a present portion 2206 of the scene area of interest 2016 and a missing portion 2208 of the scene area of interest 2016 from the perspective of camera module A image capture which is represented by rectangular area 2118. Present portion 2206 is identified using dotted shading; missing portion 2208 is identified using crosshatch shading.

Table 2204 includes a first column 2212 listing missing portions, a second column 2214 listing identified images available to supply a missing portion, and third column 2216 listing the selected identified image used to supply the missing portion.

The identified images available to supply missing portion 2208 are: the image captured by camera module A during the preceding image capture time period 2018, the image captured by camera module D during the preceding image capture time period 2026, the image captured by camera module F during the preceding image capture time period 2028, and the image captured by camera module G during the preceding image capture time period 2030. The image captured by camera module A during the preceding image capture time period 2018 is selected to be used to supply the missing portion 2208.

In this example, a composite image is generated from the present portion 2206 of the image captured by camera module A during the second image capture time period, which is image 2118 and the missing portion 2208 is sourced from the corresponding portion of the image captured by camera module A during the first image capture time period, which is image 2018.

Figure 22A:
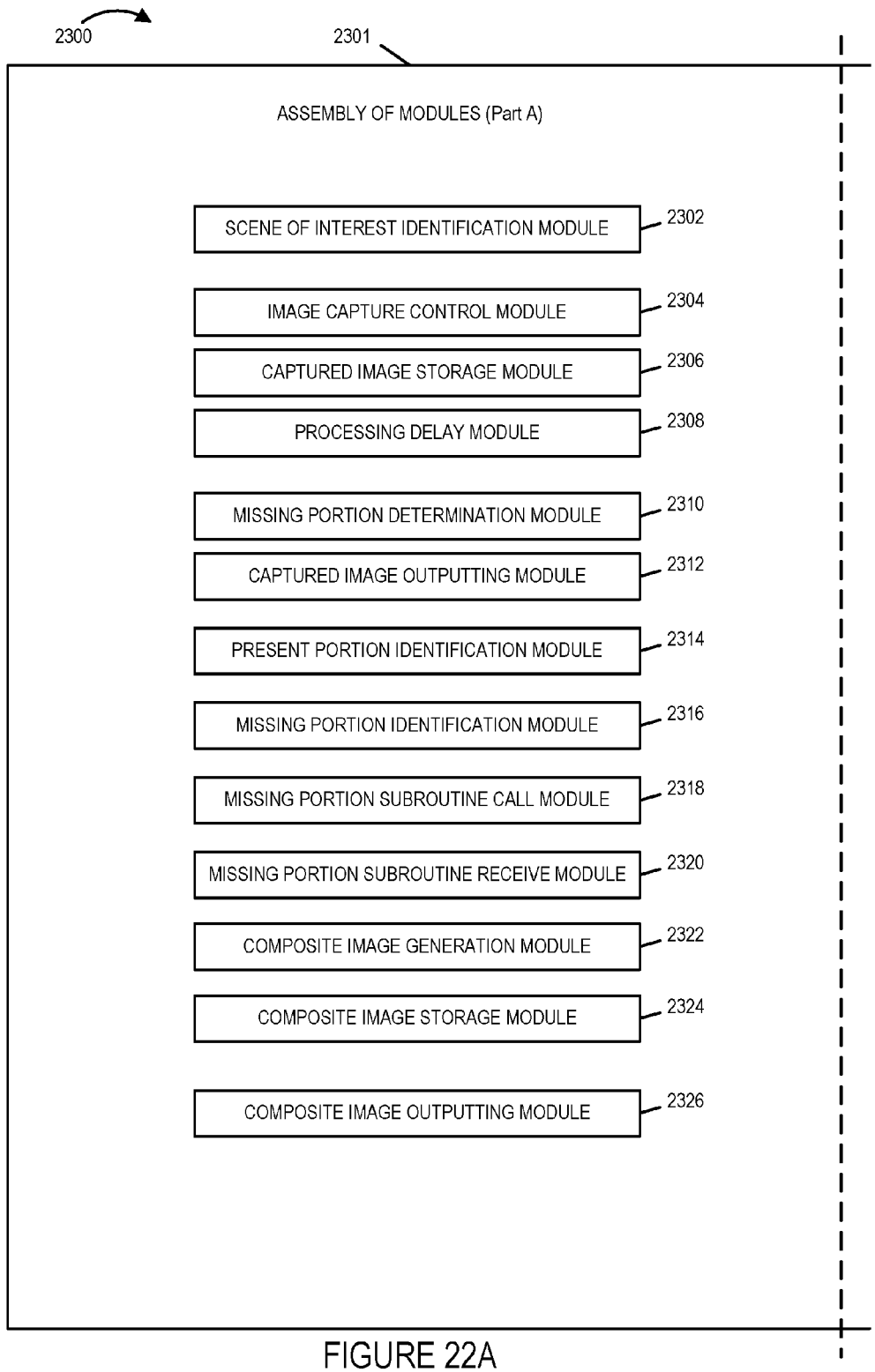
FIG. 22A is a drawing of a first part of an assembly of modules which may be included in a camera device in accordance with an exemplary embodiment.
Figures 22, 22B:
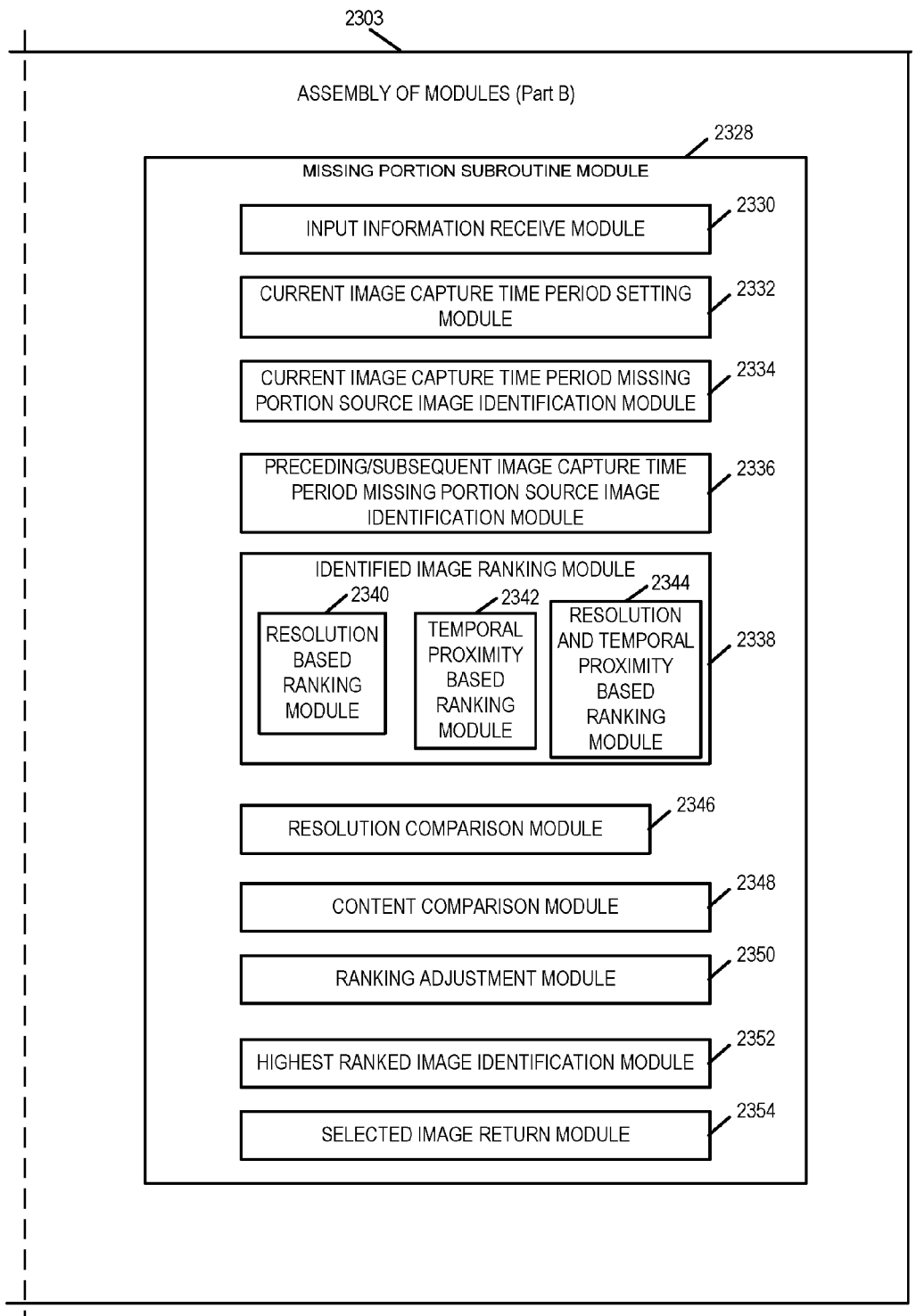
FIG. 22B is a drawing of a second part of an assembly of modules which may be included in a camera device in accordance with an exemplary embodiment.
FIG. 22 comprises the combination of FIG. 22A and FIG. 22B.

FIG. 22, comprising the combination of FIG. 22A and FIG. 22B, is a drawing of an assembly of modules 2300, comprising the combination of Part A 2301 and Part B 2303, in accordance with an exemplary embodiment. Assembly of modules 2300 is, e.g., included in a camera device implementing the methods of flowchart 1000 of FIG. 10 and flowchart 1100 of FIG. 11.

FIG. 22 is a drawing of an assembly of modules 2300, which may be included in a camera device implemented in accordance with the present invention, e.g., camera 100 of FIG. 1. Assembly of modules 2300 may implement steps of a method, e.g., steps of the method of flowchart 1000 of FIG. 10 and flowchart 1100 of FIG. 11. In some embodiments, assembly of modules 2300 is an assembly of circuits, which may be coupled together. In one exemplary embodiment, assembly of modules 2300 is assembly of hardware modules 180 of camera 100 of FIG. 1. In some embodiments, the assembly of module 2300 is an assembly of software modules. In one exemplary embodiment, assembly of modules 2300 is assembly of modules 118 of memory 108 of camera 100 of FIG. 1.

FIG. 22 illustrates an assembly of modules 2300 which can, and in some embodiments is, used in the camera device 100 illustrated in FIG. 1 or another camera device including a plurality of camera module, e.g., optical chains, e.g., another camera device including a plurality of camera modules shown or described with respect to any of FIG. 1-22. The modules in the assembly of modules 2300 can, and in some embodiments are, implemented fully in hardware within the processor 110, e.g., as individual circuits. The modules in the assembly of modules 2300 can, and in some embodiments are, implemented fully in hardware within the assembly of modules 180, e.g., as individual circuits corresponding to the different modules. In other embodiments some of the modules are implemented, e.g., as circuits, within the processor 110 with other modules being implemented, e.g., as circuits within assembly of modules 180, external to and coupled to the processor. As should be appreciated the level of integration of modules on the processor and/or with some modules being external to the processor may be one of design choice.

Alternatively, rather than being implemented as circuits, all or some of the modules in assembly of modules 2300 may be implemented in software and stored in the memory 108 of the camera device 100, with the modules controlling operation of camera 100 to implement the functions corresponding to the modules when the modules are executed by a processor, e.g., processor 110. In some such embodiments, the assembly of modules 2300 is included in the memory 108 as assembly of modules 118. In still other embodiments, various modules in assembly of modules 2300 are implemented as a combination of hardware and software, e.g., with another circuit external to the processor providing input to the processor 110 which then under software control operates to perform a portion of a module's function. While shown in the FIG. 1 embodiment as a single processor, e.g., computer, it should be appreciated that the processor 110 may be implemented as one or more processors, e.g., computers.

When implemented in software the modules include code, which when executed by the processor 110, configure the processor 110 to implement the function corresponding to the module. In embodiments where the assembly of modules 2300 is stored in the memory 118, the memory 118 is a computer program product comprising a computer readable medium comprising code, e.g., individual code for each module, for causing at least one computer, e.g., processor 110, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 22 control and/or configure the camera device 100 or elements therein such as the processor 110, to perform functions of the corresponding steps illustrated in the method flowchart 1000 of FIG. 10 and flowchart 1100 of FIG. 11. Thus the assembly of modules 2300 includes various modules that perform functions of the corresponding steps of the flowcharts 1000 and 1100.

Assembly of modules 2200 includes a scene of interest identification module 2302, an image capture control module 2304, a captured image storage module 2306, a processing delay module 2308, a missing portion determination module 2310, a captured image outputting module 2312, a present portion identification module 2314, a missing portion identification module 2316, a missing portion subroutine call module 2318, a missing portion subroutine receive module 2320, a composite image generation module 2324, a composite image outputting module 2326 and a missing portion subroutine module 2328. Missing portion subroutine module 2328 includes an input information receive module 2330, a current image capture time period setting module 2332, a current image capture time period missing portion source identification module 2334, a preceding/subsequent image capture time period missing portion source image identification module 2336, an identified image ranking module 2338, a resolution comparison module 2346, a content comparison module 2348, a ranking adjustment module 2350, a highest ranked image identification module 2352, and a selected image return module 2254. Identified image ranking module includes a resolution based ranking module 2340, a temporal proximity based ranking module, and a resolution and temporal proximity based ranking module 2344.

Scene of interest identification module 2302 is configured to receive user input indicating a scene of interest. The received user input is, e.g., information indicating that a user has designated a scene of interest, e.g., by zooming in on an area of interest and/or by touching a rectangular area of interest in a displayed image, e.g., on a displayed image captured by one of the plurality of camera modules in the camera device.

Image capture control module 2304 controls camera modules of the camera device to capture images during image capture time periods. Image capture control module 2304 controls a first camera module to capture an image including a complete image of said scene of interest during a first image capture time period. Image capture control module 2304 controls additional camera modules during the first image capture time period to capture additional images. Image capture control module 2304, controls a second camera module to capture an image during the first image capture time period. Image capture control module 2304, controls a third camera module to capture an image during the first image capture time period. Image capture control module 2304, controls a fourth camera module to capture an image during the first image capture time period. Image capture control module 2304, controls a fifth camera module to capture an image during the first image capture time period. Image capture control module 2304, controls a sixth camera module to capture an image during the first image capture time period. Image capture control module 2304, controls a seventh camera module to capture an image during the first image capture time period.

Image capture control module 2304 controls the camera modules to capture images during additional image capture time periods, e.g., a second image capture time period, a third image capture time period, a fourth image capture time period, a fifth image capture time period, etc. Image capture control module 2304 controls the first camera module to capture an image, e.g., a first image, during an additional image capture time period, e.g., a second image capture time period. The image captured by the first camera module during the additional image capture time period, e.g., second image capture time period may, and sometimes does, include a present portion of the scene of interest and one or more missing portions of the scene of interest. Image capture control module 2304, controls a second camera module to capture an image during an additional image capture time period. Image capture control module 2304, controls a third camera module to capture an image during an additional image capture time period. Image capture control module 2304, controls a fourth camera module to capture an image during an additional image capture time period. Image capture control module 2304, controls a fifth camera module to capture an image during an additional image capture time period. Image capture control module 2304, controls a sixth camera module to capture an image during an additional image capture time period. Image capture control module 2304, controls a seventh camera module to capture an image during an additional image capture time period.

Captured image storage module 2306 is configured to stores the images captured during an image capture time period. For example, for each captured image, the captured image storage module 2306 stores the captured image along with information indicating which camera module captured the image and information indicating the image capture time period during which the image was captured, e.g., camera module ID information and time tag information.

Processing delay module 2308 is configured to wait a predetermined number of image capture time periods before starting processing of an image to be processed, e.g., an image which was captured by the first camera module during an additional image capture time period and which may include one or more missing portions. For example, processing delay module 2308 in some embodiments, delays the search for an image to be used to supply a missing portion of the scene of interest from an image captured by the first camera module during a particular image capture time period until a time window of captured images is acquired which may be processed, e.g., evaluated to determine if any captured images include the missing portion and to rank the potential source images for supplying the missing portion. In some embodiments, processing delay module 2308 creates delays to facilitate use of a sliding window of captured images, e.g., captured images from one or more preceding image capture time periods, captured images from a current image capture time period, and captured images from one or more subsequent image capture time periods, to be available to find a missing portion of a scene of interest.

Missing portion determination module 2310 is configured to determine if an image captured by the first camera module during an additional image capture time period, e.g., an image captured during an additional image capture time period which is currently being processed, is missing any portions of the scene area of interest, e.g., due to camera movement, occlusion, or camera lighting conditions. The camera movement is, e.g. unintentional camera movement due to a user failing to hold the camera perfectly stable. The camera lighting conditions are, e.g., due to a flash or a strobe light causing saturation of a portion of an image sensor. Missing portion determination module 2310 controls operation as a function of the determination.

Captured image outputting module 2312 is configured to output the captured image from the first camera module, e.g., display and/or transmit the captured image from the first camera module in response to a determination that there are not any missing portions of the scene of interest. In some embodiments captured image outputting module 2312 crops the captured image from the first camera module prior to outputting to include the scene of interest and to discard portions of the image captured by the first camera module which are outside the boundaries of the scene of interest.

Present portion identification module 2314 determines which portion(s) of a scene of interest are present in an image captured by the first camera module which is being processed, the image being captured during an additional image capture time period. Missing portion identification module 2316 determines which portion(s) of a scene of interest are missing from an image captured by the first camera module which is being processed, the image being captured during an additional image capture time period. Missing portion identification module 2316 may, and sometimes does, identify a plurality of missing portions. For example, an image captured by the first camera module during a second image capture time period may have 2 missing portions; and an image captured by the first camera module during a third image capture time period may have three missing portions.

Missing portion subroutine call module 1054 is configured to call a subroutine for identifying an image including the missing portion of the area of interest which was determined to be missing from the image captured by the first camera module. Missing portion subroutine call module 1054 calls the subroutine for identifying an image for each identified missing portion.

Missing portion subroutine receive module 1056 is configured to receive from the subroutine information indicating the image(s) from which missing scene area of interest portion(s) are to be obtained, said images corresponding to the same or different image capture time period as the image captured by the first camera module which is currently being processed.

Composite image generation module 2322 is configured to generate a composite image by combining the scene area of interest portion, e.g., present portion, captured by the first camera module with missing image portion(s) captured by other camera modules and/or during other image capture time periods from the current image capture time period being processed.

Composite image storage module 2324 is configured to store the generated composite image. In some embodiments, composite image storage module stores information the sources of each of the portions of the composite image, e.g., camera module ID information and/or time tag information corresponding to image capture time for each portion, e.g., information indicating the image capture time period for each portion used in the generated composite image. In some embodiments, composite image storage module 2324 stores information indicating the locations of each of the portions within the composite image.

Composite image outputting module 2326 outputs, e.g., displays, e.g., on a display device in the camera device and/or transmits, a generated composite image, e.g., via a wired or wireless transmitter included in the camera device.

Missing portion subroutine module 2328 is configured to identify an image to be used to supply a missing portion of a scene or interest, e.g., a missing portion of a scene of interest from an image captured by the first camera module during an additional image capture time period. Input information receive module 2330 is configured to receive information indicating a missing scene area of interest portion and an image capture time period for which the portion is missing. The missing scene area of interest portion is, e.g., missing from an image captured by the first camera module during an additional image capture time period, e.g., a second image capture time period, or a third image capture time period or a fourth image capture time period, etc.

Current image capture time period setting module 2332 is configured to set the current image capture time period equal to the image capture time period for which the portion is missing, e.g., based on the information received by module 2330.

Current image capture time period missing portion source image identification module 2334 is configured to identify one or more images corresponding to the current image capture time period from which the missing portion can be obtained. Information 1107, which is a list of identified image(s) from other camera module other than the first camera module from which the missing portion of the scene of interest can be obtained, said images on the list being captured during the current image capture time period, is an output of module 2334.

Preceding/subsequent image capture time period source image identification module 2336 is configured to identify one or more images from preceding and/or subsequent image capture time periods from which the missing image portion of the scene of interest can be obtained. Information 1109, which is a list of identified image(s) from preceding and/or subsequent image capture time periods, with respect to the current image capture time period, of captured images from which the missing portion can be obtained, is an output of module 2336.

Identified image ranking module 2338 is configured to rank images from which the missing portion can be obtained as a function of resolution and/or temporal proximity to the current image capture time period for which the missing portion is sought. Resolution based ranking module 2340 is configured to weigh each identified image based on resolution. Fore example, module 2338 is configured to multiply an initial rank of 1 by a multiplier based on resolution to obtain a resolution based rank value for the identified image, the higher the resolution, the higher the multiplier.

Temporal proximity based ranking module 2342 is configured to weight each identified image based on temporal proximity to the current image for which the missing portion is sought. For example, module 2342 is configured to multiply an initial rank of 1 by a multiplier based on temporal proximity to obtain a temporal proximity based rank value for the identified image, with a multiplier of 1 being used for an identified image captured during the current image capture time period, and lower multipliers being used for more distant image capture time periods, e.g., a multiplier of 0.8 being used for 1 image capture time period away from the current image capture time period, and a multiplier of 0.6 being used for 2 image capture time periods away from the current image capture time period.

Resolution and temporal proximity based ranking module 2344 is configured to weigh each identified image based on resolution and temporal proximity to the current image for the missing portion of the scene of interest is being sought. Resolution and temporal proximity based ranking module 2344 obtains a resolution/temporal based rank value for each identified image. In some embodiments, module 2344 uses the outputs of modules 2340 and 2342 as input to determine and obtain the resolution/temporal based rank value for an identified image which can be used to supply the missing portion. In other embodiments, module 2344 determines a rank value for the identified image directly based on resolution and temporal proximity information, e.g., using criteria similar to those discussed with respect to modules 2340 and 2342. In some embodiments, the weighting factor multipliers, e.g. temporal weighting factor multipliers, can be, and sometimes are, adjusted as a function of the rate of image capture.

Resolution comparison module 2346 is configured to determine if there is an identified image corresponding to a different image capture time period which is of higher resolution than an identified image of the current image capture time period which can be the source of the missing portion and to control operation as a function of the determination.

Content comparison module 2348 is configured to determine if the content of the missing portion in a identified lower resolution image corresponding to the current image capture time period matches the content of an identified higher resolution image of an other image capture time period from which the content can be obtained and to control operation as a function of the determination.

Ranking adjustment module 2350 is configured to adjust, e.g. increase, the rank of an indentified higher resolution image so that the higher resolution image is used instead of the lower resolution image in response to the determination by module 2348 that the content of the missing portion of the higher resolution image matches the content of the missing portion of the lower resolution image.

Highest ranked image identification module 2352 is configured to identify the highest rand identified image to be used as the source of the missing portion of the image for which the image identification subroutine was called.

Selected image return module 2354 is configured to return information indicating the highest ranked identified image to be used as the source of the missing image portion.

Figure 23:
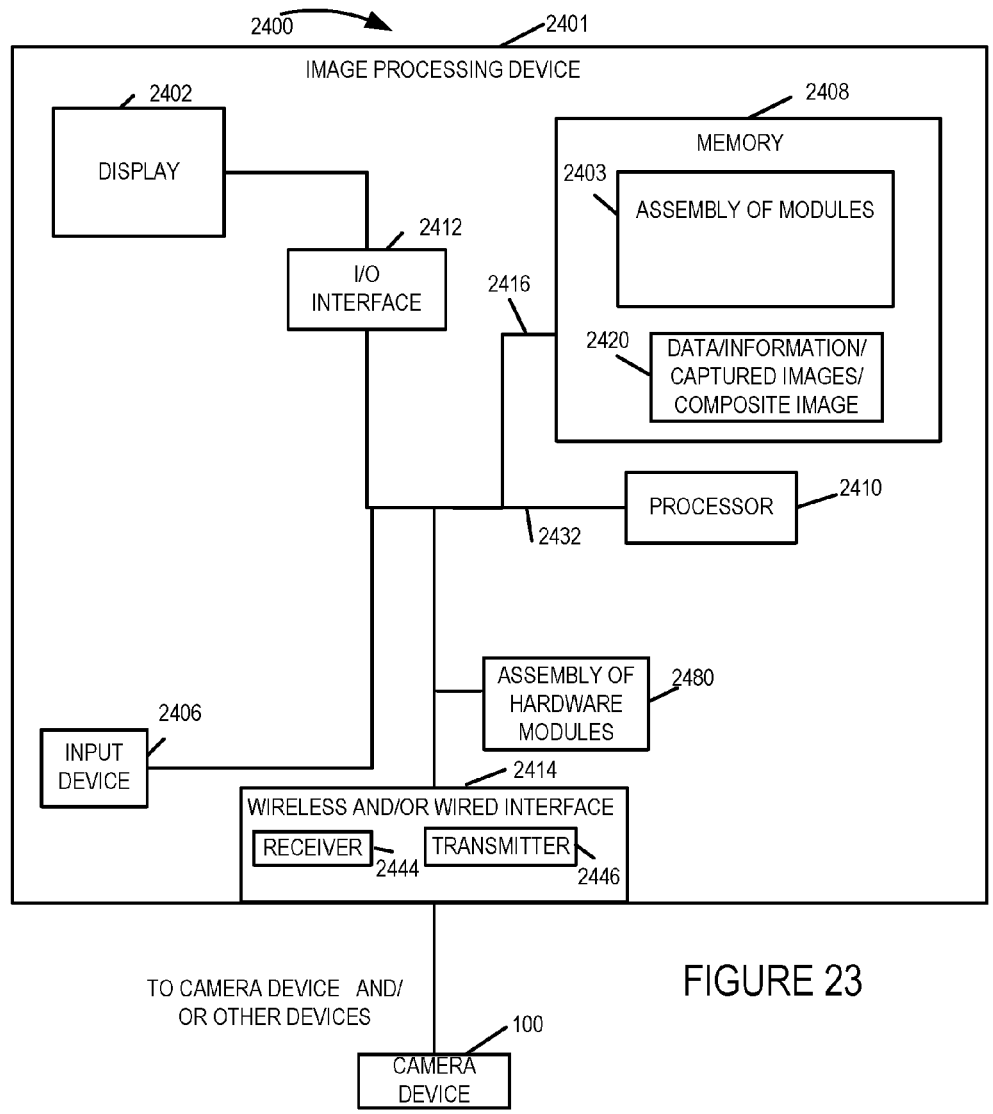
FIG. 23 illustrates an exemplary system including a camera device and image processing system which can be used to capture images and generate video in accordance with one embodiment of the invention.

FIG. 23 illustrates an exemplary system 2400 including a camera device 100 which maybe the same or similar to the camera device of FIG. 1 which can be used to capture images using a set of camera modules in accordance with the invention and an image processing system 2401 which can receive and process images to generate composite images to be used as part of a video sequence when one or more portions of a scene area of interest are missing from an image or images used to capture video, e.g., a sequence of images. The camera device 100 maybe the same as the camera device 100. In the FIG. 23 embodiment the camera device 100 is controlled, e.g., by the controller in the camera device 100 or by the processor 2410 in the image processing system to capture an image of a scene area of interest. Over time images may be captured using sets of camera modules with the images being processed as necessary to generate a composite image, as needed due to a missing image portion in a captured image, for one or more image time periods, frame times, in a video sequence.

The image processing device 2401 can be a computer system which is coupled via a wire or wirelessly to the camera device 100. The image processing system 2401 includes a display 2302 on which one or more images, e.g., generated or received images, can be and are displayed. The display is coupled via an I/O interface 2412 of the camera device and bus 2416 to memory 2408, processor 2410, assembly of hardware modules 2480, input device 2306 and wireless and/or wired interface 2414 through which image data, camera control commands and/or other information can be received and/or transmitted. To support receipt of image data and/or other information the interface 2414 includes a receive 2444 and a transmitter 2446.

The method 2408 includes an assembly of modules 2403 and data and/or information 2420 which can include captured images and/or one or more composite images which maybe generated in accordance with the invention, e.g., as part of a image stabilization operation during generation of a video sequence.

The assembly of modules 2403 may include all or some of the modules of 2300 shown in FIG. 22 with the modules being used, when executed by processor 2410 to control the operation of the image processing device 2401 and/or camera device 100. When implemented in hardware the assembly of hardware module 2480 may include one, all or more of the modules 2300 but with the modules being implemented fully in hardware in some embodiments. Depending on the embodiment some modules maybe implemented in hardware and other modules in software.

Thus in some embodiments the system 2400 shown in FIG. 23 includes a plurality of optical chains which are part of camera device 100, an image capture controller which is part of camera device 100 in some embodiments, configured to control a first optical chain in said plurality of optical chains to capture, during a first period of time, an image of said first scene area of interest, the first optical chain having a first focal length and to control a first set of optical chains in the plurality of optical chains to capture multiple images during a second time period, the first set of optical chins including said first optical chain which captures a first portion of said scene area of interest during said second period of time but misses a second portion of said scene area of interest during said second period of time due to a change in camera position between said first and second periods of time and at least a second optical chain which captures a second image during said second period of time; and a processor 2410 configured to: identify at least one image including said missing second portion of said scene area of interest captured during said second period of time, said identified at least one image being an image captured during said second period of time by another camera module in said first set of camera modules; and generate a composite image from the first portion of said scene area of interest included in an image captured by said first camera module during said second period of time and the missing second portion of said scene area of interest included in an image captured by said another camera module during said second period of time. In at least some such embodiments the second optical has a different, e.g., shorter focal length than said first camera module and captures a larger scene area than the first camera module. In some embodiment the camera 100 includes multiple camera modules, e.g., camera modules of a first focal length, a second focal length and a third focal length with each of the camera modules of the different focal lengths capturing different size scene areas. In embodiments where the camera modules with different focal lengths have sensors of the same size and type, the sensors capturing the larger scene area will capture lower resolution images. The system 2300 includes a user input device which maybe the touch screen of the camera device 100 or input device 2406 which maybe a keypad, keyboard or other input device such as a touch screen, for receiving user input indicating a scene area of interest. The image capture controller of the camera device 100 or system 2401 is configured in some embodiments to control the first camera module of the camera 100, during a first image capture time period to capture an image including a complete image of said first scene area of interest, said first camera module having a first focal length. In some embodiments the input device is a touch sensitive display of the camera device 100 or image processing device 2301 and the first set of camera optical chains are camera modules which each include a separate sensor and lens. The first set of optical chins includes in some embodiments optical chains of at least three different focal lengths.

In some embodiments the image capture, stabilization and composite image generation method is implemented fully in the handheld camera 100 in which case image processing device 2300 need not be used.

In other embodiments the methods are implemented using the system 2400 which includes the combination of the image processing device 2401 and camera device 100.

Numbered List of Exemplary Embodiments:

Method Embodiment 1. A method of generating one or more images, the method comprising: capturing multiple images using a set of camera modules during a second image capture time period, said set of camera modules including at least a first camera module and a second camera module, said first camera module capturing a first image including a first portion of said scene area of interest during said second image capture time period but missing a second portion of said scene area of interest during said second image capture time period; identifying, for use in generating a composite image, an image including said missing second portion of said scene area of interest, said identified image being: (i) an image captured by said second camera module in said set of camera modules or (ii) an image captured during a different image capture time period than said second image capture time period; and generating the composite image from the first portion of said scene area of interest included in said first image captured by said first camera module during the second image capture time period and the identified image including said missing second portion of said scene area of interest.

Method Embodiment 2. The method of method embodiment 1, wherein the second camera module has a different focal length than said first camera module.

Method Embodiment 3. The method of method embodiment 1, further comprising: receiving user input indicating a scene area of interest; and capturing using the first camera module, during a first image capture time period, an image including a complete image of said first scene area of interest, said first camera module having a first focal length.

Method Embodiment 4. The method of method embodiment 3, wherein said first camera module misses a portion of said scene area of interest during the second image capture time period due to a change in camera position between said first and second image capture time periods.

Method Embodiment 5. The method of method embodiment 4, wherein said missing portion is an occluded portion of said scene area of interest which is occluded from a field of view of said first camera module during said second image capture time period but not during said first image capture time period.

Method Embodiment 6. The method of method embodiment 3, wherein said first camera module misses a portion of said scene area of interest during said second image capture time period due to a change in lighting conditions between said first and second image capture time periods, said missing second portion of said scene area of interest corresponding to a portion of the first sensor which was saturated due to lighting levels higher during said second image capture time period than during said first image capture time period.

Method Embodiment 7. The method of method embodiment 1, wherein identifying, for use in generating a composite image, said image including said missing second portion of said scene area of interest includes: i) identifying one or more images including said second missing portion; ii) ranking the identified one or more images including said missing second portion of said scene area of interest based on at least one of resolution or time of image capture; and iii) selecting, based on the ranking of the identified one or more images including said missing second portion, a highest ranked one of the identified one or more images including said second missing portion for use as the identified image for use in combining with the first image captured by the first camera module.

Method Embodiment 8. The method of method embodiment 7, wherein ranking the identified one or more images including the second missing portion includes weighting the identified one or more images on a per image basis based on the resolution of the image being ranked.

Method Embodiment 9. The method of method embodiment 8, wherein ranking the identified one or more images including the second missing portion includes weighting images based on image resolution, higher resolution images being weighted more heavily than lower resolution images.

Method Embodiment 10. The method of method embodiment 9, wherein ranking the identified one or more images including the second missing portion includes weighting images based on temporal proximity to the second image capture time period, images captured during the second image capture time period weighted more heavily than images captured during another image capture time period.

Method Embodiment 11. The method of method embodiment 9, wherein ranking the identified one or more images includes weighting images based on temporal proximity to the second image capture time period, images captured during an image capture time period immediately preceding or subsequent to said second image capture time period being weighted more heavily than images captured in a time period two or more image capture time periods away from said second image capture time period.

Method Embodiment 12. The method of method embodiment 11, wherein when an image corresponding to a different capture time period and an image corresponding to the second image capture time period are identified as including the second missing scene portion, ranking the identified one or more images includes: determining the resolution of the image captured during the second image capture time period including the second missing scene portion; determining the resolution of the image captured during a different image capture time period including the second missing scene portion; when the resolution of the image captured during a different image capture time period including the second missing scene portion is higher than the resolution of the image captured during the second image capture time period including the second missing scene portion: comparing the content of the second missing scene portion of the images including the missing second scene portion to determine if they match; and if the lower resolution content of the second missing scene portion from the second image capture time period matches the content of the second missing scene portion of the higher resolution image captured in a different image capture time period, increasing the ranking of the higher resolution image captured in the different time period so that it is used instead of the lower resolution image captured in the second image capture time period.

Method Embodiment 13. The method of method embodiment 7, wherein said image including the second mission portion selected for combining with the first image is an image captured by a camera module having smaller focal length than said first camera module, said selected image including the second missing portion being of lower resolution than said first image.

Method Embodiment 14. The method of method embodiment 13, wherein generating a composite image includes combining the first portion of said scene area of interest included in the image captured by said first camera module during the second image capture time period and having a first resolution with the missing second portion of said scene area of interest included in the identified image including the second missing scene portion, the identified image including the missing second image portion being an image captured by the second camera module during the second image capture time period and having a second resolution which is different from the resolution of the image captured by the first camera module.

Method Embodiment 15. The method of method embodiment 14, wherein the second camera module has a smaller focal length than said first camera module, said second resolution being lower than said first resolution.

Method Embodiment 16. The method of method embodiment 13, wherein generating a composite image includes combining the first portion of said scene area of interest included in the first image captured by said first camera module during the second image capture time period and having a first resolution with the missing second portion of said scene area of interest included in the identified image including the second missing scene portion, the identified image including the missing second image portion being an image captured during an image capture time period preceding or following the second image capture time period.

Method Embodiment 17. The method of method embodiment 16, wherein the identified image including the second missing scene portion was captured by said first camera module during a first image capture time period immediately preceding the second image capture time period or during a third image capture time period immediately following the second image capture time period.

Method Embodiment 18. The method of method embodiment 17, wherein the identified image including the second missing scene portion was captured by the first camera module during a different image capture time period than the second image capture time period.

Method Embodiment 19. The method of method embodiment 17, wherein the identified image including the second missing scene portion was captured by a camera module which is different from said first camera module.

Method Embodiment 20. The method of method embodiment 14, wherein the second resolution is lower than said first resolution.

Method Embodiment 21. The method of method embodiment 20, wherein the first image captured by the first camera module is further missing a third portion of said scene area of interest, the method further comprising: identifying an image including said missing third portion of said scene area of interest.

Method Embodiment 22. The method of method embodiment 21, wherein the identified image including said missing third portion of said scene area of interest is captured by a different camera module than said first camera module or is captured during a different image capture time period than said second image capture time period.

Method Embodiment 23. The method of method embodiment 22, wherein the identified image including said missing third portion corresponds to a time period preceding or subsequent the second image capture time period.

Method Embodiment 24. The method of method embodiment 23, wherein the identified image including said missing third portion corresponds to a different image capture time period than said identified image including the second missing portion.

Method Embodiment 25. The method of method embodiment 25, wherein the third missing portion is missing due to a change in lighting conditions and said second missing portion is missing due to camera movement.

System Embodiment 1. A system comprising: a plurality of optical chains; an image capture controller configured to control a first optical chain in said plurality of optical chains to capture, during a first period of time, an image of said first scene area of interest, the first optical chain having a first focal length and to control a first set of optical chains in the plurality of optical chains to capture multiple images during a second time period, the first set of optical chins including said first optical chain which captures a first portion of said scene area of interest during said second period of time but misses a second portion of said scene area of interest during said second period of time due to a change in camera position between said first and second periods of time and at least a second optical chain which captures a second image during said second period of time; and a processor configured to: identify at least one image including said missing second portion of said scene area of interest captured during said second period of time, said identified at least one image being an image captured during said second period of time by another camera module in said first set of camera modules; and generate a composite image from the first portion of said scene area of interest included in an image captured by said first camera module during said second period of time and the missing second portion of said scene area of interest included in an image captured by said another camera module during said second period of time.

System Embodiment 2. The system of System Embodiment 1, wherein the second optical has a different focal length than said first camera module.

System Embodiment 3. The system of System Embodiment 2, further comprising: a user input device for receiving user input indicating a scene area of interest; and wherein the image capture controller is configured to control the first camera module, during a first image capture time period to capture an image including a complete image of said first scene area of interest, said first camera module having a first focal length.

System Embodiment 4. The system of System Embodiment 3, wherein said user input device is a touch sensitive display; wherein said first set of camera optical chains are camera modules which each include a separate sensor and lens; and wherein said first set of optical chins includes optical chains of at least three different focal lengths.

System Embodiment 5. The system of System Embodiment 4, wherein said system is a handheld camera.

System Embodiment 6. The system of claim 4, wherein said system includes: a handheld camera that includes the plurality of optical chains and image capture controller; and a processing system coupled to said handheld camera including said processor which is configured to generate the composite image.

Computer readable medium embodiment 1. A non-transitory computer readable medium embodiment including processor executable instructions which when executed by a processor of a system controls the processor to: control a set of camera modules of a camera to capture multiple images during a second image capture time period, said set of camera modules including at least a first camera module and a second camera module, said first camera module capturing a first image including a first portion of said scene area of interest during said second image capture time period but missing a second portion of said scene area of interest during said second image capture time period; identify, for use in generating a composite image, an image including said missing second portion of said scene area of interest, said identified image being: (i) an image captured by said second camera module in said set of camera modules or (ii) an image captured during a different image capture time period than said second image capture time period; and generate the composite image from the first portion of said scene area of interest included in said first image captured by said first camera module during the second image capture time period and the identified image including said missing second portion of said scene area of interest.

Computer readable medium embodiment 2. A non-transitory computer readable medium embodiment including processor executable instructions which when executed by a processor of a system controls the system to implement the method of any of the method embodiments described herein.

While images captured in the same time period, e.g., frame capture time period of a video sequence, are preferred for use as a source of a missing image portion over images captured in other time intervals, when the missing image portion of higher resolution can be obtained from a preceding or subsequent time interval it can and sometimes is used rather than a missing image portion from an image captured in the same time interval. This is particularly the case when the higher resolution image portion from the preceding or subsequent time interval is consistent with the lower resolution version of the missing portion of the scene area of interest captured during the same time interval as the image from which the main portion of the scene area of interest is obtained and with which the missing portion is to be combined.

The reason for the missing image portion of the scene are of interest may vary and can be due to camera movement resulting in a scene area becoming occluded or otherwise being outside the field of view of the camera module, e.g., first camera module, capturing the main portion of the scene area of interest, due to lighting conditions such as a flash and/or for other reasons such as dirt obscuring a portion of the lens of the main camera module.

It should be appreciated that any of the cameras, including the camera 100 shown in FIG. 1, may include multiple optical chains and one, more or all of the modules shown in FIG. 22 and can be used to implement the methods described herein.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of cameras, at least some of the methods and apparatus of the present invention, are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images may be and sometimes are displayed on the camera device or sent to a printer for printing as a photo or permanent document which can be maintained in a file as part of a personal or business record.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional embodiments are possible while staying within the scope of the above discussed features.

What is claimed is:

1. A method of generating one or more images, the method comprising:
   receiving user input indicating a scene area of interest;
   capturing using a first camera module, during a first image capture time period, an image including a complete image of said scene area of interest, said first camera module having a first focal length;
   capturing multiple images using a set of camera modules during a second image capture time period, said set of camera modules including at least said first camera module and a second camera module, said first camera module capturing a first image including a first portion of said scene area of interest during said second image capture time period but missing a second portion of said scene area of interest during said second image capture time period, wherein said first camera module misses a portion of said scene area of interest during the second image capture time period due to a change in camera position between said first and second image capture time periods;
   identifying, for use in generating a composite image, an image including said missing second portion of said scene area of interest, said identified image being: (i) an image captured by said second camera module in said set of camera modules or (ii) an image captured during a different image capture time period than said second image capture time period; and
   generating the composite image from the first portion of said scene area of interest included in said first image captured by said first camera module during the second image capture time period and the identified image including said missing second portion of said scene area of interest.

2. The method of claim 1, wherein said missing portion is an occluded portion of said scene area of interest which is occluded from a field of view of said first camera module during said second image capture time period but not during said first image capture time period.

3. A method of generating one or more images, the method comprising:
receiving user input indicating a scene area of interest;
capturing using a first camera module, during a first image capture time period, an image including a complete image of said scene area of interest, said first camera module having a first focal length;
capturing multiple images using a set of camera modules during a second image capture time period, said set of camera modules including at least said first camera module and a second camera module, said first camera module capturing a first image including a first portion of said scene area of interest during said second image capture time period but missing a second portion of said scene area of interest during said second image capture time period, wherein said first camera module misses a portion of said scene area of interest during said second image capture time period due to a change in lighting conditions between said first and second image capture time periods, said missing second portion of said scene area of interest corresponding to a portion of a first sensor which was saturated due to lighting levels higher during said second image capture time period than during said first image capture time period;
identifying, for use in generating a composite image, an image including said missing second portion of said scene area of interest, said identified image being: (i) an image captured by said second camera module in said set of camera modules or (ii) an image captured during a different image capture time period than said second image capture time period; and
generating the composite image from the first portion of said scene area of interest included in said first image captured by said first camera module during the second image capture time period and the identified image including said missing second portion of said scene area of interest.

4. A method of generating one or more images, the method comprising:
capturing multiple images using a set of camera modules during a second image capture time period, said set of camera modules including at least a first camera module and a second camera module, said first camera module capturing a first image including a first portion of a scene area of interest during said second image capture time period but missing a second portion of said scene area of interest during said second image capture time period;
identifying, for use in generating a composite image, an image including said missing second portion of said scene area of interest, said identified image being: (i) an image captured by said second camera module in said set of camera modules or (ii) an image captured during a different image capture time period than said second image capture time period, wherein identifying, for use in generating a composite image, said image including said missing second portion of said scene area of interest includes:
i) identifying one or more images including said second missing portion; and
ii) ranking the identified one or more images including said missing second portion of said scene area of interest based on at least one of resolution or time of image capture; and
iii) selecting, based on the ranking of the identified one or more images including said missing second portion, a highest ranked one of the identified one or more images including said second missing portion for use as the identified image for use in combining with the first image captured by the first camera module; and
generating the composite image from the first portion of said scene area of interest included in said first image captured by said first camera module during the second image capture time period and the identified image including said missing second portion of said scene area of interest.

5. The method of claim 4, wherein ranking the identified one or more images including the second missing portion includes weighting the identified one or more images on a per image basis based on the resolution of the image being ranked.

6. The method of claim 5, wherein ranking the identified one or more images including the second missing portion includes weighting images based on image resolution, higher resolution images being weighted more heavily than lower resolution images.

7. The method of claim 6, wherein ranking the identified one or more images including the second missing portion includes weighting images based on temporal proximity to the second image capture time period, images captured during the second image capture time period weighted more heavily than images captured during another image capture time period.

8. The method of claim 6, wherein ranking the identified one or more images includes weighting images based on temporal proximity to the second image capture time period, images captured during an image capture time period immediately preceding or subsequent to said second image capture time period being weighted more heavily than images captured in a time period two or more image capture time periods away from said second image capture time period.

9. The method of claim 8, wherein when an image corresponding to a different image capture time period and an image corresponding to the second image capture time period are identified as including the second missing scene portion, ranking the identified one or more images includes:
determining the resolution of the image captured during the second image capture time period including the second missing scene portion;
determining the resolution of the image captured during a different image capture time period including the second missing scene portion; and
when the resolution of the image captured during a different image capture time period including the second missing scene portion is higher than the resolution of the image captured during the second image capture time period including the second missing scene portion:
comparing the content of the second missing scene portion of the images including the missing second scene portion to determine if they match; and
if the lower resolution content of the second missing scene portion from the second image capture time period matches the content of the second missing scene portion of the higher resolution image captured in a different image capture time period, increasing the ranking of the higher resolution image captured in the different time period so that it is used instead of the lower resolution image captured in the second image capture time period.

10. The method of claim 4, wherein said image including the second missing portion selected for combining with the first image is an image captured by a camera module having smaller focal length than said first camera module, said selected image including the second missing portion being of lower resolution than said first image.

11. The method of claim 10, wherein generating a composite image includes combining the first portion of said scene area of interest included in the image captured by said first camera module during the second image capture time period and having a first resolution with the missing second portion of said scene area of interest included in the identified image including the second missing scene portion, the identified image including the missing second image portion being an image captured by the second camera module during the second image capture time period and having a second resolution which is different from the resolution of the image captured by the first camera module.

12. The method of claim 11, wherein the second camera module has a smaller focal length than said first camera module, said second resolution being lower than said first resolution.

13. A system comprising:
a plurality of optical chains;
an image capture controller configured to control a first optical chain in said plurality of optical chains to capture, during a first period of time, an image of a scene area of interest, the first optical chain having a first focal length, and to control a first set of optical chains in the plurality of optical chains to capture multiple images during a second time period, the first set of optical chains including said first optical chain, which captures a first portion of said scene area of interest during said second period of time but misses a second portion of said scene area of interest during said second period of time due to a change in camera position between said first and second periods of time, and at least a second optical chain, which captures a second image during said second period of time; and a processor configured to:
identify at least one image including said missing second portion of said scene area of interest captured during said second period of time, said identified at least one image being an image captured during said second period of time by another optical chain in said first set of optical chains; and
generate a composite image from the first portion of said scene area of interest included in an image captured by said first optical chain during said second period of time and the missing second portion of said scene area of interest included in an image captured by said another optical chain during said second period of time.

14. The system of claim 13, wherein the second optical chain has a different focal length than said first optical chain.

15. The system of claim 14, further comprising:
a user input device for receiving user input indicating a scene area of interest; and
wherein the image capture controller is configured to control the first optical chain, during a first image capture time period to capture an image including a complete image of said scene area of interest, said first optical chain having a first focal length.

16. The system of claim 15,
wherein said user input device is a touch sensitive display;
wherein said first set of optical chains are camera modules which each include a separate sensor and lens; and
wherein said first set of optical chains includes optical chains of at least three different focal lengths.

17. The system of claim of claim 16, wherein said system is a handheld camera.

18. The system of claim 16, wherein said system includes:
a handheld camera that includes the plurality of optical chains and the image capture controller; and
a processing system coupled to said handheld camera, said processing system including said processor which is configured to generate the composite image.

* * * * *